United States Patent
Yasunori et al.

(10) Patent No.: US 11,472,353 B2
(45) Date of Patent: Oct. 18, 2022

(54) WIRE HARNESS, CONNECTOR, AND COMMUNICATION RELAY METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hiromichi Yasunori, Yokkaichi (JP); Makoto Chujo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/312,839

(22) PCT Filed: Dec. 11, 2019

(86) PCT No.: PCT/JP2019/048558
§ 371 (c)(1),
(2) Date: Jun. 10, 2021

(87) PCT Pub. No.: WO2020/122145
PCT Pub. Date: Jun. 18, 2020

(65) Prior Publication Data
US 2022/0048446 A1    Feb. 17, 2022

(30) Foreign Application Priority Data

Dec. 11, 2018 (WO) .................. PCT/JP2018/045387

(51) Int. Cl.
*B60R 16/02*     (2006.01)
*H01R 13/66*    (2006.01)
(Continued)

(52) U.S. Cl.
CPC ........ *B60R 16/0207* (2013.01); *B60R 16/023* (2013.01); *B60R 16/033* (2013.01);
(Continued)

(58) Field of Classification Search
CPC .............. B60R 16/0207; B60R 16/023; B60R 16/0231; B60R 16/0232; B60R 16/0238;
(Continued)

(56) References Cited

U.S. PATENT DOCUMENTS

2002/0180271 A1* 12/2002 Taniguchi ........... B60R 16/0207
307/10.1
2012/0236525 A1* 9/2012 Okada ............... H04L 12/40006
361/805

(Continued)

FOREIGN PATENT DOCUMENTS

JP     2007-228232 A    9/2007
JP     2017005617 A    1/2017
(Continued)

OTHER PUBLICATIONS

International Search Report, Application No. PCT/JP2019/048558, dated Mar. 3, 2020. ISA/Japan Patent Office.

*Primary Examiner* — Levi Gannon
(74) *Attorney, Agent, or Firm* — Honigman LLP

(57) ABSTRACT

Provided are a wire harness, a connector and a communication relay method with which effects such as reduction in the relay processing load of an in-vehicle device or improvement in the scalability of an in-vehicle device can be expected. A wire harness according to an embodiment includes a connector to be detachably connected to an in-vehicle device, a plurality of communication lines connected to the connector, and a relay unit provided in the connector and configured to relay communication between the plurality of communication lines and to relay commu- (Continued)

nication between the communication lines and the in-vehicle device.

10 Claims, 41 Drawing Sheets

(51) Int. Cl.
  *B60R 16/033* (2006.01)
  *H04L 12/40* (2006.01)
  *H04L 9/40* (2022.01)
  *B60R 16/023* (2006.01)

(52) U.S. Cl.
  CPC ............. *H01R 13/665* (2013.01); *H04L 9/40* (2022.05); *H04L 12/40032* (2013.01); *H04L 2012/40215* (2013.01); *H04L 2012/40273* (2013.01)

(58) Field of Classification Search
  CPC .. H01R 12/75; H01R 13/665; H01R 13/6658; H01R 31/06; H01R 31/065; H04L 12/28; H04L 12/2856; H04L 12/40032; H04L 2012/40215; H04L 2012/40273; H04L 29/06; H04L 29/10
  See application file for complete search history.

(56) References Cited

U.S. PATENT DOCUMENTS

2012/0327978 A1* 12/2012 Nishimura ........ H04L 12/40032
                                                                  375/211
2021/0245686 A1* 8/2021 Suzuki ................ B60R 16/0315

FOREIGN PATENT DOCUMENTS

WO  2011105545 A1  9/2011
WO  2017222074 A1  12/2017

* cited by examiner

US 11,472,353 B2

WIRE HARNESS, CONNECTOR, AND COMMUNICATION RELAY METHOD

CROSS-REFERENCE TO RELATED APPLICATIONS

This application is the U.S. national stage of PCT/JP2019/048558 filed on Dec. 11, 2019, which claims priority of International Patent Application No. PCT/JP2018/045387 filed on Dec. 11, 2018, the contents of which are incorporated herein.

TECHNICAL FIELD

This disclosure relates to a wire harness that is detachably connectable to an in-vehicle device, a connector that is provided in this wire harness, and a communication relay method that uses the wire harness.

BACKGROUND

The functionality of vehicles is increasing and improving, and the number of electronic devices that are installed in vehicles is increasing. A plurality of electronic devices installed in a vehicle are connected via communication lines, and realize a variety of functions of the vehicle, by exchanging information and cooperating through communication. The number of communication lines provided in a vehicle also increases due to an increase in the number of installed electronic devices, and a system configuration that is often employed in recent years involves an in-vehicle device such as a gateway being installed in the vehicle, and this in-vehicle device relaying communication between the communication lines.

JP 2007-228232A proposes an in-vehicle LAN (Local Area Network) system that is able to automatically set identification information of messages to be relayed by a relay connection unit, according to the environment in which the relay connection unit is attached. In this system, an electronic control unit transmits a list information message showing a list of the identification information of messages to be received at startup. The relay connection unit, having received the list information message from the electronic control unit, obtains relay destination ports to relay messages, and updates relay information that records the correspondence between the identification information of messages and the relay destination ports.

With an in-vehicle device that relays communication, the relay processing load increases as the number of communication lines that are connected increases, and there is a risk that processing other than relay processing will be inhibited. Also, in the case where changes occur in the number of electronic devices that are installed in a vehicle, the communication specification and the like due to factors such as expansion of the type of vehicles, model change or the addition of optional equipment, the in-vehicle device needs to be changed.

The present disclosure was arrived at in view of the foregoing circumstances, and provides a wire harness, a connector and a communication relay method with which effects such as reduction in the relay processing load of an in-vehicle device or improvement in the scalability of an in-vehicle device can be expected.

SUMMARY

A wire harness according to this mode includes a connector to be detachably connected to an in-vehicle device, a plurality of communication lines connected to the connector, and a relay unit provided in the connector and configured to relay communication between the plurality of communication lines and to relay communication between the communication lines and the in-vehicle device.

Advantageous Effects of Invention

According to the above, effects such as reduction in the relay processing load of an in-vehicle device or improvement in the scalability of an in-vehicle device can be expected.

DETAILED DESCRIPTION OF PREFERRED EMBODIMENTS

Figure 1:
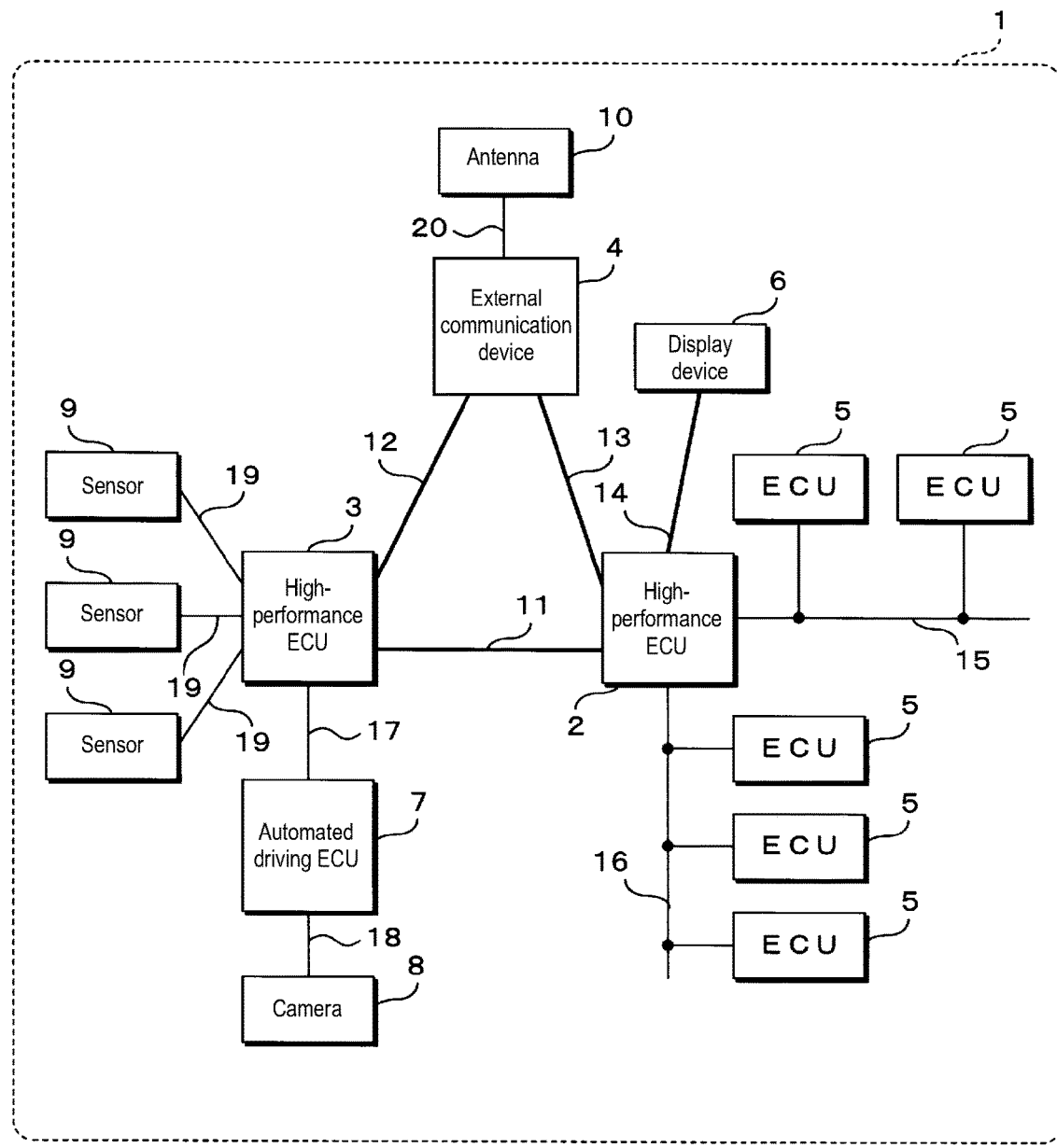
FIG. 1 is a schematic diagram for describing an outline of an in-vehicle communication system according to an embodiment.

Initially, embodiments of the present disclosure will be enumerated and described. Also, at least some of the embodiments described hereinafter may be suitably combined.

A wire harness according to this mode includes a connector to be detachably connected to an in-vehicle device, a plurality of communication lines connected to the connector, and a relay unit provided in the connector and configured to relay communication between the plurality of communication lines and to relay communication between the communication lines and the in-vehicle device.

In this mode, the wire harness detachably connected to an in-vehicle device is provided with a connector and a plurality of communication lines that are connected to this connector. A relay unit that relays communication is provided in the connector of the wire harness. The relay unit relays communication between the plurality of communication lines of the wire harness, and relays communication between the communication lines and an in-vehicle device. Due to the relay unit provided in the wire harness relaying communication, the in-vehicle device no longer needs to perform relay-related processing, and the processing load can be reduced. Also, changes in the communication specification and the like can be addressed by changing the wire harness, thus enabling the scalability of the in-vehicle device to be improved.

Preferably, the plurality of communication lines include a communication line to be used in communication compliant with a first communication protocol and a communication line to be used in communication compliant with a second communication protocol, and the relay unit performs protocol conversion between the first communication protocol and the second communication protocol.

In this mode, the plurality of communication lines include a communication line that is used in communication compliant with a first communication protocol and a communication line that is used in communication compliant with a second communication protocol. Communication protocols such as CAN (Controller Area Network) and Ethernet (registered trademark), for example, can be employed as the first communication protocol and the second communication protocol. The relay unit of the wire harness performs protocol conversion between the first communication protocol and the second communication protocol. The relay unit of the wire harness is thereby able to relay communication, even in the case where communication lines that are used with different communication protocols are provided together.

Preferably, the relay unit performs protocol conversion between the first communication protocol or second communication protocol and a third communication protocol, and performs communication using the third communication protocol with the in-vehicle device.

In this mode, the relay unit of the wire harness performs communication that uses a third communication protocol with the in-vehicle device, and performs protocol conversion between the first or second communication protocol and the third communication protocol. The relay unit is thereby able to convert the communication protocol that is used in communication outside the in-vehicle device and the communication protocol that is used in communication inside the in-vehicle device, and relay communication between the inside and outside of the in-vehicle device.

Preferably, the in-vehicle device includes a voltage conversion circuit for power supplied from a battery installed in a vehicle, and the relay unit receives supply of power whose voltage value has been converted by the voltage conversion circuit of the in-vehicle device.

In this mode, the in-vehicle device is provided with a power conversion circuit that converts the voltage value of power supplied from the battery of the vehicle. The relay unit of the wire harness operates with the power that is supplied from the power conversion circuit of the in-vehicle device. Since the wire harness does not need to be provided with the power conversion circuit, effects such as miniaturization of the wire harness can thereby be expected.

Preferably, the wire harness includes a voltage conversion circuit provided in the connector and configured to convert a voltage value of power supplied from a battery installed in a vehicle, and the relay unit receives supply of power from the voltage conversion circuit, and supplies power whose voltage value has been converted by the voltage conversion circuit to the in-vehicle device.

In this mode, the connector of the wire harness is provided with the voltage conversion circuit that converts the voltage value of power supplied from the battery of the vehicle. Power is supplied to the relay unit of the wire harness from the voltage conversion circuit, and the relay unit operates using the supplied power. Also, power whose voltage value has been converted by the voltage conversion circuit of the wire harness is supplied to the in-vehicle device. Since the power conversion circuit does not need to be provided in the in-vehicle device, effects such as miniaturization of the in-vehicle device can thereby be expected.

Preferably, the connector includes an individual connector individually provided for the communication lines, and an integrated connector to which the plurality of individual connectors are detachably connected and to be detachably connected to the in-vehicle device, the individual connector has an input-output unit configured to input and output signals for communication with respect to the communication lines, the integrated connector has the relay unit, and information related to communication is exchanged between the relay unit and the input-output unit.

In this mode, the connector of the wire harness is constituted using individual connectors individually provided for the communication lines and an integrated connector that integrates the plurality of individual connectors. The integrated connector has the plurality of individual connectors detachably connected thereto, and is detachably connected to the in-vehicle device. An input-output unit that inputs and outputs signals for communication with respect to the communication lines is provided in the individual connectors. The relay unit is provided in the integrated connector, and the relay unit and the input-output units of the individual connectors that are connected to the integrated connector exchange information. Since a suitable input-output unit can be provided for every communication line, the scalability of a wire harness provided with a relay function can thereby be improved.

Preferably, the wire harness includes a plurality of input-output units configured to input and output signals for communication with respect to the communication lines, and the relay unit and the plurality of input-output units are provided in a single IC (Integrated Circuit).

In this mode, the relay unit and the plurality of input-output units that input and output signals for communication with respect to the communication lines are provided in one IC (Integrated Circuit), and this IC is installed in the connector of the wire harness. Effects such as cost reduction and miniaturization of the wire harness can thereby be expected.

Preferably, the connector has a terminal to be electrically connected to the in-vehicle device, a relay IC including the relay unit, a first input-output IC interposed between the terminal and the relay unit and configured to input and output signals for communication with respect to the terminal, a second input-output IC interposed between the communication lines and the relay unit and configured to input and output signals for communication with respect to the communication lines, and a substrate on which the relay IC, the first input-output IC and the second input-output IC are mounted, the terminal is provided on one edge side of the substrate and the communication lines are connected on an other edge side of the substrate, and the terminal, the first input-output IC and the relay IC are disposed side by side in a straight line.

In this mode, a terminal, a first input-output IC and a relay IC are disposed side by side in a straight line on a substrate. The communication path between the terminal and the first input-output IC and the communication path between the first input-output IC and the relay IC can thereby be shortened, and effects such as reduction in communication delay can be expected.

Preferably, the connector has a terminal to be electrically connected to the in-vehicle device, a relay IC including the relay unit, a first input-output IC interposed between the terminal and the relay unit and configured to input and output signals for communication with respect to the terminal, a second input-output IC interposed between the communication lines and the relay unit and configured to input and output signals for communication with respect to the communication lines, and a substrate on which the relay IC, the first input-output IC and the second input-output IC are mounted, the terminal is provided on one edge side of the substrate and the communication lines are connected on an other edge side of the substrate, the terminal and the relay IC are disposed adjacent to each other, and the first input-output IC is disposed adjacent to the terminal or the relay IC.

In this mode, the terminal and the relay IC are disposed adjacent to each other, and the first input-output IC is disposed adjacent to the terminal or the relay IC. The communication path between the terminal and the first input-output IC and the communication path between the first input-output IC and the relay IC can thereby be shortened, and effects such as reduction in communication delay can be expected.

Preferably, the connector has a terminal to be electrically connected to the in-vehicle device, a relay IC including the relay unit, a first input-output IC interposed between the terminal and the relay unit and configured to input and output signals for communication with respect to the terminal, a second input-output IC interposed between the communication lines and the relay unit and configured to input and output signals for communication with respect to the communication lines, and a substrate on which the relay IC, the first input-output IC and the second input-output IC are mounted, the terminal is provided on one edge side of the substrate and the communication lines are connected on an other edge side of the substrate, and the first input-output IC or the second input-output IC is mounted on a surface on an opposite side of the substrate to the surface on which the relay IC is mounted.

In this mode, the first input-output IC or the second input-output IC is mounted on the surface on the opposite side of the substrate to the surface on which the relay IC is mounted. Effects such as miniaturization of the substrate on which components such as the first input-output IC, the second input-output IC and the relay IC are mounted can thereby be expected.

Preferably, the wire harness includes an anomaly detection unit configured to detect an anomaly of the communication lines.

In this mode, the connector is provided with an anomaly detection unit that detects anomalies of the communication lines. Since anomaly detection can be performed at a place closely approaching the communication lines, more accurate detection of anomalies relating to the communication lines can be expected.

A connector according to this mode to which a plurality of communication lines are connected and to be detachably connected to an in-vehicle device includes a relay unit configured to relay communication between the plurality of communication lines and to relay communication between the communication lines and the in-vehicle device.

In this mode, similarly to mode (1), the processing load of the in-vehicle device can be reduced, and the scalability of the in-vehicle device can be improved.

A communication relay method according to this mode includes using a wire harness to which a plurality of communication lines are connected and detachably connected to an in-vehicle device, relaying communication between the plurality of communication lines with a relay unit provided in the wire harness, and relaying communication between the communication lines and the in-vehicle device with the relay unit.

In this mode, similarly to mode (1), the processing load of the in-vehicle device can be reduced, and the scalability of the in-vehicle device can be improved.

Specific examples of a wire harness, a connector and a communication relay method according to embodiments of this disclosure will be described with reference to the drawings. Note that this disclosure is not limited to these illustrative examples and is defined by the claims, and all changes that come within the meaning and range of equivalency of the claims are intended to be embraced therein.

First Embodiment

FIG. 1 is a schematic diagram for describing an outline of an in-vehicle communication system according to the present embodiment. In the in-vehicle communication system according to the present embodiment, various devices such as high-performance ECUs 2 and 3, an external communication apparatus 4, a plurality of ECUs 5, a display device 6, a automated driving ECU 7, a camera 8, a plurality of sensors 9 and an antenna 10 installed in a vehicle 1 are connected via communication lines as appropriate. Various functions such as automated driving of the vehicle 1 are realized, by these plurality of devices exchanging information and cooperating through communication.

In the in-vehicle communication system illustrated to FIG. 1, the high-performance ECUs 2 and 3 are connected via a communication line 11, the high-performance ECU 3 and the external communication apparatus 4 are connected via a communication line 12, and the external communication apparatus 4 and the high-performance ECU 2 are connected via a communication line 13. That is, the high-performance ECUs 2 and 3 and the external communication apparatus 4 are connected in a ring. The display device 6 is connected to the high-performance ECU 2 via a communication line 14. Also, two bus-type communication lines 15 and 16 are connected to the high-performance ECU 2, and the plurality of ECUs 5 are each connected to the communication line 15 or 16. The automated driving ECU 7 is connected to the high-performance ECU 3 via a communication line 17, and the camera 8 is connected to the automated driving ECU 7 via a communication line 18. Also, the plurality of sensors 9 are connected to the high-performance ECU 3 via individual communication lines 19. The antenna 10 is connected to the external communication apparatus 4 via a communication line 20.

The high-performance ECU 2 performs control processing of components such as the ECUs 5 and display device 6 installed in the vehicle 1, relay processing of communication between the communication lines 11, 13, 14, 15 and 16, and other such processing. The high-performance ECU 3 performs control processing relating to automated driving of the vehicle 1, relay processing between the communication lines 11, 12, 17 and 19, and other such processing. The external communication apparatus 4 performs wireless communication via a wireless network such as a mobile phone communication network or a wireless LAN (Local Area Network), utilizing the antenna 10 disposed in an appropriate place in the vehicle 1. The high-performance ECUs 2 and 3 are able to communicate with a server device or other such device provided outside the vehicle 1 via the external communication apparatus 4.

The display device 6 is disposed near the driver's seat of the vehicle 1, and displays various images, messages and the like, in accordance with control by the high-performance ECU 2. The display device 6 may be commonly used with a car navigation device or other such device, for example. The ECUs 5 can include various ECUs such as an ECU that controls operation of an engine of the vehicle 1, an ECU that controls locking/unlocking of doors, an ECU that controls ON/OFF of lights, an ECU that controls operation of airbags, and an ECU that controls operation of an ABS (Antilock Brake System), for example.

The automated driving ECU 7 is an ECU that realizes automated driving (or driving assist) of the vehicle 1, based on images captured by the camera 8 and various types of information detected by the sensors 9. The camera 8 captures images forward of the vehicle 1, for example, and transmits the captured images to the automated driving ECU 7. The sensors 9 are LiDAR (Light Detection And Ranging) sensors that measure speed utilizing laser light, for example. The plurality of sensors 9 are provided in appropriate places in the vehicle 1, and detection results of the sensors 9 are each transmitted to the high-performance ECU 3.

The in-vehicle communication system according to the present embodiment is broadly divided into a functional group centered around the high-performance ECU 2 and a functional group centered around the high-performance ECU 3. The functional group centered around the high-performance ECU 3 includes components such as the automated driving ECU 7, the camera 8 and the sensors 9, and realizes functions relating to automated driving of the vehicle 1. The functional group centered around the high-performance ECU 2 includes components such as the plurality of ECUs 5 and the display device 6, and realizes functions other than automated driving of the vehicle 1. Required information is, however, also exchanged between the two functional groups, this being performed by the high-performance ECUs 2 and 3 communicating via the communication line 11.

Figure 2:
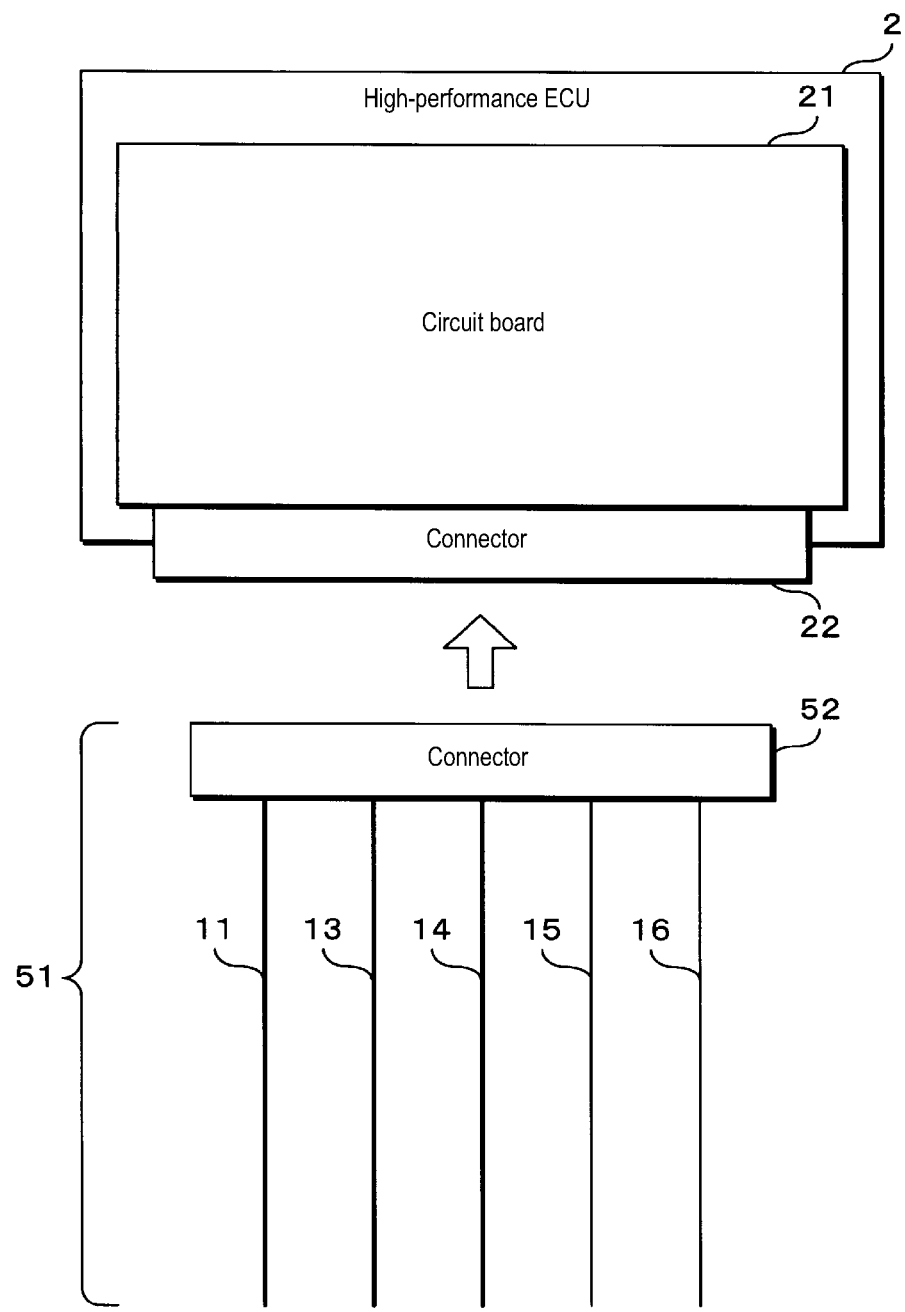
FIG. 2 is a schematic diagram for describing the connection between a high-performance ECU and a wire harness according to the embodiment.

FIG. 2 is a schematic diagram for describing the connection between a wire harness and the high-performance ECU 2 according to the present embodiment. As shown in FIG. 1, the plurality of communication lines 11, 13, 14, 15 and 16 are connected to the high-performance ECU 2 according to the present embodiment. In the present embodiment, these plurality of communication lines 11, 13, 14, 15 and 16 are bundled and connected to the high-performance ECU 2 as a single wire harness 51. The wire harness 51 is provided with a connector 52 at one end of the communication lines 11, 13, 14, 15 and 16. The connector 52 is for detachably connecting the wire harness 51 to a connector 22 provided in the high-performance ECU 2.

A circuit board 21 is housed inside of the casing of the high-performance ECU 2, for example, and the connector 22 mounted on (fixed to) the circuit board 21 is externally exposed from part of the casing. The connector 22 is for detachably connecting the wire harness 51. The circuit board 21 of the high-performance ECU 2 is electrically connected to the communication lines 11, 13, 14, 15 and 16 of the wire harness 51, due to the connector 22 of the high-performance ECU 2 being connected to the connector 52 of the wire harness 51. In the present embodiment, the connector 22 of the high-performance ECU 2 is a connector of a mode in which a rod-like metal terminal is protrudingly provided, that is, a so-called male connector. The connector 52 of the wire harness 51 is a connector that is provided with a tubular metal terminal that receives the rod-like metal terminal, that is, a so-called female connector. The relationship between the male connector and the female connector may, however, be reversed.

Note that the high-performance ECU 3 according to the present embodiment has approximately the same configuration as the high-performance ECU 2 shown in FIG. 2. Illustration and description of the configuration of the high-performance ECU 3 will be omitted. Also, in the present embodiment, a configuration is adopted in which the plurality of communication lines 11, 13, 14, 15 and 16 are connected to the connector 22 of the high-performance ECU 2 as the one wire harness 51, but the present invention is not limited thereto. For example, a configuration may be adopted in which the communication lines 11, 13 and 14 and the communication lines 15 and 16 are respectively bundled as separate wire harnesses and the two wire harnesses are connected to the connector 22 of the high-performance ECU 2. That is, a plurality of wire harnesses may be connected to the connector 22 of the high-performance ECU 2, and each wire harness need only include one or more communication lines.

Figure 3:
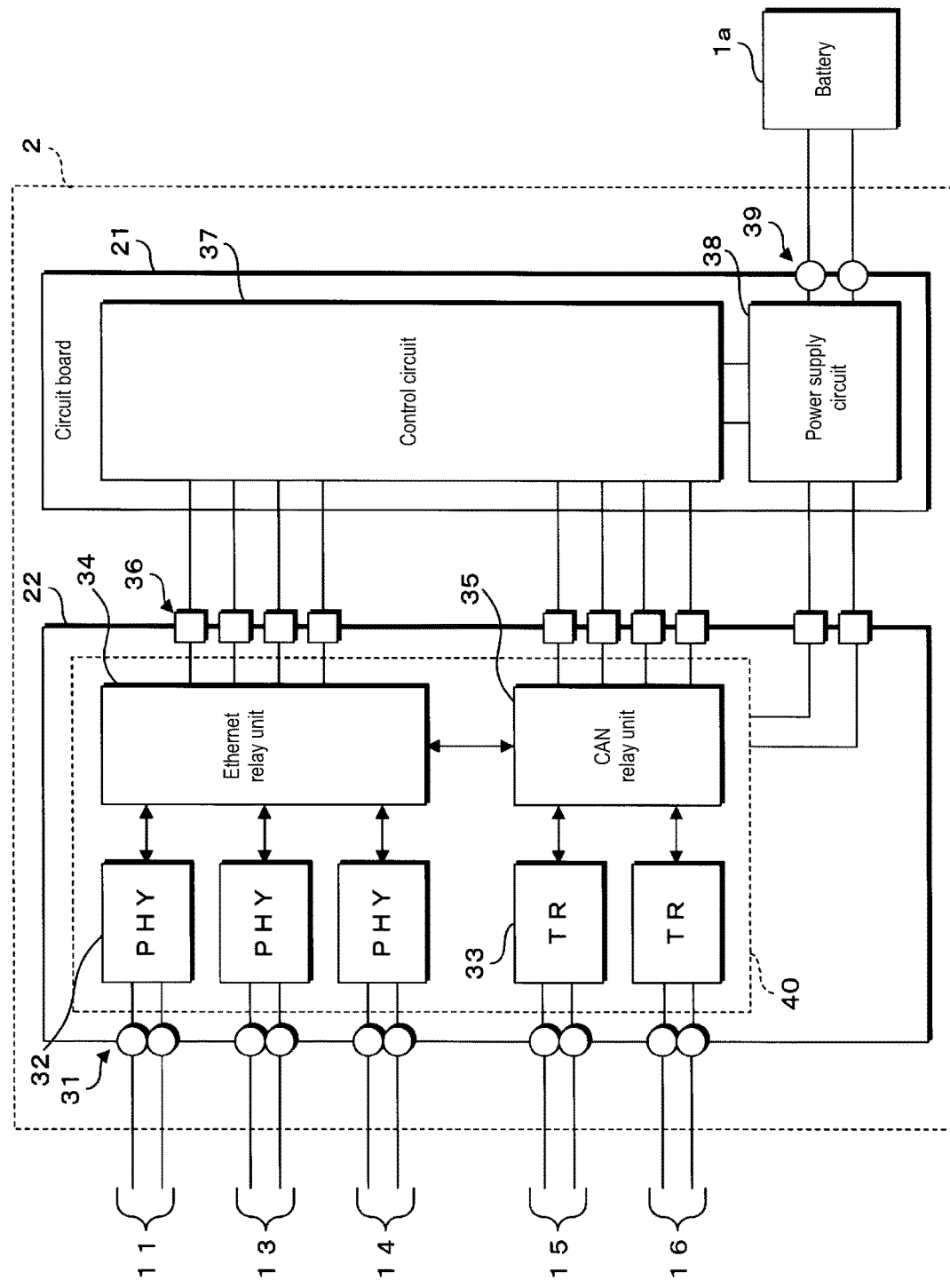
FIG. 3 is a block diagram showing the configuration of the high-performance ECU according to the embodiment.

FIG. 3 is a block diagram showing the configuration of the high-performance ECU 2 according to the present embodiment. The high-performance ECU 2 according to the present embodiment is provided with the circuit board 21 and the connector 22 as mentioned above. Components such as a control circuit 37, a power supply circuit 38 and a board terminal 39 are provided on the circuit board 21. The control circuit 37 is a circuit that is provided with a computational processing unit such as a CPU (Central Processing Unit) or an MPU (Micro-Processing Unit), and a nonvolatile memory device such as a flash memory or an EEPROM (Electrically Erasable Programmable Read Only Memory), for example, and performs various types of processing relating to control of the vehicle 1. The power supply circuit 38 is a circuit that converts power having a voltage value of 12 V, for example, that is supplied from a battery 1a installed in the vehicle 1 into power having a voltage value such as 3 V or 5 V, and outputs the resultant power. The control circuit 37 operates with the power that is output by the power supply circuit 38. The power that is output by the power supply circuit 38 is also supplied to the connector 22. The board terminal 39 is a terminal to which a power line for supplying power from the battery 1a is connected, and is electrically connected to the power supply circuit 38.

The connector 22 is provided with components such as a harness-side terminal 31, an Ethernet PHY (abbreviated as PHY in FIG. 3) 32, a CAN transceiver (abbreviated as TR in FIG. 3) 33, an Ethernet relay unit 34, a CAN relay unit 35, and an in-vehicle device-side terminal 36. The harness-side terminal 31 is a metal terminal that is electrically connected to each of the communication lines 11, 13, 14, 15 and 16 that are included in the wire harness 51. For example, a plurality of harness-side terminals 31 are arrange side by side in the housing of the connector 22. In the present embodiment, the communication lines 11, 13, 14, 15 and 16 are each constituted by a set of two wires, and ten harness-side terminals 31 are provided in the connector 22 in correspondence therewith. Note that the ten white circle symbols shown on the left side of FIG. 3 respectively correspond to the harness-side terminals 31.

In the present embodiment, the communication lines 11, 13 and 14 are communication lines for performing communication compliant with the Ethernet communication protocol, and the communication lines 15 and 16 are communication lines (so-called CAN buses) for performing communication compliant with the CAN communication protocol. The Ethernet PHY 32 and the CAN transceiver 33 are required one per communication line, and, in this example, three Ethernet PHYs 32 and two CAN transceivers 33 are provided in the connector 22. The Ethernet PHY 32 and the CAN transceivers 33 are each connected to one set of two harness-side terminals 31.

The Ethernet PHYs 32 receive data by sampling and acquiring the potential of the communication lines 11, 13 and 14 connected to the corresponding harness-side terminals 31, and provide the received data to the Ethernet relay unit 34. Also, the Ethernet PHYs 32 perform data transmission to the communication lines 11, 13 and 14 connected to the harness-side terminals 31, by converting transmission data provided from the Ethernet relay unit 34 into electrical signals and outputting the resultant signals to the harness-side terminals 31.

Similarly, the CAN transceivers 33 receives data by sampling and acquiring the potential of the communication lines 15 and 16 connected to the corresponding harness-side terminals 31, and provides the received data to the CAN relay unit 35. Also, the CAN transceivers 33 perform data transmission to the communication lines 15 and 16 connected to the harness-side terminals 31, by converting transmission data provided from the CAN relay unit 35 into electrical signals and outputting the resultant signals to the harness-side terminals 31.

The Ethernet relay unit 34 performs processing for relaying data between the Ethernet PHYs 32, the CAN relay unit 35 and the circuit board 21. For example, the Ethernet relay unit 34 provides reception data provided from an Ethernet PHY 32 to another Ethernet PHY 32, the CAN relay unit 35 or the circuit board 21. Also, for example, the Ethernet relay unit 34 provides data provided from the circuit board 21 to one or a plurality of the Ethernet PHYs 32. Also, for example, the Ethernet relay unit 34 provides data provided from the CAN relay unit 35 to one or a plurality of the Ethernet PHYs 32. The Ethernet relay unit 34 has a table in which IDs given to data are associated with relay destinations, for example, and provides data that has been provided to appropriate relay destinations, in accordance with this table.

The CAN relay unit 35 performs processing for relaying data between the CAN transceivers 33, the Ethernet relay unit 34 and the circuit board 21. For example, the CAN relay unit 35 provides reception data provided from a CAN transceiver 33 to another CAN transceiver 33, the Ethernet relay unit 34 or the circuit board 21. Also, for example, the CAN relay unit 35 provides data provided from the circuit board 21 to one or a plurality of the CAN transceivers 33. Also, for example, the CAN relay unit 35 provides data provided from the Ethernet relay unit 34 to one or a plurality of the CAN transceivers 33. The CAN relay unit 35 has a table in which IDs given to data are associated with relay destinations, for example, and provides data that has been provided to appropriate relay destinations, in accordance with this table.

Also, in the present embodiment, exchange of data between the circuit board 21, the Ethernet relay unit 34 and the CAN relay unit 35 is performed in conformity with the SPI (Serial Peripheral Interface) communication protocol, for example. With the SPI communication protocol, communication is performed through transmission of four signals, and thus four signals are transmitted between the Ethernet relay unit 34 and the circuit board 21 and between the CAN relay unit 35 and the circuit board 21. The plurality of in-vehicle device-side terminals 36 provided in the connector 22 include eight terminals for transmitting and receiving these SPI signals. Note that, in FIG. 3, the plurality of in-vehicle device-side terminals 36 are indicated with white square symbols. Also, the plurality of in-vehicle device-side terminals 36 include two terminals for power supply from the circuit board 21, in addition to the terminals for SPI communication.

Also, the Ethernet relay unit 34 has the function of performing protocol conversion between the Ethernet communication protocol and the SPI communication protocol, in order to perform data relay between the Ethernet PHYs 32 and the circuit board 21. The Ethernet relay unit 34 performs protocol conversion on data compliant with the Ethernet communication standard provided from the Ethernet PHYs 32 to obtain data compliant with the SPI communication standard, and provides this data to the circuit board 21. Also, the Ethernet relay unit 34 performs protocol conversion on data compliant with the SPI communication protocol provided from the circuit board 21 to obtain data compliant with the Ethernet communication standard, and provides this data to the Ethernet PHYs 32

Similarly, the CAN relay unit 35 has a function of performing protocol conversion between the CAN communication protocol and the SPI communication protocol, in order to perform data relay between the CAN transceivers 33 and the circuit board 21. The CAN relay unit 35 performs protocol conversion on data compliant with the CAN communication standard provided from the CAN transceivers 33 to obtain data compliant with SPI communication protocol, and provides this data to the circuit board 21. Also, the CAN relay unit 35 performs protocol conversion on data compliant with the SPI communication protocol provided from the circuit board 21 to obtain data compliant with the CAN communication protocol, and provides this data to the CAN transceivers 33.

Also, in order to exchange data between the Ethernet relay unit 34 and the CAN relay unit 35, the connector 22 is provided with a function of performing protocol conversion between the Ethernet communication protocol and the CAN communication protocol. In the present embodiment, the Ethernet relay unit 34 is provided with a function of performing Ethernet-CAN protocol conversion. The Ethernet relay unit 34 converts data compliant with the Ethernet communication protocol provided from the Ethernet PHYs 32 into data compliant with the CAN communication protocol, and provides the resultant data to the CAN relay unit 35. Also, the Ethernet relay unit 34 converts data compliant with the CAN communication protocol provided from the CAN relay unit 35 into data compliant with the Ethernet communication protocol, and provides the resultant data to the Ethernet PHYs 32.

The Ethernet-CAN protocol conversion function may, however, be provided in the CAN relay unit 35, or a functional block that performs this protocol conversion may be provided between the Ethernet relay unit 34 and the CAN relay unit 35. Alternatively, instead of performing protocol conversion directly between the Ethernet communication protocol and the CAN communication protocol, conversion to an intermediate protocol different from Ethernet or CAN may be performed, and data exchange with this intermediate protocol may be performed between the Ethernet relay unit 34 and the CAN relay unit 35. That is, the Ethernet relay unit 34 converts data compliant with the Ethernet communication protocol provided from the Ethernet PHYs 32 into data compliant with the intermediate protocol, and provides the resultant data to the CAN relay unit 35, and converts data compliant with the intermediate protocol provided from the CAN relay unit 35 into data compliant with the Ethernet communication protocol, and provides the resultant data to the Ethernet PHYs 32. Also, the CAN relay unit 35 converts data compliant with the CAN communication protocol provided from the CAN transceivers 33 into data compliant with the intermediate protocol, and provides the resultant data to the Ethernet relay unit 34, and converts data compliant with the intermediate protocol provided from the Ethernet relay unit 34 into data compliant with the CAN communication protocol, and provides the resultant data to the CAN transceivers 33. The SPI communication protocol, for example, can be employed as the intermediate protocol.

In the connector 22 according to the present embodiment, the abovementioned Ethernet PHYs 32, CAN transceivers 33, Ethernet relay unit 34 and CAN relay unit 35 are provided in a single IC as a communication IC 40. Power that is output by the power supply circuit 38 of the circuit board 21 is supplied to the communication IC 40, and operations of the various components are performed based on this power.

Figure 4:
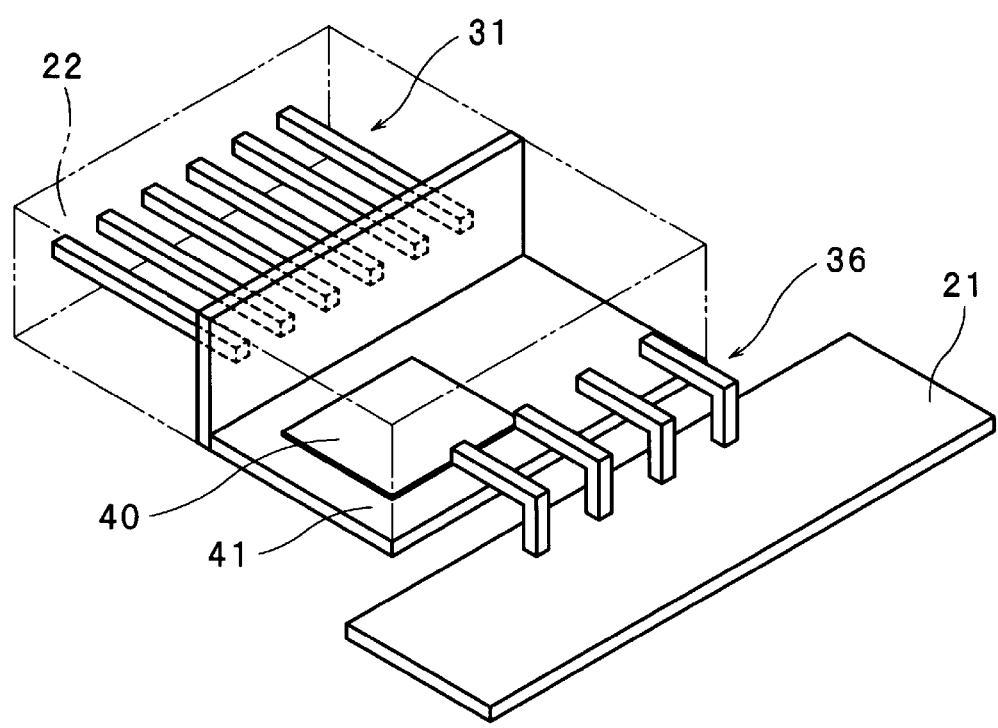
FIG. 4 is a schematic diagram for describing the configuration of a connector according to the embodiment.

FIG. 4 is a schematic diagram for describing the configuration of the connector 22 according to the present embodiment. In the connector 22 according to the present embodiment, a plurality of rod-like harness-side terminals 31 are provided side by side in a row in a rectangular parallelepiped housing. The harness-side terminals 31 are connected to a connector board 41 housed in the housing, and are electrically connected to the communication IC 40 mounted on the connector board 41, via a wiring pattern provided on the connector board 41. The connector board 41 is a circuit board having a flat rectangular shape, with the plurality of harness-side terminals 31 being connected on one edge side thereof, and the plurality of in-vehicle device-side terminals 36 being connected on the opposite edge side.

The in-vehicle device-side terminals 36 are rod-like terminals with an approximately L-shaped bend. The plurality of the in-vehicle device-side terminals 36 are provided side by side in a row, so as to protrude externally from one surface of the housing of the connector 22. The in-vehicle device-side terminals 36 are electrically connected to the communication IC 40 via a wiring pattern provided on the connector board 41. The connector 22 is mounted on the circuit board 21, by being soldered in a state where end portions of the in-vehicle device-side terminals 36 are inserted into through holes formed in the circuit board 21, for example.

The connector 22 according to the present embodiment having the above configuration is mounted on the circuit board 21 of the high-performance ECU 2, and is detachably connected of the wire harness 51 in which the plurality of communication lines 11, 13, 14, 15 and 16 are bundled. The connector 22 is provided with the plurality of in-vehicle device-side terminals 36 electrically connected to the circuit board 21 and the plurality of harness-side terminals 31 to which the communication lines 11, 13, 14, 15 and 16 of the wire harness 51 are electrically connected. Also, the connector 22 is provided with the Ethernet relay unit 34 and the CAN relay unit 35 that are interposed between the in-vehicle device-side terminals 36 and the harness-side terminals 31. The Ethernet relay unit 34 and the CAN relay unit 35 relay communication between the plurality of communication lines 11, 13, 14, 15 and 16 included in the wire harness 51, and relay communication between the communication lines 11, 13, 14, 15 and 16 and the circuit board 21.

Due to the Ethernet relay unit 34 and the CAN relay unit 35 provided in the connector 22 relaying communication, the control circuit 37 provided on the circuit board 21 of the high-performance ECU 2 does not need to perform relay-related processing, enabling the processing load to be reduced. Also, changes in the communication specification and the like can be addressed by changing the connector 22 of the high-performance ECU 2, thus enabling the scalability of the high-performance ECU 2 to be improved.

Also, in the in-vehicle communication system according to the present embodiment, the plurality of communication lines 11, 13, 14, 15 and 16 included in the wire harness 51 include the communication lines 11, 13 and 14 that are used for Ethernet communication and the communication lines 15 and 16 that are used for CAN communication. The Ethernet relay unit 34 and CAN relay unit 35 of the connector 22 perform protocol conversion between the Ethernet communication protocol and the CAN communication protocol. The Ethernet relay unit 34 and CAN relay unit 35 of the connector 22 are thereby able to relay communication, even in the case where the wire harness 51 includes communication lines that are used for different communication protocols.

Also, the Ethernet relay unit 34 and CAN relay unit 35 of the connector 22 according to the present embodiment perform communication that uses the SPI communication protocol with the circuit board 21 of the high-performance ECU 2. The Ethernet relay unit 34 performs protocol conversion between the Ethernet communication protocol and the SPI communication protocol, and the CAN relay unit 35 performs protocol conversion between the CAN communication protocol and the SPI communication protocol. The connector 22 is thereby able to perform conversion between the communication protocol that is used in external communication of the high-performance ECU 2 and the communication protocol that is used in internal communication of the high-performance ECU 2, and relay communication between the inside and outside of the high-performance ECU 2.

Also, in the high-performance ECU 2 according to the present embodiment, the power supply circuit 38 that converts the voltage value of power that is supplied from the battery 1a of the vehicle 1 is provided on the circuit board 21. The plurality of in-vehicle device-side terminals 36 of the connector 22 include terminals for supplying power obtained through conversion by the power supply circuit 38. Power is supplied from the power supply circuit 38 to components such as the Ethernet relay unit 34 and CAN relay unit 35 of the connector 22 via these terminals, and the components operate with the supplied power. Since the connector 22 does not need to be provided with a power supply circuit, effects such as miniaturization of the connector 22 can thereby be expected.

Also, the connector 22 according to the present embodiment has a configuration in which the Ethernet relay unit 34 and CAN relay unit 35 and the Ethernet PHYs 32 and CAN transceivers 33 are provided in a single communication IC 40, and this communication IC 40 is mounted on the connector board 41. Effects such as cost reduction and miniaturization of the connector 22 can thereby be expected.

Note that, in the present embodiment, an example employing Ethernet, CAN and SPI as communication protocols was described, but communication protocols other than these may be employed. For example, a communication protocol such as LIN (Local Interconnect Network) or FlexRay may be employed, instead of the Ethernet or CAN communication protocol. Also, a communication protocol such as MII (Media Independent Interface), RGMII (Reduced Gigabit MII) or SGMII (Serial Gigabit MII) may be employed, instead of the SPI communication protocol. Also, communication between the connector 22 and the circuit board 21 may be performed by the Ethernet or CAN communication protocol. Also, communication and power supply between the connector 22 and the circuit board 21 may be performed with the PoE (Power over Ethernet) protocol.

First Variation

Figure 5:
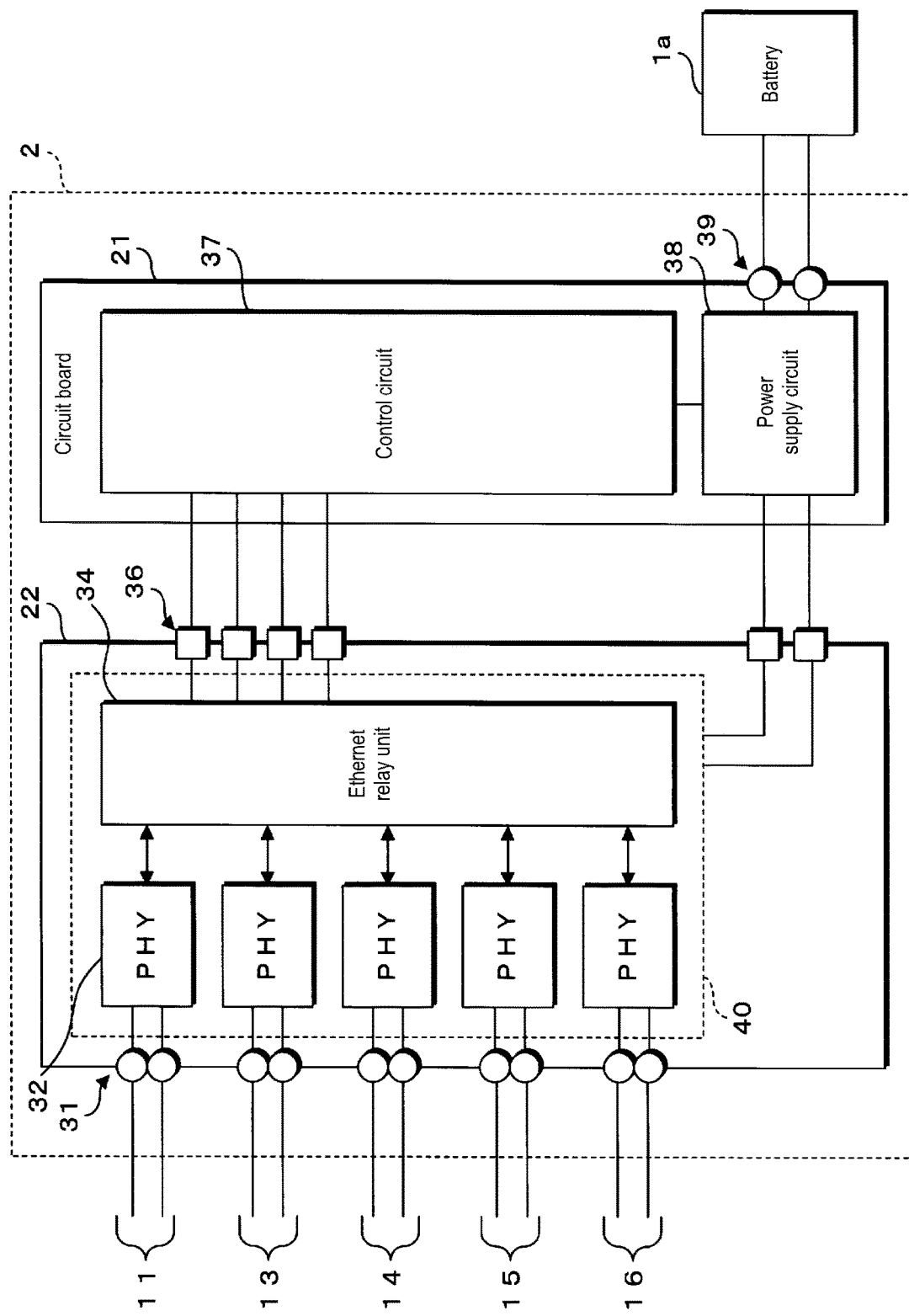
FIG. 5 is a block diagram showing the configuration of a high-performance ECU according to a first variation of the first embodiment.

FIG. 5 is a block diagram showing the configuration of a high-performance ECU 2 according to a first variation of the first embodiment. The connector 22 according to the first variation has a configuration in which the Ethernet relay unit 34 is provided and the CAN relay unit 35 is not provided. The connector 22 according to the first variation is for connecting a wire harness 51 in which the communication lines 11, 13, 14, 15 and 16 that are included are all communication lines that are used in communication compliant with the Ethernet communication standard. The Ethernet relay unit 34 according to the first variation relays communication between the five communication lines 11, 13, 14, 15 and 16, and relays communication between the communication lines 11, 13, 14, 15 and 16 and the circuit board 21.

Second Variation

Figure 6:
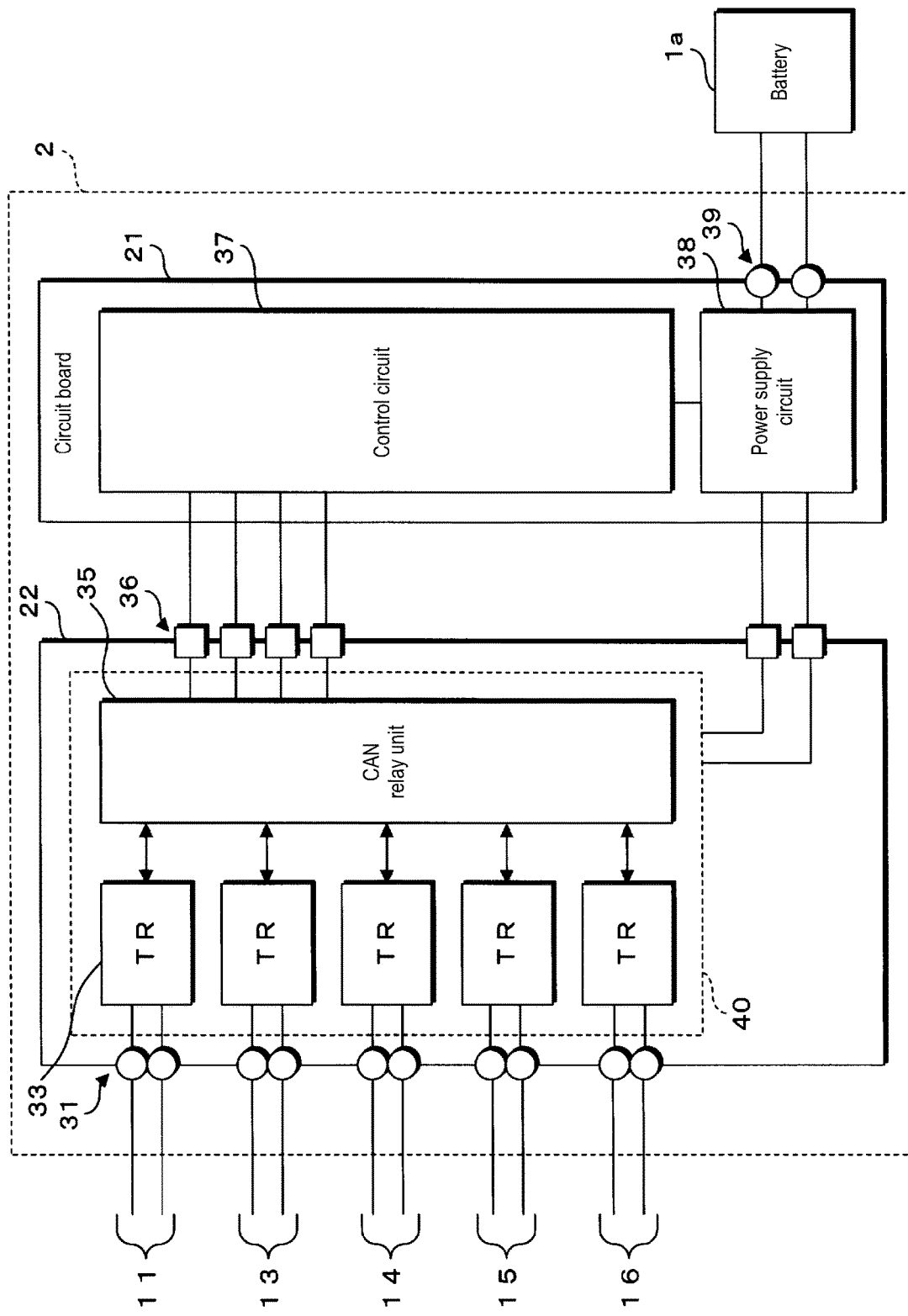
FIG. 6 is a block diagram showing the configuration of a high-performance ECU according to a second variation of the first embodiment.

FIG. 6 is a block diagram showing the configuration of a high-performance ECU 2 according to a second variation of the first embodiment. The connector 22 according to the second variation has a configuration in which the CAN relay unit 35 is provided and the Ethernet relay unit 34 is not provided. The connector 22 according to the second variation is for connecting a wire harness 51 in which the communication lines 11, 13, 14, 15 and 16 that are included are all communication lines that are used in communication compliant with the CAN communication standard. The CAN relay unit 35 according to the first variation relays communication between the five communication lines 11, 13, 14, 15 and 16, and relays communication between the communication lines 11, 13, 14, 15 and 16 and the circuit board 21.

Third Variation

Figure 7:
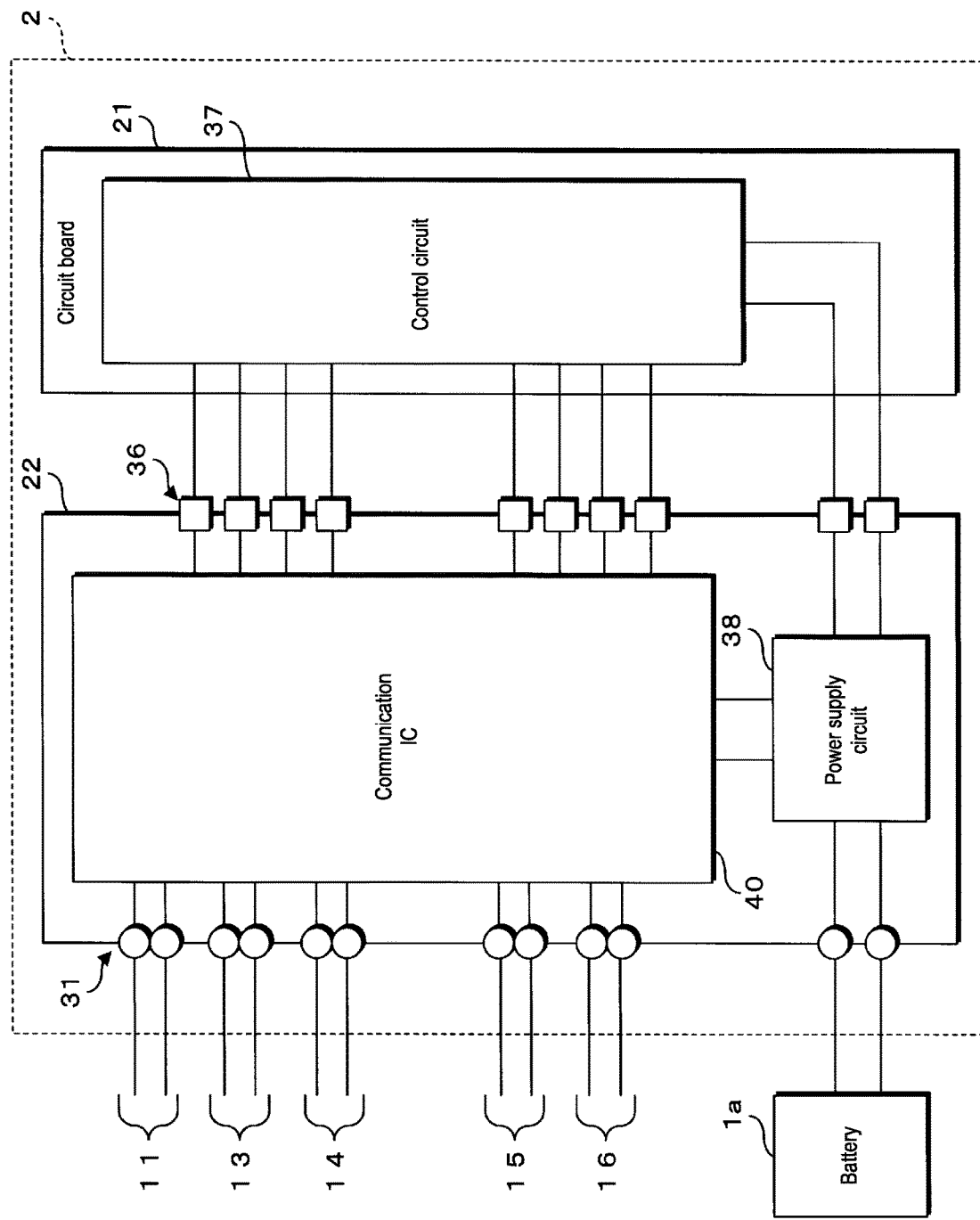
FIG. 7 is a block diagram showing the configuration of a high-performance ECU according to a third variation of the first embodiment.

FIG. 7 is a block diagram showing the configuration of a high-performance ECU 2 according to a third variation of the first embodiment. The high-performance ECU 2 according to the third variation has a configuration in which the power supply circuit 38 is provided in the connector 22, and the power supply circuit 38 is not provided on the circuit board 21. The plurality of harness-side terminals 31 provided in the connector 22 according to the third variation include terminals that are connected to the power line that receives power supply from the battery 1a of the vehicle 1. The power supply circuit 38 of the connector 22 converts power having a voltage value of 12 V, for example, that is supplied from the battery 1a into power having a voltage value such as 3 V or 5 V, and outputs the resultant power. The power that is output by the power supply circuit 38 is supplied to the communication IC 40 of the connector 22, along with being supplied to the control circuit 37 of the circuit board 21 via the in-vehicle device-side terminals 36.

In the connector 22 according to the third variation having the above configuration, the plurality of harness-side terminals 31 include terminals to which the power line that supplies power from the battery 1a of the vehicle 1 is connected. The connector 22 is provided with the power supply circuit 38 that converts the voltage value of power that is supplied via the power lines connected to these terminals. In the connector 22, power is supplied to the communication IC 40 which includes components such as the Ethernet relay unit 34 and CAN relay unit 35 from the power supply circuit 38, and the communication IC 40 operates with the supplied power. Also, the plurality of in-vehicle device-side terminals 36 of the connector 22 include terminals that receive supply of power whose voltage value has been converted by the power supply circuit 38, and power is supplied to the circuit board 21 of the high-performance ECU 2 via these terminals. Since the power supply circuit 38 does not need to be provided on the circuit board 21 of the high-performance ECU 2, effects such as miniaturization of the circuit board 21 can thereby be expected.

Fourth Variation

Figure 8:
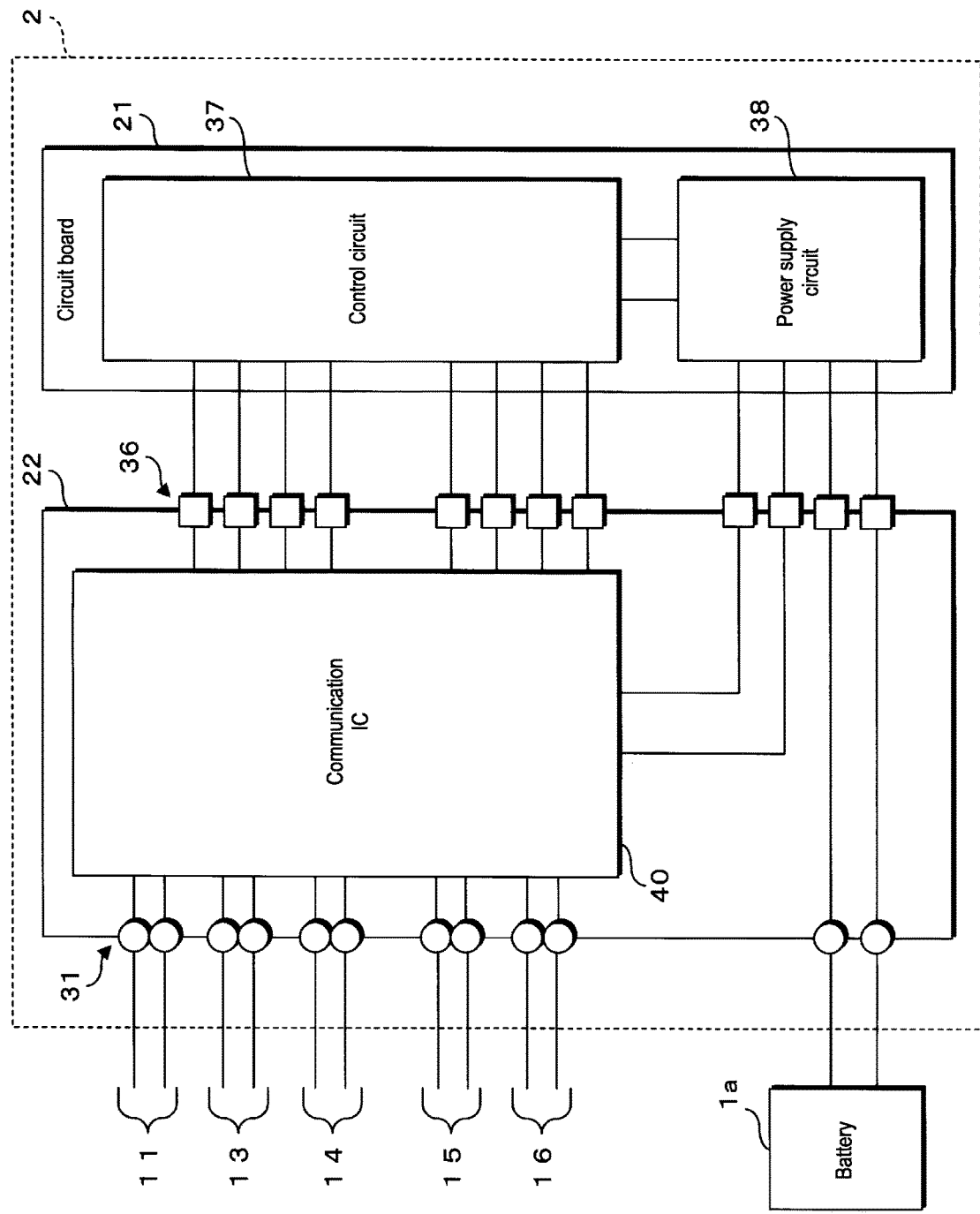
FIG. 8 is a block diagram showing the configuration of a high-performance ECU according to a fourth variation of the first embodiment.

FIG. 8 is a block diagram showing the configuration of a high-performance ECU 2 according to a fourth variation of the first embodiment. The high-performance ECU 2 according to the fourth variation has a configuration in which the power supply circuit 38 is provided on the circuit board 21 but the power line from the battery 1a is connected to the connector 22. The plurality of harness-side terminals 31 provided in the connector 22 according to the fourth variation include terminals to which the power line from the battery 1a of the vehicle 1 is connected. Also, the plurality of in-vehicle device-side terminals 36 provided in the connector 22 according to the fourth variation include terminals for supplying power from the battery 1a to the power supply circuit 38 of the circuit board 21 and terminals for receiving power supply from the power supply circuit 38.

In the high-performance ECU 2 according to the fourth variation, power having a voltage value of 12 V, for example, that is supplied from the battery 1a is supplied directly from the harness-side terminals 31 of the connector 22 to the in-vehicle device-side terminals 36, and is input to the power supply circuit 38 of the circuit board 21. The power supply circuit 38 converts this 12 V power into power having a voltage value such as 3 V or 5 V, and outputs the resultant power. Power output by the power supply circuit 38 is provided to the control circuit 37 of the circuit board 21, along with being input to the in-vehicle device-side terminals 36 of the connector 22 and provided to the communication IC 40 in the connector 22.

In the high-performance ECU 2 according to the fourth variation having the above configuration, the power supply circuit 38 does not need to be provided in the connector 22, thus enabling effects such as miniaturization of the connector 22 to be expected. Also, the power line from the battery 1a can be connected to the connector 22, and the external connection of wires can be consolidated in the connector 22.

Fifth Variation

Figure 9:
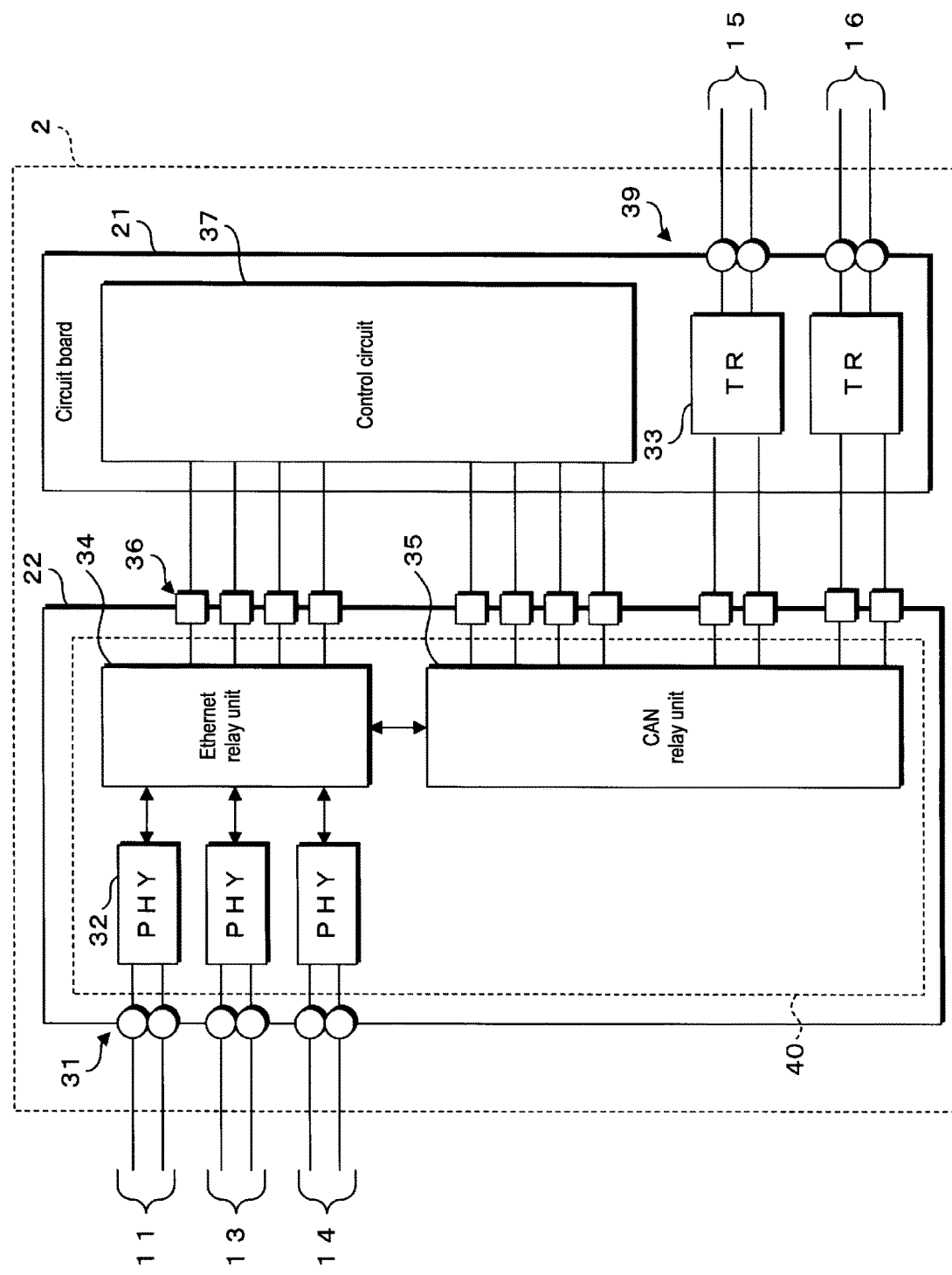
FIG. 9 is a block diagram showing the configuration of a high-performance ECU according to a fifth variation of the first embodiment.

FIG. 9 is a block diagram showing the configuration of a high-performance ECU 2 according to a fifth variation of the first embodiment. Note that, in FIG. 9, illustration of the power supply circuit 38 and configuration associated therewith has been omitted. The high-performance ECU 2 according to the fifth variation has a configuration in which the CAN transceivers 33 are provided on the circuit board 21. The wire harness 51 connected to the connector 22 includes the communication lines 11, 13 and 15 that are used in communication compliant with the Ethernet communication protocol, and does not include the communication lines 15 and 16 that are used in communication compliant with the CAN communication protocol. The communication lines 15 and 16 that are used in communication compliant with the CAN communication protocol are connected to the board terminal 39 provided on the circuit board 21. The CAN transceivers 33 are electrically connected to the board terminals 39, and the CAN transceivers 33 transmit and receive signals with respect to the communication lines 15 and 16 connected to the board terminals.

The plurality of harness-side terminals 31 provided in the connector 22 according to the fifth variation include terminals to which the communication lines 11, 13 and 14 for performing communication compliant with the Ethernet communication protocol are connected, and do not include terminals to which the communication lines 15 and 16 for performing communication compliant with the CAN communication protocol are connected. The plurality of in-vehicle device-side terminals 36 provided in the connector 22 include terminals for exchanging information with the CAN transceivers 33 provided on the circuit board 21. The CAN relay unit 35 of the connector 22 is thereby able to exchange transmission data, reception data and the like with the CAN transceivers 33 of the circuit board 21. Also, the communication IC 40 of the connector 22 according to the fifth variation is obtained by configuring the Ethernet PHYs 32, the Ethernet relay unit 34 and the CAN relay unit 35 as a single IC.

Sixth Variation

Figure 10:
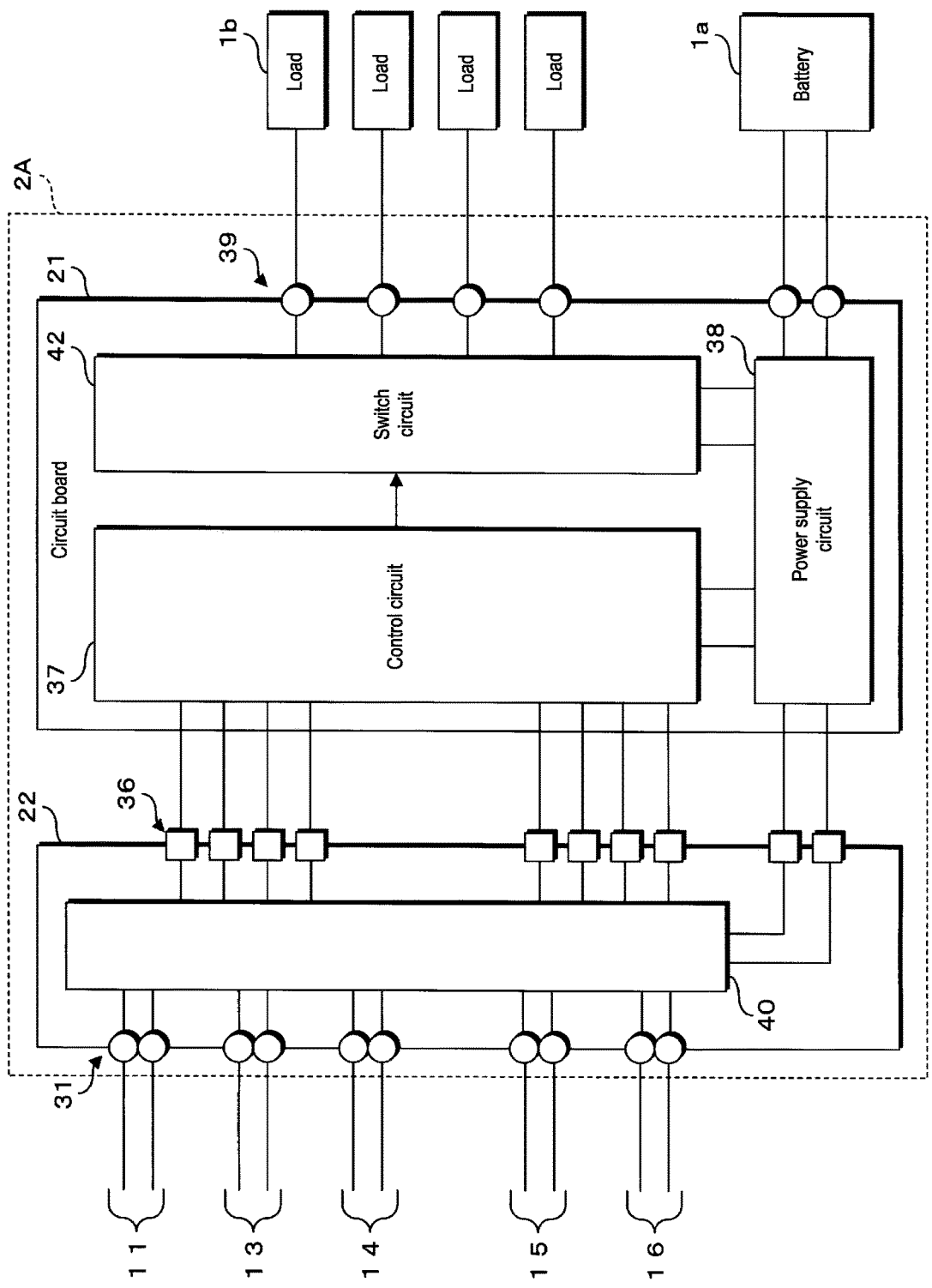
FIG. 10 is a block diagram showing the configuration of a power supply device according to a sixth variation of the first embodiment.

FIG. 10 is a block diagram showing the configuration of a power supply device 2A according to a sixth variation of the first embodiment. The sixth variation is an example in which the abovementioned configuration is applied to a power supply device 2A that supplies power to various loads 1b installed in the vehicle 1, instead of being applied to the high-performance ECU 2. In the power supply device 2A according to the sixth variation, a connector 22 having the same configuration as that shown in FIG. 3 is mounted on the circuit board 21. The circuit board 21 of the power supply device 2A according to the sixth variation is provided with a switch circuit 42, in addition to the control circuit 37 and the power supply circuit 38. Also, the plurality of board terminals 39 provided on the circuit board 21 include terminals to which the power line from the battery 1a is connected, and terminals to which power lines for supplying power to the loads 1b, are connected.

The switch circuit 42 is a circuit that receives supply of power from the power supply circuit 38, and switches between supplying and not supplying this power to the loads 1b. The switch circuit 42 is provided with a plurality of switching elements such as semiconductor switches or relays, and switches between supplying and not supplying power to the loads 1b, by turning the respective switching elements on/off in accordance with control by the control circuit 37. The control circuit 37 controls switching between supplying and not supplying power to the loads 1b of the vehicle 1, based on data that is transmitted and received via the communication lines 11, 13, 14, 15 and 16 of the wire harness 51.

As exemplified by the power supply device 2A according to the sixth variation, the connector 22 according to the present embodiment can be used in a variety of in-vehicle devices apart from the high-performance ECU 2.

Seventh Variation

Figure 11:
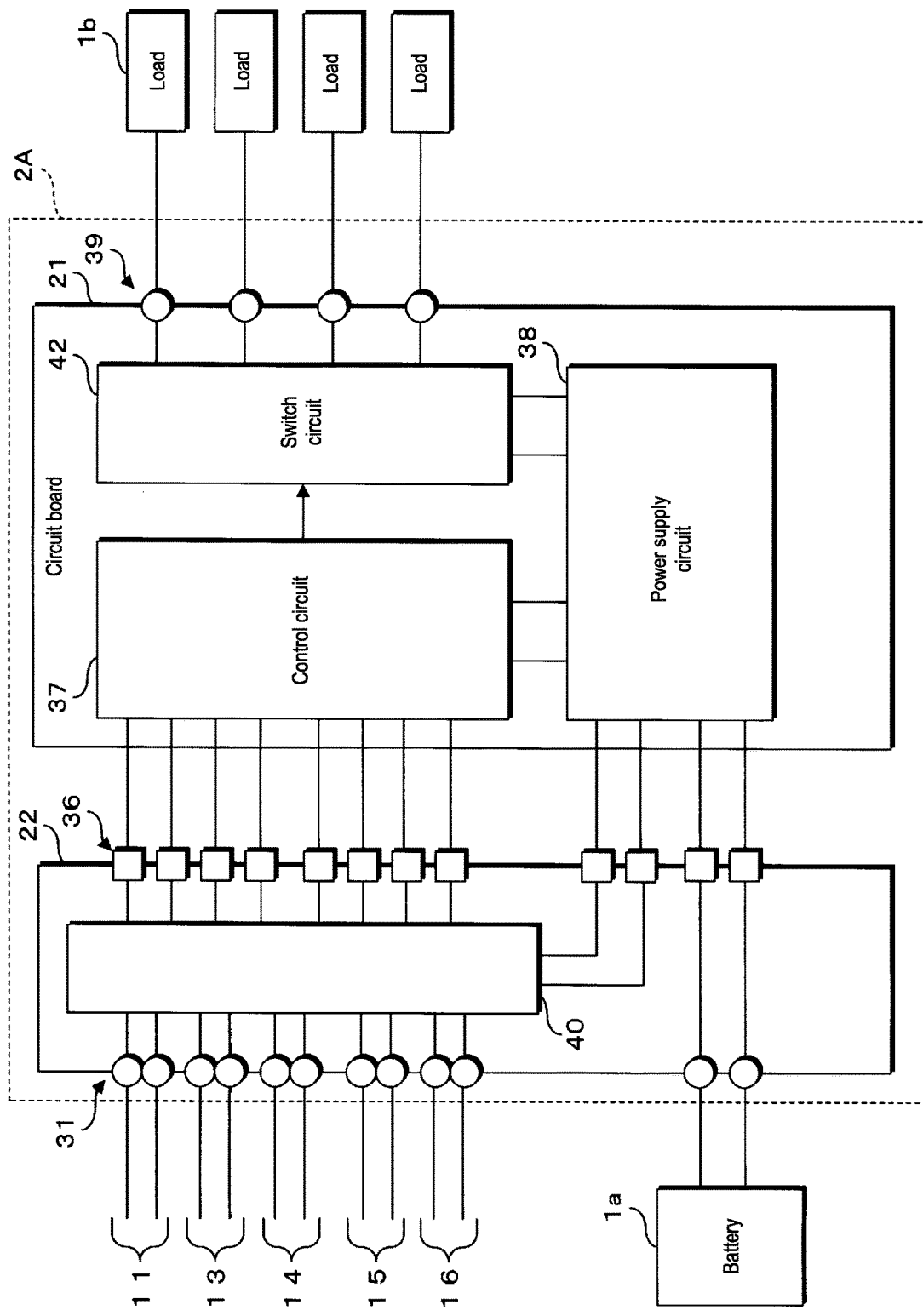
FIG. 11 is a block diagram showing the configuration of a power supply device according to a seventh variation of the first embodiment.

FIG. 11 is a block diagram showing the configuration of a power supply device 2A according to a seventh variation of the first embodiment. The power supply device 2A according to the seventh variation corresponds to that in which the configuration of the connector 22 according to the fourth variation shown in FIG. 8 is applied to the power supply device 2A according to the sixth variation shown in FIG. 10. That is, in the power supply device 2A according to the seventh variation, the harness-side terminals 31 of the connector 22 include terminals to which the communication lines 11, 13, 14, 15 and 16 are connected and terminals to which the power line from the battery 1a of the vehicle 1 is connected. Also, the plurality of in-vehicle device-side terminals 36 provided in the connector 22 according to the seventh variation include terminals for exchanging information between the communication IC 40 and the control circuit 37 of the circuit board 21, terminals for supplying power from the battery 1a to the power supply circuit 38 of the circuit board 21, and terminals for receiving power supply from the power supply circuit 38.

That is, the power supply device 2A according to the seventh variation is provided with a power supply path that is routed from the harness-side terminals 31 to which the power line from the battery 1a is connected to the power supply circuit 38 of the circuit board 21, through the inside of the connector 22, the in-vehicle device-side terminals 36, the wiring pattern of the circuit board 21, and the like. Also, the power supply device 2A is provided with a power supply path that is routed from the power supply circuit 38 of the circuit board 21 to the communication IC 40, through the wiring pattern of the circuit board 21, the in-vehicle device-side terminals 36, the inside of the connector 22, and the like.

With the power supply device 2A according to the seventh variation, power having a voltage value of 12 V, for example, that is supplied from the battery 1a is supplied directly from the harness-side terminals 31 of the connector 22 to the in-vehicle device-side terminals 36, and input to the power supply circuit 38 of the circuit board 21. The power supply circuit 38 converts this 12 V power into power having a voltage value such as 3 V or 5 V, and outputs the resultant power. The power output by the power supply circuit 38 is provided to the control circuit 37 and the switch circuit 42 of the circuit board 21, along with being input to the in-vehicle device-side terminals 36 of the connector 22 and provided to the communication IC 40 in the connector 22.

The power supply device 2A according to the seventh variation having the above configuration is able to connect the power line from the battery 1a to the connector 22, and is able to consolidate connection between this power line and the plurality of communication lines 11, 13, 14, 15 and 16 in the connector 22.

Eighth Variation

Figure 12:
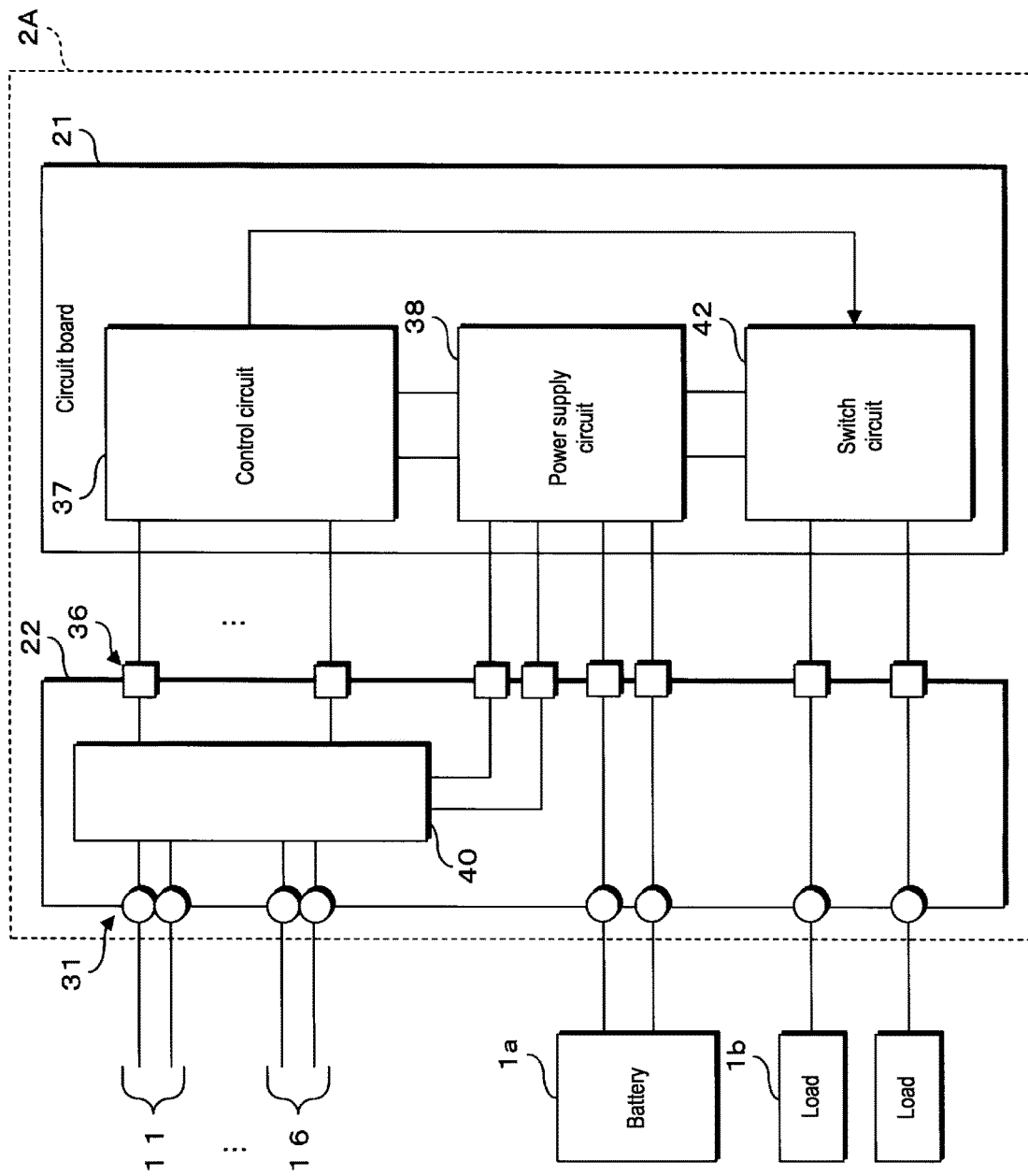
FIG. 12 is a block diagram showing the configuration of a power supply device according to an eighth variation of the first embodiment.

FIG. 12 is a block diagram showing the configuration of a power supply device 2A according to an eighth variation of the first embodiment. The power supply device 2A according to the eighth variation is configured such that the power lines that supply power to the loads 1b are connectable to the connector 22, compared with the power supply device 2A according to the seventh variation. That is, in the power supply device 2A according to the eighth variation, the harness-side terminals 31 of the connector 22 include terminals to which the communication lines 11, 13, 14, 15 and 16 are connected, terminals to which the power line from the battery 1a of the vehicle 1 is connected, and terminals to which the power lines to the loads 1b of the vehicle 1 are connected. Also, the in-vehicle device-side terminals 36 of the connector 22 according to the eighth variation include terminals for exchanging information between the communication IC 40 and the control circuit 37 of the circuit board 21, terminals for supplying power from the battery 1a to the power supply circuit 38 of the circuit board 21, terminals for receiving power supply from the power supply circuit 38, and terminals for receiving power supply from the switch circuit 42 of the circuit board 21.

That is, the power supply device 2A according to the eighth variation is provided with a power supply path that is routed from the power supply circuit 38 of the circuit board 21 to the power lines to which the loads 1b are connected, through the wiring pattern of the circuit board 21, the switch circuit 42, the in-vehicle device-side terminals 36, the inside of the connector 22, and the harness-side terminals 31.

The power supply device 2A according to the eighth variation having the above configuration is able to connect the plurality of communication lines 11, 13, 14, 15 and 16, the power line from the battery 1a and the power lines to the loads 1b to the connector 22, and is able to consolidate connection of these plurality of wires in the connector 22.

Ninth Variation

Figure 13:
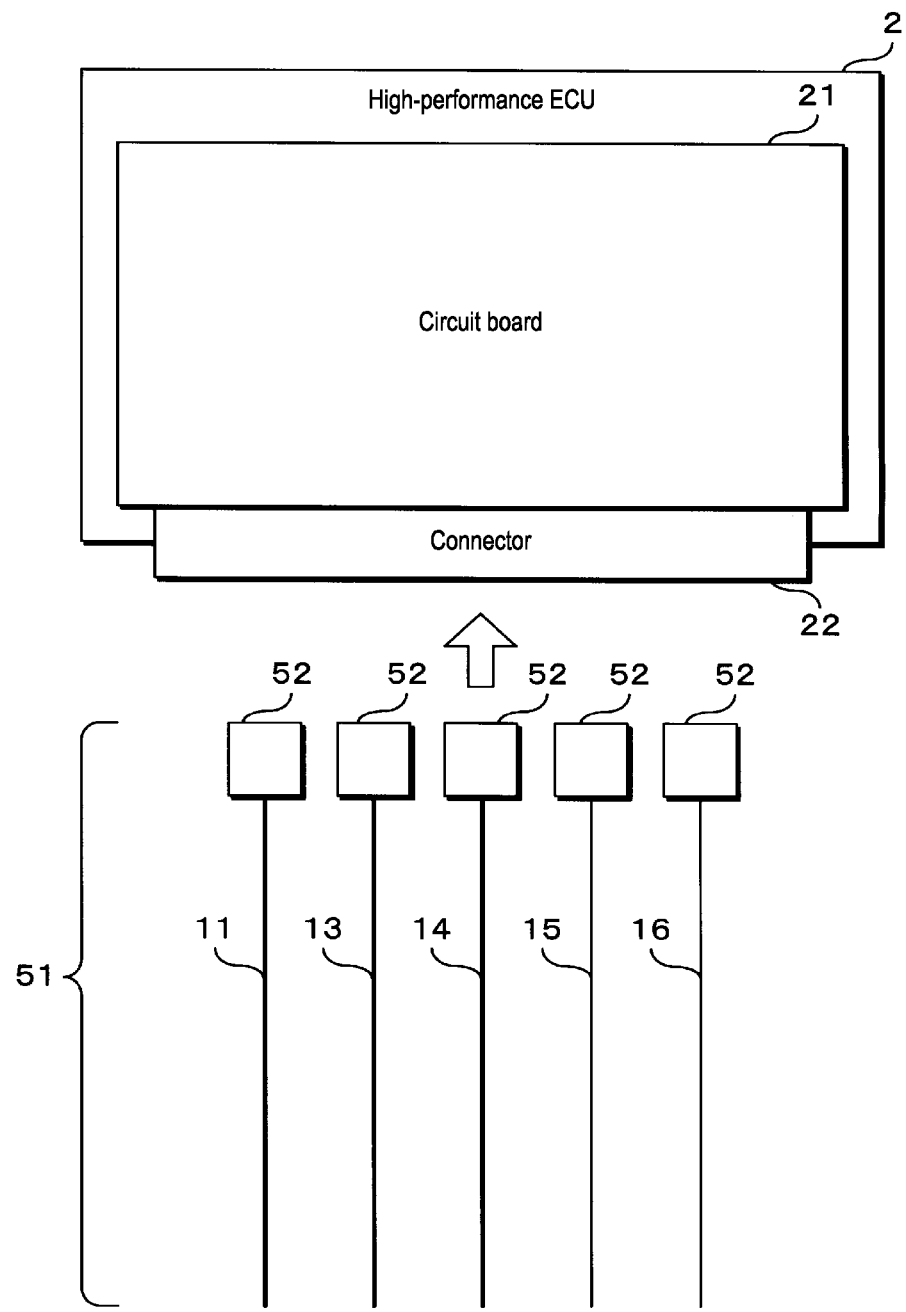
FIG. 13 is a schematic diagram for describing the connection between a high-performance ECU and communication lines according to a ninth variation of the first embodiment.

FIG. 13 is a schematic diagram for describing the connection between the communication lines 11, 13, 14, 15 and 16 and the high-performance ECU 2 according to a ninth variation of the first embodiment. The plurality of communication lines 11, 13, 14, 15 and 16 are individually connected to the connector 22 of the high-performance ECU 2 according to the ninth variation, rather than the wire harness 51 in which the plurality of communication lines 11, 13, 14, 15 and 16 are bundled being connected. The connector 52 is individually provided in each of the communication lines 11, 13, 14, 15 and 16. The connectors 52 of these plurality of communication lines 11, 13, 14, 15 and 16 are detachably connected to the connector 22 of the high-performance ECU 2.

Processing such as communication processing or relay processing by the high-performance ECU 2 according to the ninth variation is similar to the processing by the high-performance ECU 2 according to the abovementioned first embodiment.

Note that, in the ninth variation, a configuration was adopted in which the five communication lines 11, 13, 14, 15 and 16 are individually connected to the high-performance ECU 2, but the present invention is not limited thereto. For example, a configuration may be adopted in which the communication lines 11, 13 and 14 that are used in communication compliant with the Ethernet communication protocol are bundled to form a single wire harness, the communication lines 15 and 16 that are used in communication compliant with the CAN communication protocol are bundled to form a single wire harness, and these two wire harnesses are connected to the connector 22 of the high-performance ECU 2. The number of communication lines or wire harnesses connected to the connector 22 of the high-performance ECU 2, the number of communication lines included in the wire harnesses or the like may be set as appropriate according to the configuration of the in-vehicle communication system.

Tenth Variation

Figure 14:
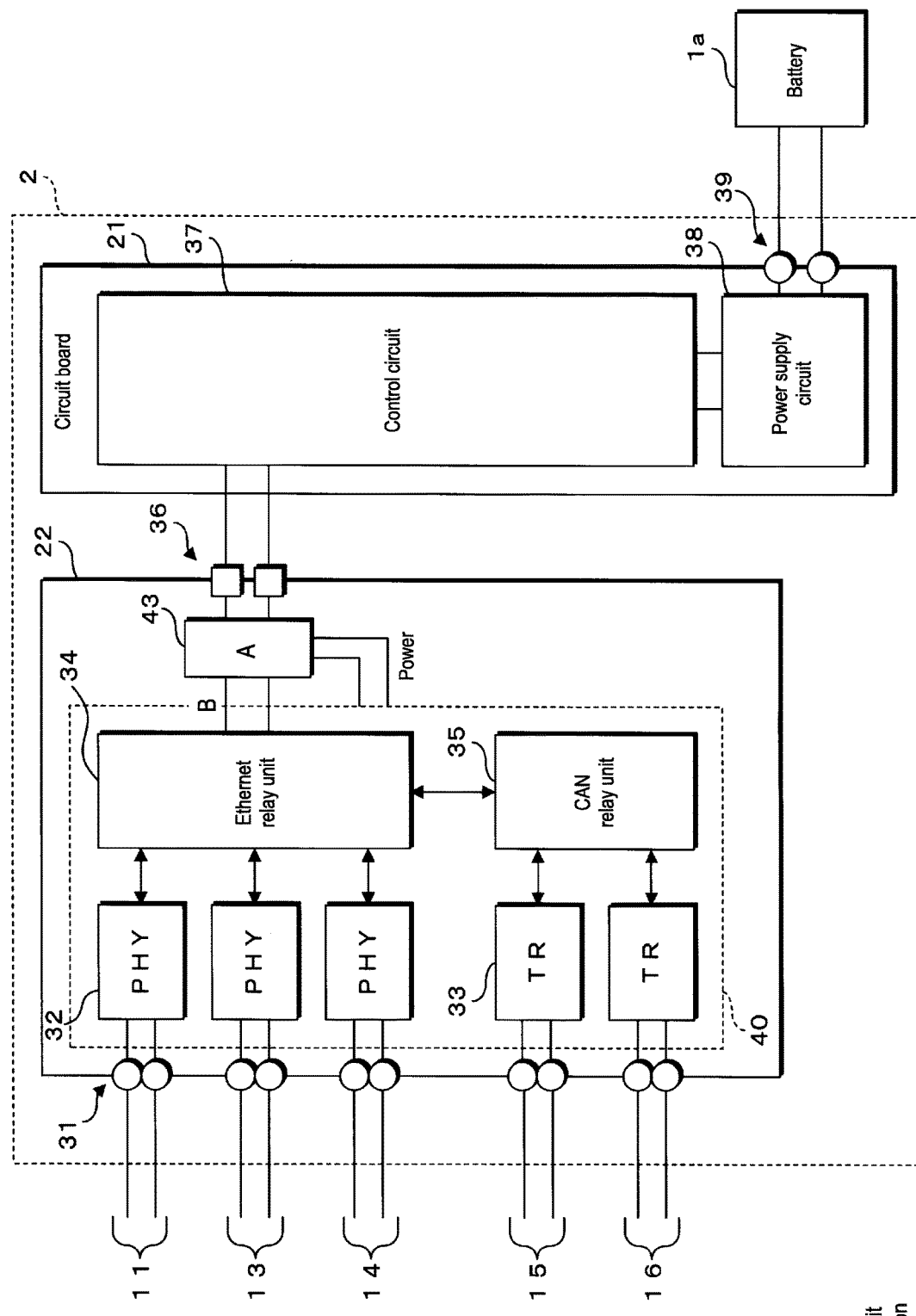
FIG. 14 is a block diagram showing the configuration of a high-performance ECU according to a tenth variation of the first embodiment.

FIG. 14 is a block diagram showing the configuration of a high-performance ECU 2 according to a tenth variation of the first embodiment. The high-performance ECU 2 according to the tenth variation performs communication compliant with the PoE communication protocol, rather than communication compliant with the SPI communication protocol, between the control circuit 37 of the circuit board 21 and the Ethernet relay unit 34 of the connector 22.

With the PoE protocol, it is possible to perform communication and power supply with common lines. Thus, in the high-performance ECU 2 according to the tenth variation, power supply compliant with the PoE protocol from the control circuit 37 to the communication IC 40 is performed, rather than power being directly supplied from the power supply circuit 38 mounted on the circuit board 21 to the communication IC 40 of the connector 22.

In the high-performance ECU 2 according to the tenth variation, the control circuit 37 of the circuit board 21 and the in-vehicle device-side terminals 36 of the connector 22 are electrically connected by common lines (wiring pattern provided on the circuit board 21, etc.) for performing PoE communication and power supply. The connector 22 is provided with a separation unit 43 that separates power and signals for communication from the common lines. The separation unit 43 has a filter circuit or the like, for example, and separates and outputs signals and power from the PoE common lines. The signals separated with the separation unit 43 are input to the Ethernet relay unit 34, and power is supplied to the communication IC 40.

Also, in the high-performance ECU 2 according to the tenth variation, direct communication is not performed between control circuit 37 of the circuit board 21 and the CAN relay unit 35 of the connector 22. The CAN relay unit 35 transmits data to be transmitted to the control circuit 37 to the Ethernet relay unit 34, and the Ethernet relay unit 34 transmits this data to the control circuit 37. Also, the control circuit 37 transmits data to be transmitted to the CAN relay unit 35 to the Ethernet relay unit 34, and the Ethernet relay unit 34 transmits this data to the CAN relay unit 35. A configuration may, however, be adopted in which the control circuit 37 and the CAN relay unit 35 perform communication compliant with a communication protocol such as SPI.

Also, a configuration may be adopted in which one or a plurality of the Ethernet communication lines 11, 13 and 14 that are connected to the high-performance ECU 2, for example, serve as communication lines that support PoE, and the high-performance ECU 2 receives power supply from another device installed in the vehicle 1 via these communication lines. In this case, the high-performance ECU 2 does not need to be provided with the power supply circuit 38, and supplies power separated from the PoE communication lines to components such as the communication IC 40 and the control circuit 37.

Second Embodiment

Figure 15:
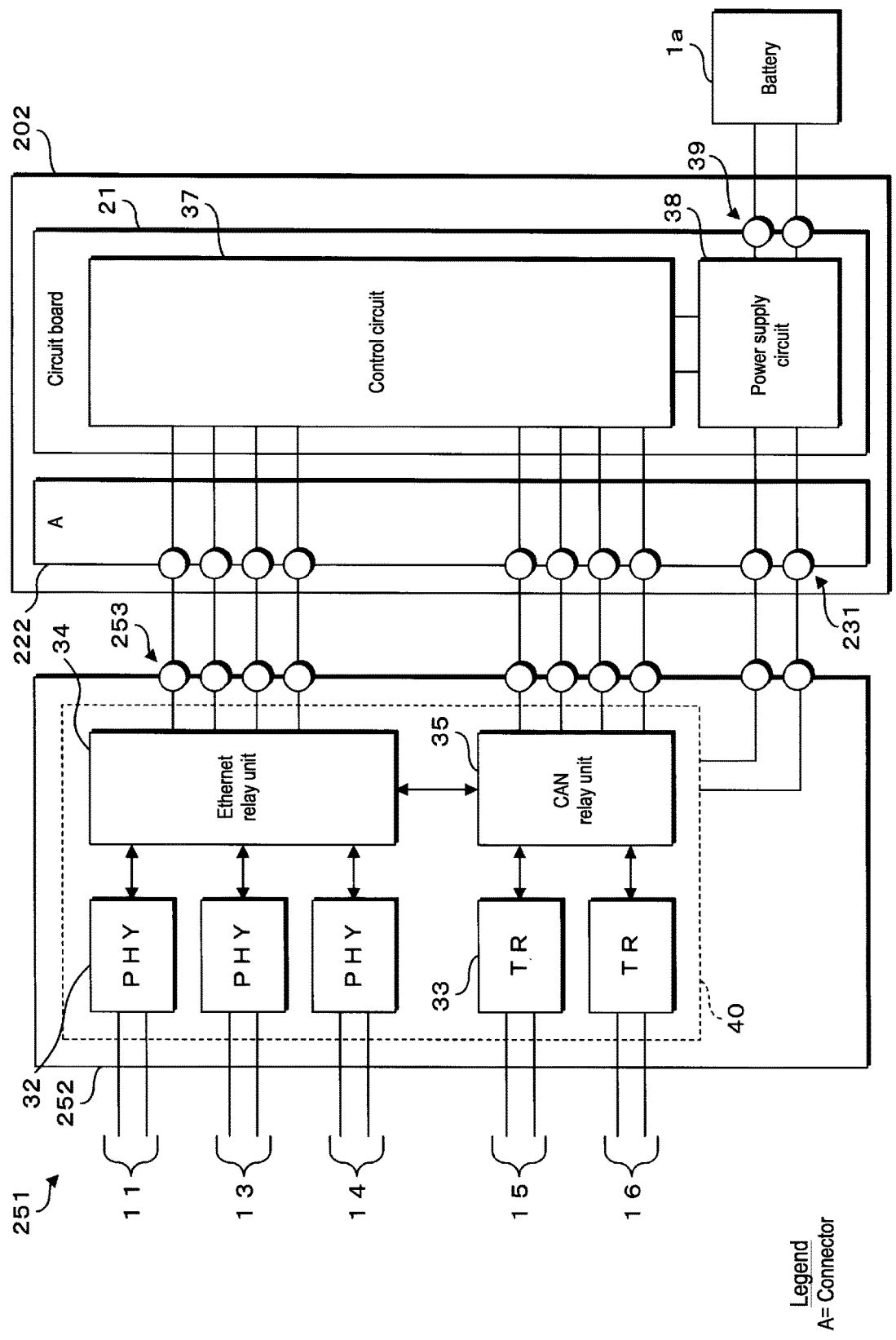
FIG. 15 is a block diagram showing the configuration of an in-vehicle communication system according to a second embodiment.

FIG. 15 is a block diagram showing the configuration of an in-vehicle communication system according to a second embodiment. In the abovementioned in-vehicle communication system according to the first embodiment, the connector 22 of the high-performance ECU 2 is provided with the communication relay function. In contrast, in the in-vehicle communication system according to the second embodiment, a connector 252 of a wire harness 251 is provided with the communication relay function, and a connector 222 of a high-performance ECU 202 is not provided with the communication relay function.

The connector 252 of the wire harness 251 according to the second embodiment has a configuration in which a connector board on which the communication IC 40 is installed is housed in a housing having a rectangular parallelepiped shape, for example, with the communication lines 11, 13, 14, 15 and 16 being connected to this connector board, and the communication IC 40 on the connector board and the communication lines 11, 13, 14, 15 and 16 being electrically connected. The communication lines 11, 13 and 14 that are used in communication compliant with the Ethernet communication protocol are each electrically connected to an Ethernet PHY 32 provided on the communication IC 40. The communication lines 15 and 16 that are used in communication compliant with the CAN communication protocol are each electrically connected to a CAN transceiver 33 provided on the communication IC 40.

Also, the connector 252 is provided with a plurality of terminals 253 that are connected to harness-side terminals 231 provided in the connector 222 of the high-performance ECU 202. The plurality of terminals 253 of the connector 252 include four terminals for the Ethernet relay unit 34 provided on the communication IC 40 to perform communication compliant with the SPI communication protocol with the control circuit 37 of the high-performance ECU 202, four terminals for the CAN relay unit 35 to perform communication compliant with the SPI communication protocol with the control circuit 37, and two terminals for receiving power supply from the power supply circuit 38 of the high-performance ECU 202.

The connector 222 of the high-performance ECU 202 according to the second embodiment is provided with the harness-side terminals 231 corresponding to the terminals 253 of the connector 252 of the wire harness 251. In the connector 222 according to the second embodiment, the harness-side terminals 231 and corresponding in-vehicle device-side terminals are integrally provided, with signals from the connector 252 of the connected wire harness 251 being directly provided to the circuit board 21, and signals from the circuit board 21 being directly provided to the connector 252 of the wire harness 251.

In the in-vehicle communication system according to the second embodiment having the above configuration, the connector 252 of the wire harness 251 is provided with the communication relay function. Even in cases such as an increase or decrease in the communication lines or a change in the transmission speed, for example, it thereby becomes possible to respond by replacing the wire harness 251, without the high-performance ECU 202 undergoing any particular modification or with slight modification.

Note that the configuration shown in the first to tenth variations of the first embodiment can be similarly employed for the in-vehicle communication system according to the second embodiment. Similarly to the first and second variations of the first embodiment, for example, the connector 252 of the wire harness 251 of the in-vehicle communication system according to the second embodiment may be provided with only either the Ethernet relay unit 34 or the CAN relay unit 35. Also, similarly to the third variation of the first embodiment, for example, the power supply circuit 38 may be provided in the connector 252 of the wire harness 251. Also, similarly to the fourth variation of the first embodiment, for example, a configuration may be adopted in which the power line from the battery 1a is connected to the connector 252 of the wire harness 251, the power supply circuit 38 is provided on the circuit board 21 of the high-performance ECU 202, and power from the battery 1a is provided to the power supply circuit 38 via the connector 252 and the connector 222. Also, similarly to the fifth variation of the first embodiment, for example, a configuration may be adopted in which the communication lines 15 and 16 are connected to the circuit board 21 of the high-performance ECU 202 and the CAN transceivers 33 are provided thereon, and information is exchanged between the CAN relay unit 35 provided in the connector 252 of the wire harness 251 and the CAN transceivers 33 provided on the circuit board 21 of the high-performance ECU 202. Also, similarly to the sixth to eighth variations of the first embodiment, for example, the high-performance ECU 202 may be configured to control power supply to the loads 1b. Also, similarly to the tenth variation of the first embodiment, for example, a configuration may be adopted in which communication and power supply are performed with common lines.

First Variation

Figure 16:
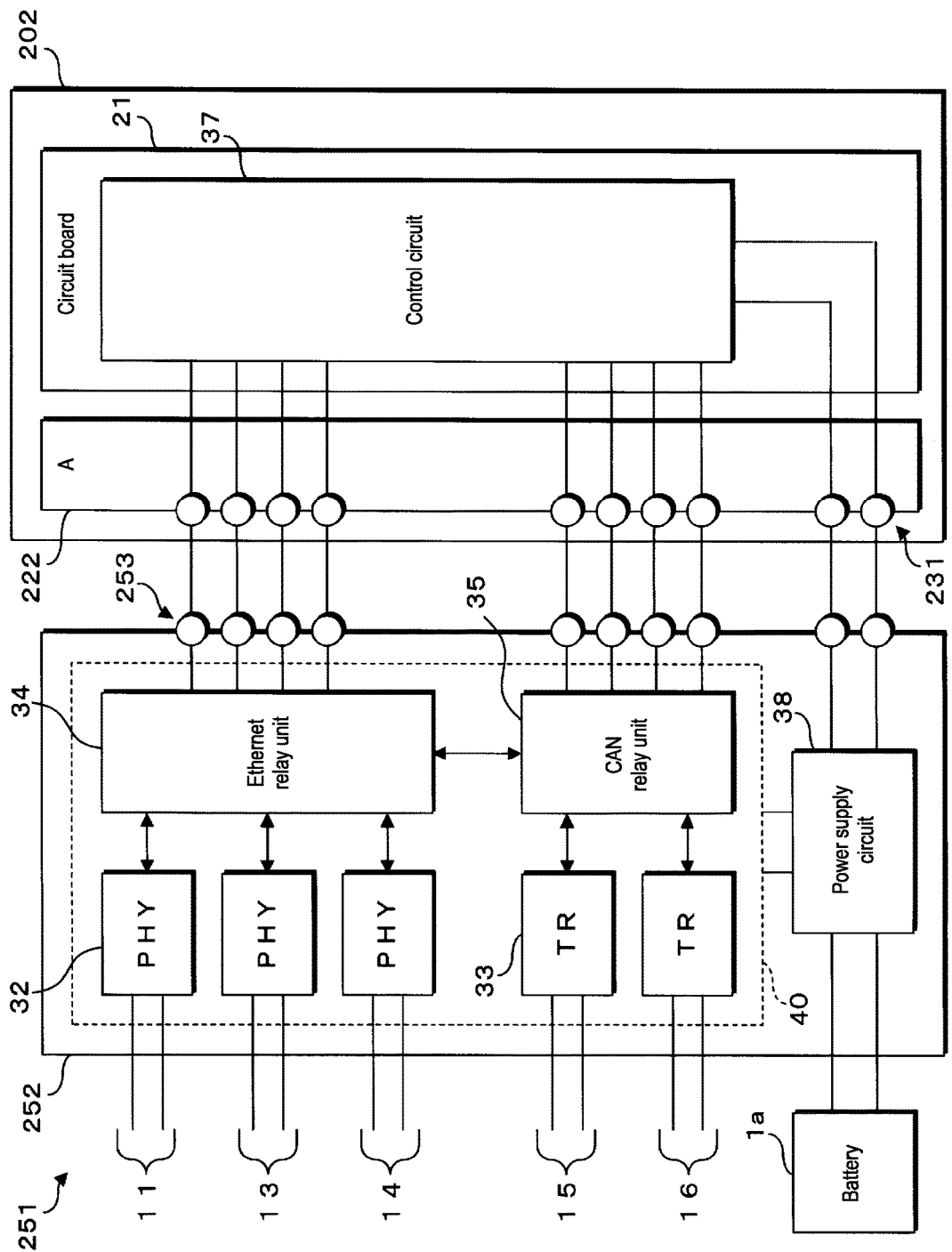
FIG. 16 is a block diagram showing the configuration of an in-vehicle communication system according to a first variation of the second embodiment.

FIG. 16 is a block diagram showing the configuration of an in-vehicle communication system according to a first variation of the second embodiment. The in-vehicle communication system according to the first variation of the second embodiment has a configuration in which the power supply circuit 38 is provided in the connector 252 of the wire harness 251, and the high-performance ECU 202 is not provided with the power supply circuit 38. The power line that receive supply of power from the battery 1a of the vehicle 1 is connected to the connector 252 of the wire harness 251 according to the first variation. The power supply circuit 38 of the connector 252 converts power having a voltage value of 12 V, for example, that is supplied from the battery 1a into power having a voltage value such as 3 V or 5 V, and outputs the resultant power. The power that is output by the power supply circuit 38 is supplied to the communication IC 40 of the connector 252, along with being supplied to the control circuit 37 of the circuit board 21 via the terminals 253 of the connector 252 and the harness-side terminals 231 of the connector 222 of the high-performance ECU 202.

In the in-vehicle communication system according to the first variation having the above configuration, the connector 252 of the wire harness 251 is provided with the power supply circuit 38. In the connector 252, the power supply circuit 38 supplies power to the communication IC 40 which includes components such as the Ethernet relay unit 34 and CAN relay unit 35, and the communication IC 40 operates with the power supplied from the power supply circuit 38. The plurality of terminals 253 of the connector 252 include terminals that output power whose voltage value has been converted by the power supply circuit 38. The plurality of harness-side terminals 231 of the connector 222 of the high-performance ECU 202 include terminals for receiving power supply from the wire harness 251. The power from the power supply circuit 38 of the wire harness 251 is supplied to the circuit board 21 of the high-performance ECU 202 via these terminals. Since the power supply circuit 38 does not need to be provided on the circuit board 21 of the high-performance ECU 202, effects such as miniaturization of the circuit board 21 can thereby be expected.

Second Variation

Figure 17:
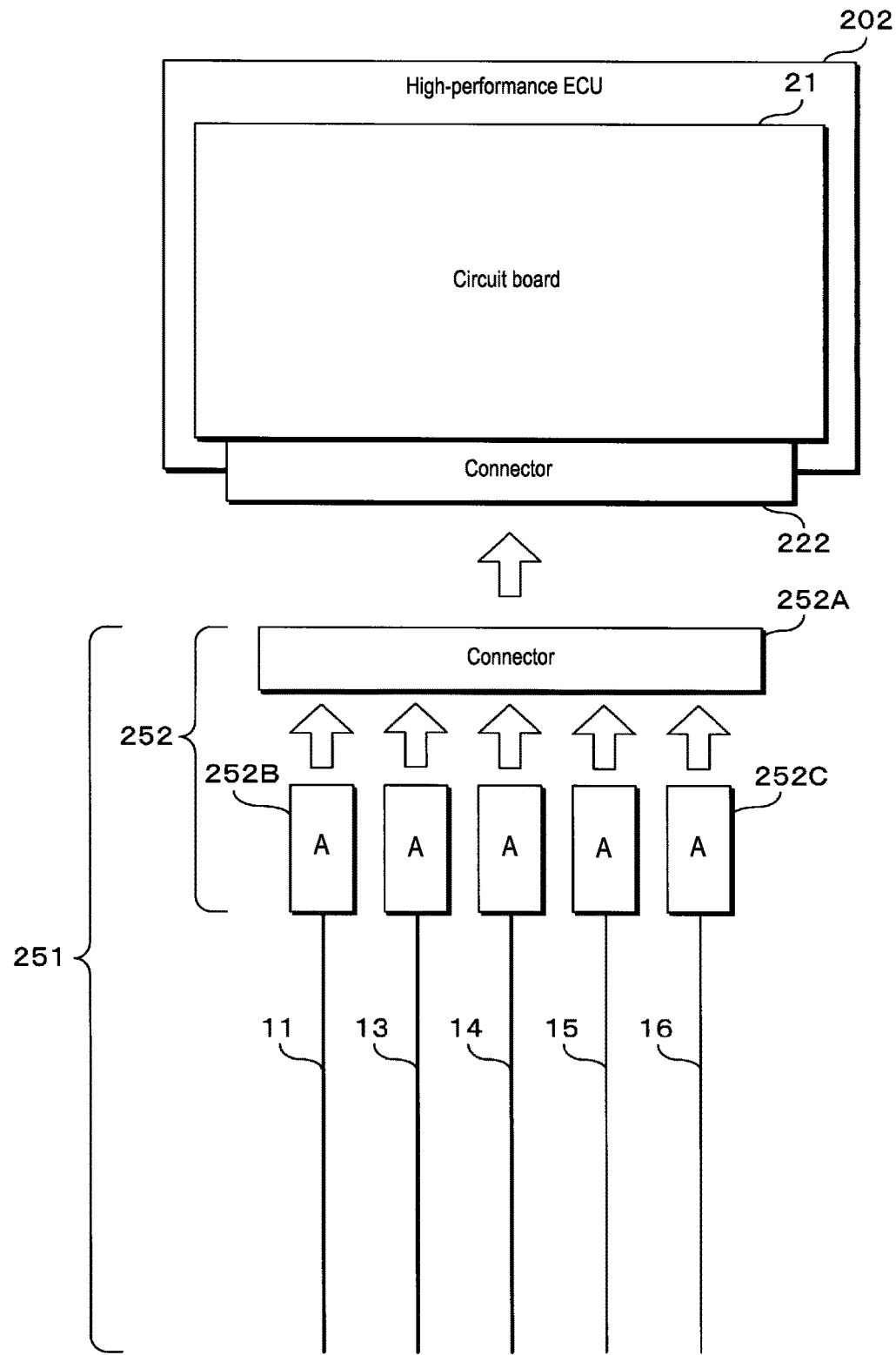
FIG. 17 is a schematic diagram showing the configuration of an in-vehicle communication system according to a second variation of the second embodiment.

FIG. 17 is a schematic diagram showing the configuration of an in-vehicle communication system according to a second variation of the second embodiment. The wire harness 251 of the in-vehicle communication system according to the second variation has a configuration in which the connector 252 is separable into one integrated connector 252A and a plurality of individual connectors 252B and 252C. The individual connectors 252B and 252C are provided one for each of the communication lines 11, 13, 14, 15 and 16 included in the wire harness 251. The individual connector 252B is provided at the leading end of the communication lines 11, 13 and 14 that are used in communication compliant with the Ethernet communication protocol. The individual connector 252C is provided at the leading end of the communication lines 15 and 16 that are used in communication compliant with the CAN communication protocol.

The integrated connector 252A is able to detachably connect one or a plurality of individual connectors 252B or 252C. Also, the integrated connector 252A is able to detachably connect to the connector 222 of the high-performance ECU 202.

Figure 18:
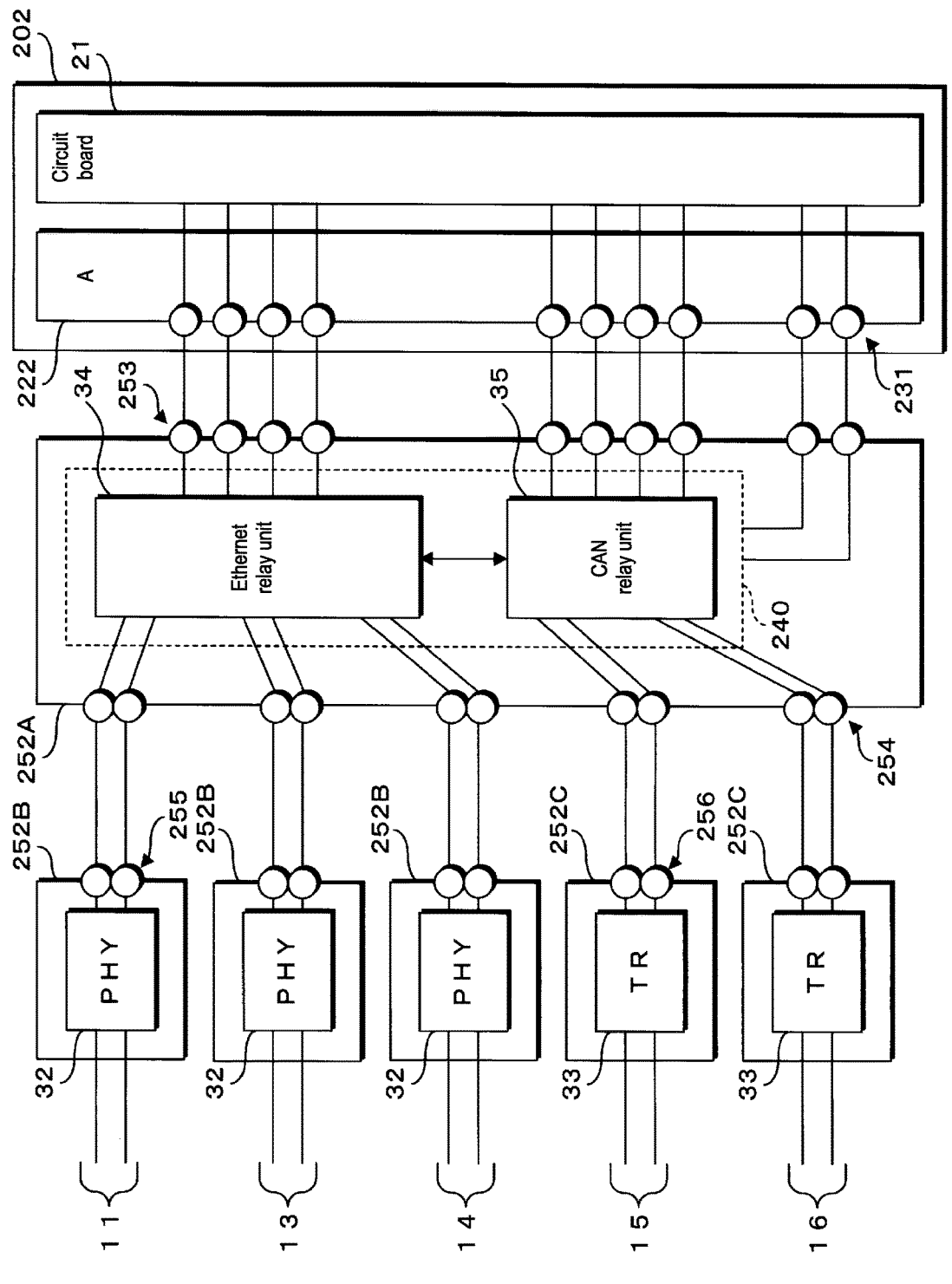
FIG. 18 is a block diagram showing the configuration of the in-vehicle communication system according to the second variation of the second embodiment.

FIG. 18 is a block diagram showing the configuration of the in-vehicle communication system according to the second variation of the second embodiment. Note that, in FIG. 18, illustration of the internal configuration of the high-performance ECU 202 is omitted, given the similarity with FIG. 15. The individual connectors 252B constituting the connector 252 of the wire harness 251 according to the second variation each have a configuration in which a connector board on which an Ethernet PHY 32 is installed is housed in a housing having a rectangular parallelepiped shape, for example. In the individual connectors 252B, the communication lines 11, 13 and 14 are connected to this connector board, and an electrical connection with the Ethernet PHY 32 is established. Also, a terminal 255 for connecting to the integrated connector 252A is provided in the individual connectors 252B. The terminal 255 is connected to the connector board and is electrically connected to the Ethernet PHY 32.

Similarly, the individual connectors 252C have a configuration in which a connector board on which a CAN transceiver 33 is installed is housed in a housing having a rectangular parallelepiped shape, for example. In the individual connectors 252C, the communication lines 15 and 16 are connected to the connector board, and an electrical connection with the CAN transceiver 33 is established. Also, a terminal 256 for connecting to the integrated connector 252A is provided in the individual connectors 252C. The terminal 256 is connected to the connector board and is electrically connected to the CAN transceiver 33. Note that the shape of the housing, the terminals 255 and 256 or the like may be different or may be the same between the individual connectors 252B and the individual connectors 252C.

The integrated connector 252A has a configuration in which a connector board on which a communication IC 240 having the Ethernet relay unit 34 and the CAN relay unit 35 is installed is housed in a housing having a rectangular parallelepiped shape, for example. A plurality of terminals 254 for connecting to the plurality of individual connectors 252B and 252C are provided in the integrated connector 252A. The Ethernet relay unit 34 of the integrated connector 252A and the Ethernet PHYs 32 of the individual connectors 252B are electrically connected, due to the terminals 254 of the integrated connector 252A being connected to the terminals 255 of the individual connectors 252B. Similarly, the CAN relay unit 35 of the integrated connector 252A is electrically connected to the CAN transceivers 33 of the individual connectors 252C, due to the terminals 254 of the integrated connector 252A being connected to the terminals 256 of the individual connectors 252C.

The wire harness 251 according to the second variation is handled the same as the wire harness 251 shown in FIG. 15, after the plurality of individual connectors 252B and 252C are connected to the integrated connector 252A.

Third Variation

Figure 19:
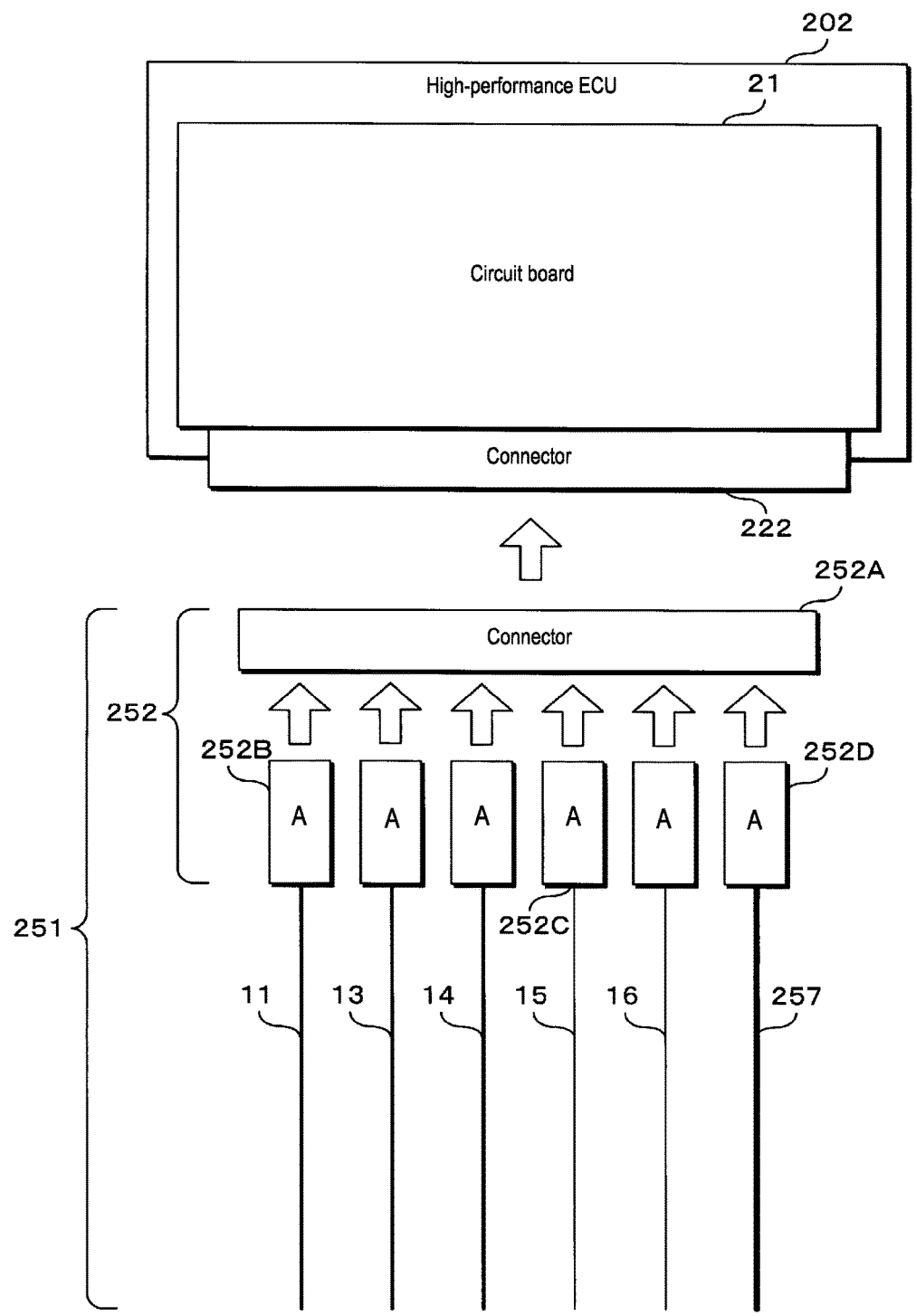
FIG. 19 is a schematic diagram showing the configuration of an in-vehicle communication system according to a third variation of the second embodiment.

FIG. 19 is a schematic diagram showing the configuration of an in-vehicle communication system according to a third variation of the second embodiment. The wire harness 251 of the in-vehicle communication system according to the third variation has a configuration in which the connector 252 is separable into one integrated connector 252A and a plurality of individual connectors 252B, 252C, and 252D, similarly to the in-vehicle communication system according to the second variation.

In the in-vehicle communication system according to the third variation, however, the individual connector 252D is provided for a power line 257 that receives power supply from the battery 1a of the vehicle 1. The power line 257 is connected to the integrated connector 252A along with the communication lines 11, 13, 14, 15 and 16.

In other words, the in-vehicle communication system according to the third variation is obtained by applying the configuration of the integrated connector and individual connectors of the in-vehicle communication system according to the second variation to the configuration of the in-vehicle communication system according to the first variation shown in FIG. 16.

Fourth Variation

Figure 20:
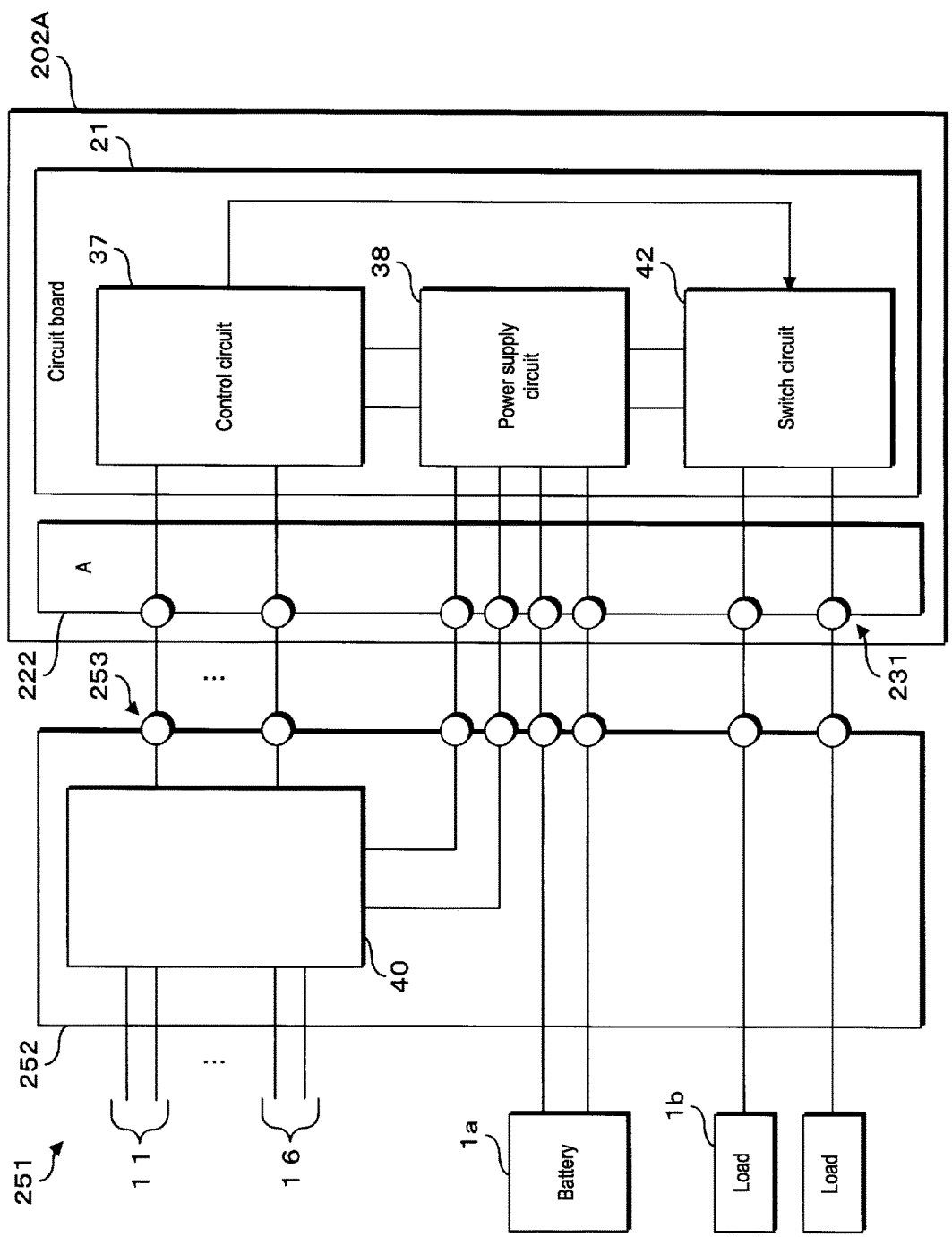
FIG. 20 is a block diagram showing the configuration of an in-vehicle communication system according to a fourth variation of the second embodiment.

FIG. 20 is a block diagram showing the configuration of an in-vehicle communication system according to a fourth variation of the second embodiment. The in-vehicle communication system according to the fourth variation of the second embodiment is an example in which the abovementioned configuration is applied to a power supply device 202A that supplies power to the various loads 1b installed in the vehicle 1, instead of being applied to the high-performance ECU 202. The switch circuit 42 is provided on the circuit board 21 of the power supply device 202A according to the fourth variation, in addition to the control circuit 37 and the power supply circuit 38. The switch circuit 42 is a circuit that receives supply of power whose voltage value has been converted from the power supply circuit 38, and performs switching between supplying and not supplying this power to the loads 1b in accordance with control by the control circuit 37.

The power line that receives supply of power from the battery 1a of the vehicle 1 and the power lines that supply power to the loads 1b of the vehicle 1 are connected to the connector 252 of the wire harness 251 according to the fourth variation of the second embodiment. These power lines are respectively electrically connected to some of the terminals 253 included among the plurality of terminals 253 provided in the connector 252. Also, the connector 222 provided in the power supply device 202A is provided with a plurality of harness-side terminals 231 that are connected to the terminals 253 provided in the connector 252 of the wire harness 251.

The terminals 253 of the connector 252 and the harness-side terminals 231 of the connector 222 are connected, in the case where the connector 252 of the wire harness 251 and the connector 222 of the power supply device 202A are connected. In this state, the power line that receive power supply from the battery 1a is electrically connected to the power supply circuit 38 of the power supply device 202A, and the power lines that supply power to the loads 1b are electrically connected to the switch circuit 42 of the power supply device 202A.

In a state where the wire harness 251 is connected to the power supply device 202A, the power from the battery 1a is supplied to the power supply circuit 38, and the voltage value is converted by the power supply circuit 38. Power whose voltage value has been converted by the power supply circuit 38 is supplied to the control circuit 37 and the switch circuit 42 of the circuit board 21, along with being supplied to the communication IC 40 of the wire harness 251 via the harness-side terminals 231 of the connector 222 and the terminals 253 of the connector 252. Also, the switch circuit 42 switches between supplying and not supplying power provided from the power supply circuit 38 to the loads 1b, according to switching control by the control circuit 37. The power that is output by the switch circuit 42 is supplied to the loads 1b via the harness-side terminals 231 of the connector 222, the terminals 253 of the connector 252, and the power lines connected to the wire harness 251.

That is, the power supply device 202A according to the fourth variation is provided with a power supply path that is routed from the power line connected to the battery 1a to the power supply circuit 38 of the circuit board 21, through the inside of the connector 252 of the wire harness 251, the terminals 253 of the connector 252, the harness-side terminals 231 of the connector 222 of the power supply device 202A, the inside of the connector 222, the wiring pattern of the circuit board 21, and the like. Also, the power supply device 202A is provided with a power supply path that is routed from the power supply circuit 38 of the circuit board 21 to the communication IC 40, through the wiring pattern of the circuit board 21, the inside of the connector 222, the harness-side terminals 231 of the connector 222, the terminals 253 of the connector 252 of the wire harness 251, the inside of the connector 252, and the like. Also, the power supply device 202A is provided with a power supply path that is routed from the power supply circuit 38 of the circuit board 21 to the power lines connected to the loads 1b, through the wiring pattern of the circuit board 21, the switch circuit 42, the inside of the connector 222, the harness-side terminals 231 of the connector 222, the terminals 253 of the connector 252 of the wire harness 251, the inside of the connector 252, and the like.

The power supply device 202A according to the fourth variation of the second embodiment having the above configuration is able to connect the plurality of communication lines 11, 13, 14, 15 and 16, the power line from the battery 1a, and the power lines to the loads 1b to the connector 252 of the wire harness 251 in a consolidated manner.

Since the remaining configuration of the in-vehicle communication system according to the second embodiment is similar to the in-vehicle communication system according to the first embodiment, the same reference signs are given to similar parts, and detailed description thereof is omitted.

Third Embodiment

Figure 21:
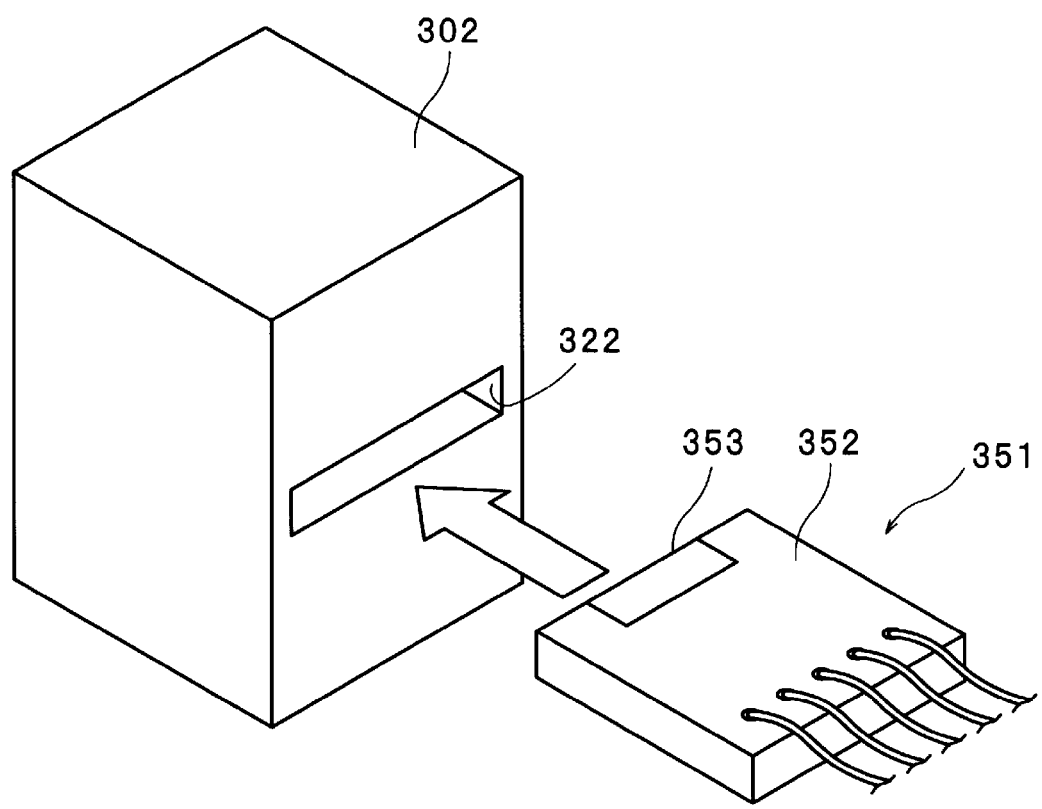
FIG. 21 is a schematic diagram for describing the configuration of an in-vehicle communication system according to a third embodiment.

FIG. 21 is a schematic diagram for describing the configuration of an in-vehicle communication system according to a third embodiment. In the in-vehicle communication system according to the third embodiment, a circuit board 352 is provided at one end of a wire harness 351 in which a plurality of communication lines are bundled. The circuit board 352 has a flat rectangular shape, with a plurality of communication lines extending out from one longitudinal side, and terminals 353 provided on the edge on the other longitudinal side. A high-performance ECU 302 of the in-vehicle communication system according to the third embodiment is provided with a rectangular parallelepiped casing, and a rectangular opening is formed in one surface of the casing. This opening is for inserting the circuit board 352 of the wire harness 351, and passes through to a board mounting unit 322 that removably mounts the circuit board 352 to the high-performance ECU 302.

In the in-vehicle communication system according to the third embodiment, the high-performance ECU 302 and the wire harness 351 are connected, by mounting the circuit board 352 of the wire harness 351 to the board mounting unit 322 of the high-performance ECU 302, rather than through connection using connectors.

Figure 22:
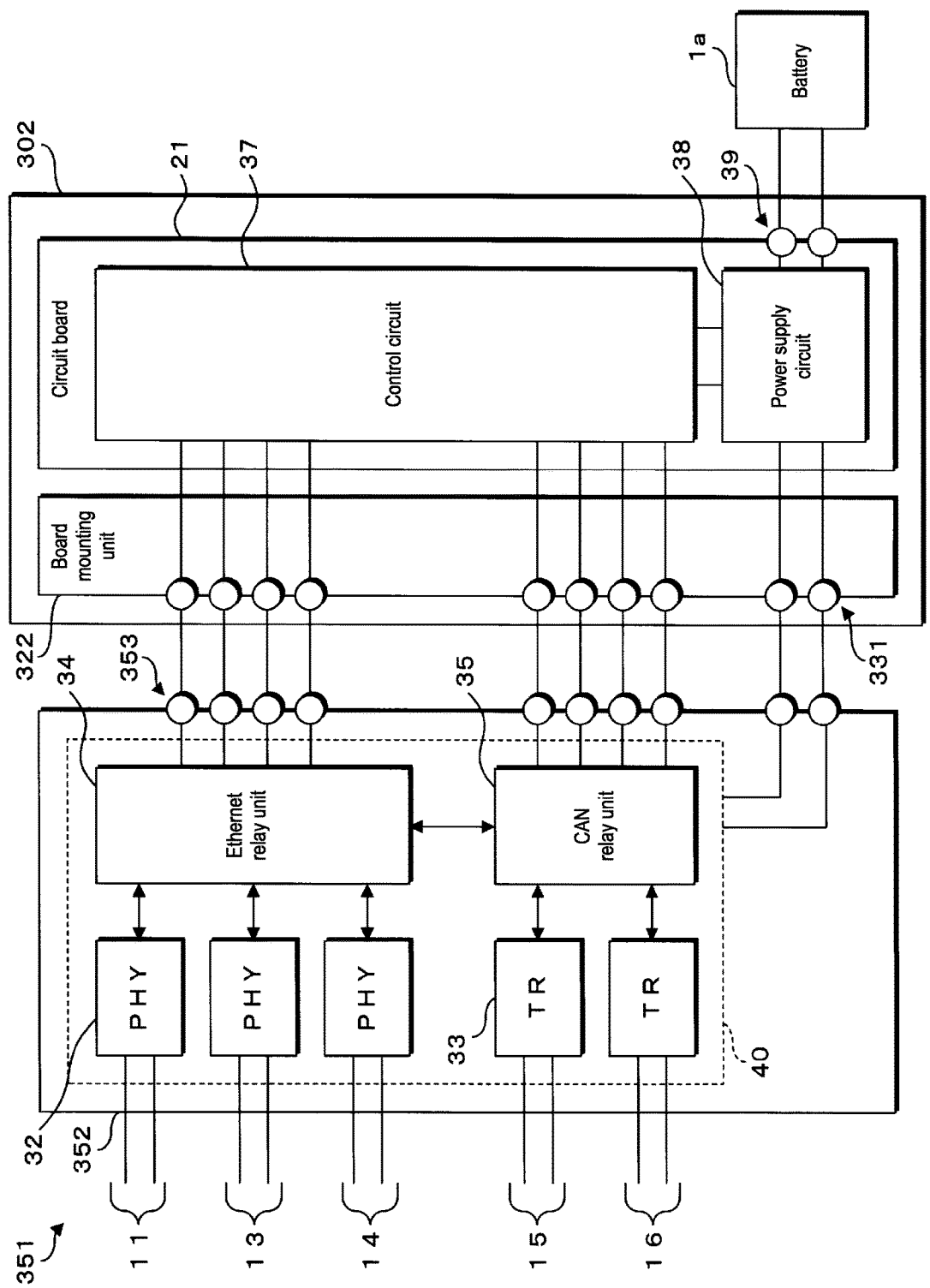
FIG. 22 is a block diagram showing the configuration of the in-vehicle communication system according to the third embodiment.

FIG. 22 is a block diagram showing the configuration of the in-vehicle communication system according to the third embodiment. The configuration of the in-vehicle communication system according to the third embodiment is approximately the same as the configuration of the in-vehicle communication system according to the second embodiment shown in FIG. 15. The in-vehicle communication system according to the third embodiment has a configuration in which the high-performance ECU 302 is provided with the board mounting unit 322, instead of the connector 222 according to the second embodiment, and the wire harness 351 is provided with the circuit board 352, instead of the connector 252 according to the second embodiment.

The communication IC 40 having the Ethernet PHYs 32, the CAN transceivers 33, the Ethernet relay unit 34 and the CAN relay unit 35 is mounted on the circuit board 352 of the wire harness 351 according to the third embodiment. The Ethernet PHYs 32 and CAN transceivers 33 of the communication IC 40 are electrically connected to the communication lines 11, 13, 14, 15 and 16 connected to the circuit board 352. A plurality of terminals 353 for electrically connecting to the board mounting unit 322 of the high-performance ECU 302 are provided on the circuit board 352. The plurality of terminals 353A include terminals for the Ethernet relay unit 34 and the CAN relay unit 35 to each communicate with the control circuit 37 of the high-performance ECU 302 using the SPI communication protocol, and terminals for receiving power supply from the power supply circuit 38 of the high-performance ECU 302. The plurality of terminals 353 are provided as metal portions exposed on the surface of the circuit board 352, for example.

The board mounting unit 322 of the high-performance ECU 302 according to the third embodiment is provided with a mechanism (illustration is omitted) that holds and fixes the circuit board 352 of the wire harness 351 inserted through the opening in the casing, and a plurality of terminals 331 that are connected to the plurality of terminals 353 provided on the circuit board 352. The plurality of terminals 331 are metal components that abut the plurality of terminals 353 provided on the surface of the circuit board 352, for example. The plurality of terminals 331 are electrically connected to the control circuit 37 and the power supply circuit 38 of the circuit board 21.

The terminals 353 of the circuit board 352 and the terminals 331 of the board mounting unit 322 are connected, in the case where the circuit board 352 of the wire harness 351 is mounted to the board mounting unit 322 of the high-performance ECU 302. It thereby becomes possible for the Ethernet relay unit 34 and CAN relay unit 35 of the circuit board 352 to communicate with the control circuit 37 of the high-performance ECU 302, and power is supplied to the communication IC 40 of the circuit board 352 from the power supply circuit 38 of the high-performance ECU 302.

In the in-vehicle communication system according to the third embodiment having the above configuration, the circuit board 352 of the wire harness 351 is provided with the communication relay function. Even in cases such as an increase or decrease in the communication lines or a change in the transmission speed, for example, it thereby becomes possible to respond by replacing the wire harness 351, without the high-performance ECU 302 undergoing any particular modification or with slight modification.

Note that the in-vehicle communication system according to the third embodiment is able to similarly employ the configurations shown in the first to tenth variations of the first embodiment and the configurations shown in the first to fourth variations of the second embodiment. Similarly to the first and second variations of the first embodiment, for example, the circuit board 352 of the wire harness 351 of the in-vehicle communication system according to the third embodiment may be provided with only either the Ethernet relay unit 34 or the CAN relay unit 35. Also, similarly to the third variation of the first embodiment and the first variation of the second embodiment, for example, the power supply circuit 38 may be provided on the circuit board 352 of the wire harness 351. Also, similarly to the fourth variation of the first embodiment, for example, a configuration may be adopted in which the power line from the battery 1a is connected to the circuit board 352 of the wire harness 351, the circuit board 21 of the high-performance ECU 302 is provided with the power supply circuit 38, and power from the battery 1a is provided to the power supply circuit 38 via the circuit board 352 and the board mounting unit 322. Also, similarly to the fifth variation of the first embodiment, for example, a configuration may be adopted in which the communication lines 15 and 16 connected to the circuit board 21 of the high-performance ECU 302 and the CAN transceivers 33 are provided thereon, and information is exchanged between the CAN relay unit 35 provided on the circuit board 352 of the wire harness 351 and the CAN transceivers 33 provided on the circuit board 21 of the high-performance ECU 302. Also, similarly to the sixth to eighth variations of the first embodiment and the fourth variation of the second embodiment, for example, the high-performance ECU 302 may be configured to control power supply to the loads 1b. Also, similarly to the ninth variation of the first embodiment and the second and third variations of the second embodiment, for example, a configuration may be adopted in which the communication lines 11, 13, 14, 15 and 16 having individual connectors in which a Ethernet PHY 32 or a CAN transceiver 33 is provided are detachably connected to the circuit board 352 of the wire harness 351, and the Ethernet relay unit 34 and CAN relay unit 35 provided on the circuit board 352 relay communication between the communication lines 11, 13, 14, 15 and 16. Also, similarly to the tenth variation of the first embodiment, for example, a configuration may be adopted in which communication and power supply are performed with common lines.

First Variation

Figure 23:
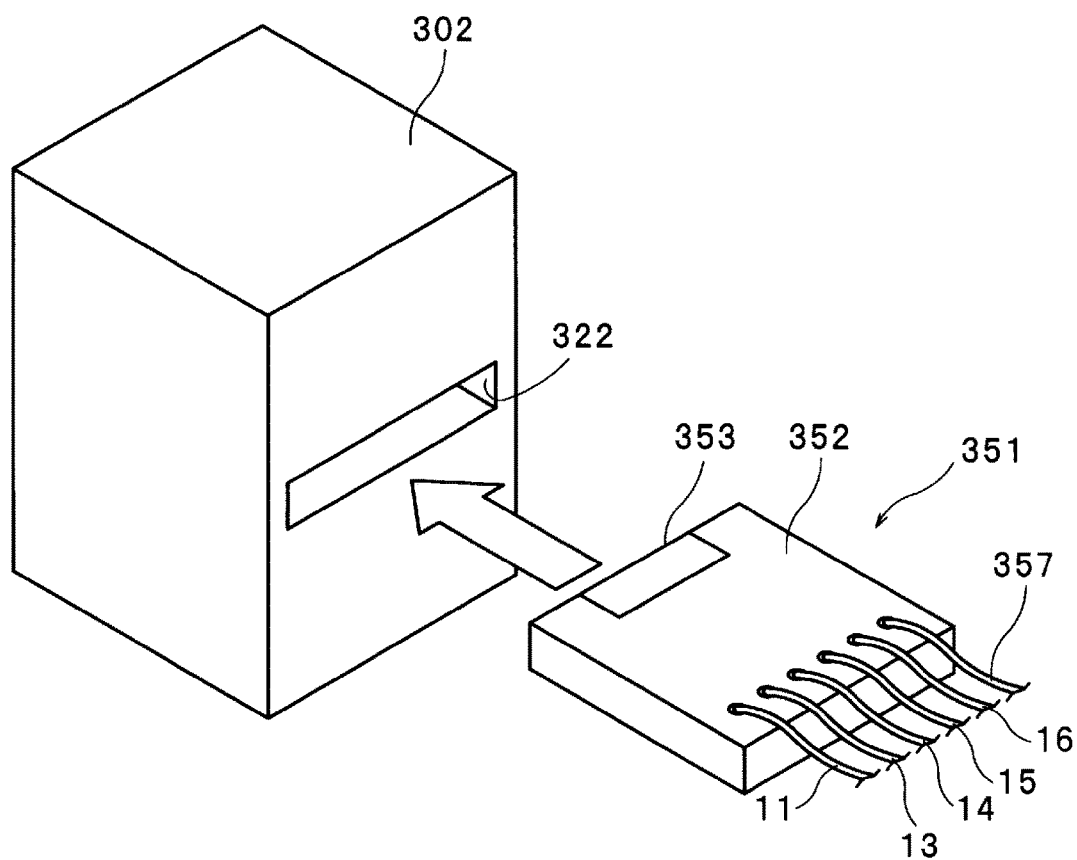
FIG. 23 is a block diagram showing the configuration of an in-vehicle communication system according to a first variation of the third embodiment.
Figure 24:
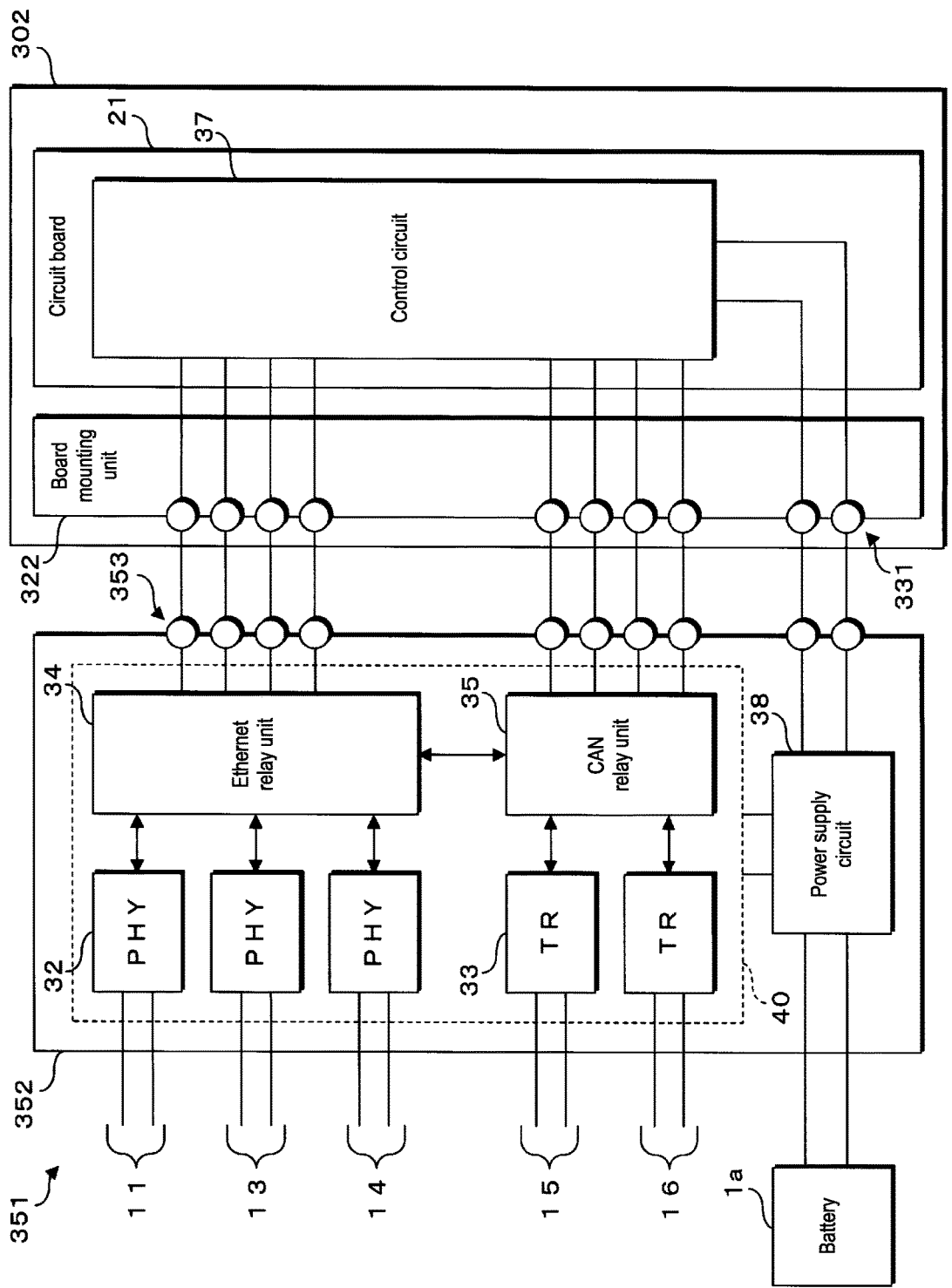
FIG. 24 is a block diagram showing the configuration of the in-vehicle communication system according to the first variation of the third embodiment.

FIGS. 23 and 24 are block diagrams showing the configuration of an in-vehicle communication system according to a first variation of the third embodiment. The in-vehicle communication system according to the first variation of the third embodiment has a configuration in which the power supply circuit 38 is provided on the circuit board 352 of the wire harness 351, and the high-performance ECU 302 is not provided with the power supply circuit 38. A power line 357 that receives power supply from the battery 1*a* of the vehicle 1 is connected to the circuit board 352 of the wire harness 351 according to the first variation. The power supply circuit 38 of the circuit board 352 converts power having a voltage value of 12 V, for example, that is supplied from the battery 1*a* into power having a voltage value such as 3 V or 5 V, and outputs the resultant power. The power that is output by the power supply circuit 38 is supplied to the communication IC 40 of the circuit board 352, along with being supplied to the control circuit 37 of the circuit board 21 via the terminals 353 of the circuit board 352 and the terminals 331 of the board mounting unit 322 of the high-performance ECU 302.

In the in-vehicle communication system according to the first variation having the above configuration, the circuit board 352 of the wire harness 351 is provided with the power supply circuit 38. The power supply circuit 38 supplies power to the communication IC 40 that includes the Ethernet relay unit 34 and CAN relay unit 35 of the circuit board 35, and the communication IC 40 operates with the power supplied from the power supply circuit 38. The plurality of terminals 353 of the circuit board 352 include terminals that output power whose voltage value has been converted by the power supply circuit 38. The plurality of terminals 331 of the board mounting unit 322 of the high-performance ECU 302 include terminals for receiving power supply from the wire harness 351. The power from the power supply circuit 38 of the wire harness 351 is supplied to the circuit board 21 of the high-performance ECU 302 via these terminals. Since the power supply circuit 38 does not need to be provided on the circuit board 21 of the high-performance ECU 302, effects such as miniaturization of the circuit board 21 can thereby be expected.

Since the remaining configuration of the in-vehicle communication system according to the third embodiment is similar to the in-vehicle communication system according to the first embodiment, the same reference symbols are given to similar parts, and detailed description thereof is omitted.

Fourth Embodiment

Figure 25:
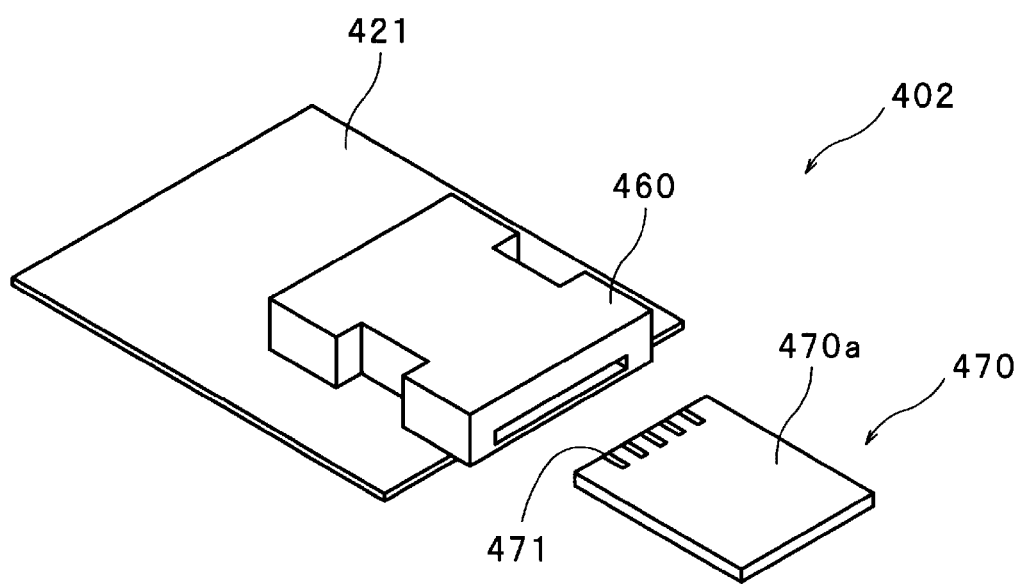
FIG. 25 is a schematic diagram for describing the configuration of a high-performance ECU according to a fourth embodiment.

FIG. 25 is a schematic diagram for describing the configuration of a high-performance ECU 402 according to the fourth embodiment. The high-performance ECU 402 according to the fourth embodiment has a configuration in which a circuit board 421 is housed in a casing having a rectangular parallelepiped shape, for example (illustration is omitted), and a card slot 460 is installed on this circuit board 421. A communication card 470 in which the communication function is consolidated is removably mounted in the card slot 460. In the illustrated example, the communication card 470 is mounted in the card slot 460, by the communication card 470 being inserted through the opening of the card slot 460, and a holding mechanism (illustration is omitted) provided inside the card slot 460 holding the communication card 470.

The communication card 470 has a card-type casing 470*a*, and a plurality of terminals 471 are provided on the surface of the casing 470*a*. The casing 470*a* is removably mounted in the card slot 460, by being inserted into the opening of the card slot 460 and being held by the holding mechanism of the card slot 460. In the case where the communication card 470 is mounted in the card slot 460, the terminals 471 of the communication card 470 are connected to card-side terminals 461 (illustrated in FIG. 26) provided inside the card slot 460, and the communication card 470 and the circuit board 421 of the high-performance ECU 402 are electrically connected.

In terms of aspects such as the size and shape of the casing 470*a* of the communication card 470 and aspects such as the number and arrangement of the terminals 471, similar configurations to existing card-type devices such as SIM (Subscriber Identity Module) cards or SD (Secure Digital) cards, for example, can be employed. An existing card-type device can thereby be utilized for the card slot 460. Note that, in a state where the communication card 470 is mounted in the card slot 460, preferably the entire casing 470*a* of the communication card 470 is inserted inside the opening of the card slot 460, with no part of the casing 470*a* protruding outside the opening. Prevention of adverse effects such as damage to the communication card 470 mounted in the card slot 460 can thereby be expected.

Figure 26:
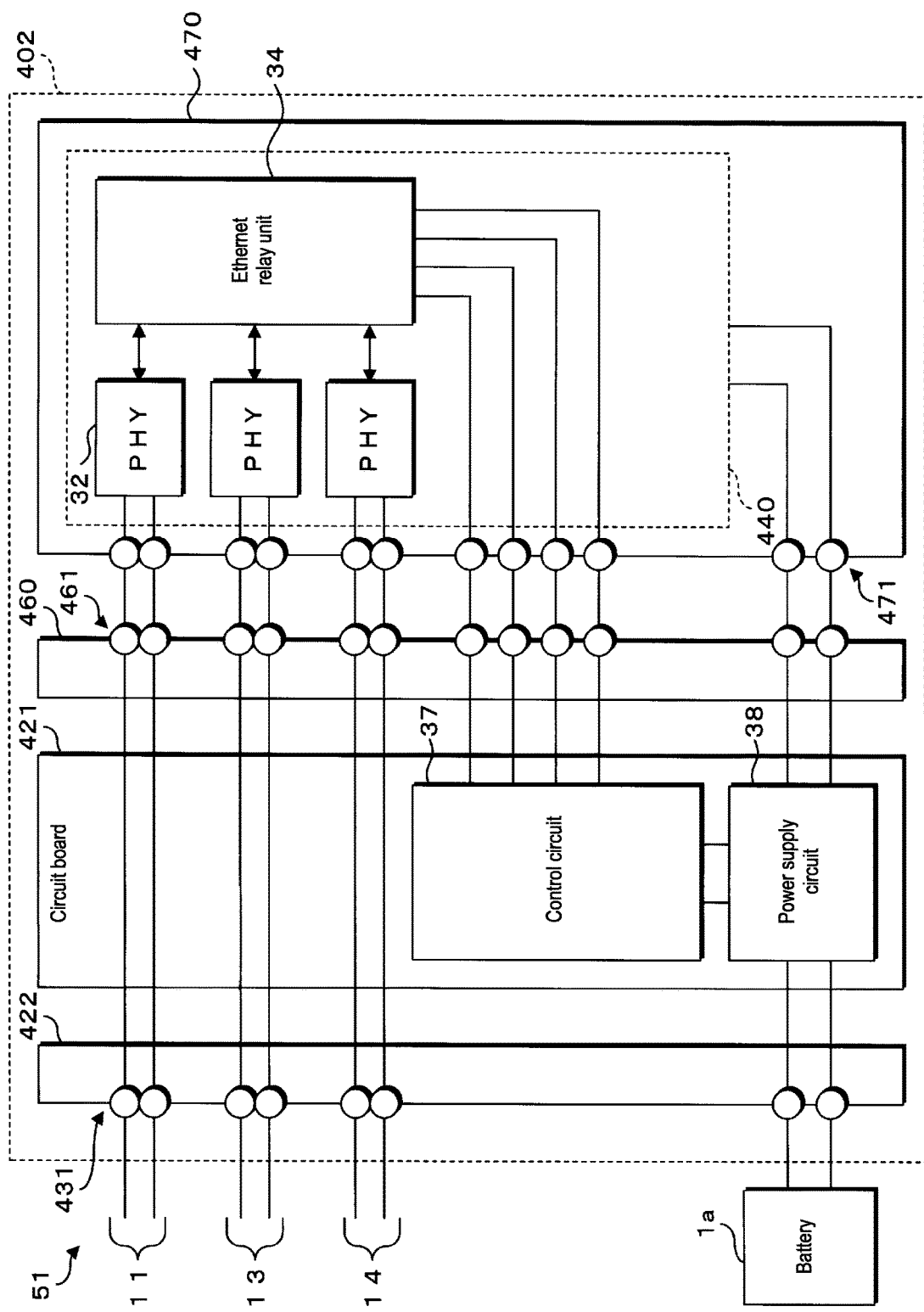
FIG. 26 is a block diagram showing the configuration of the high-performance ECU according to the fourth embodiment.

FIG. 26 is a block diagram showing the configuration of the high-performance ECU 402 according to the fourth embodiment. The high-performance ECU 402 according to the fourth embodiment has installed therein a connector 422 for connecting the wire harness 51 in which the plurality of communication lines 11, 13 and 14 are bundled to a circuit board 421 provided with the control circuit 37 and the power supply circuit 38, and the card slot 460 for mounting the communication card 470. The connector 422 is provided with a plurality of harness-side terminals 431 that include terminals to which the communication lines 11, 13 and 14 of the wire harness 51 are connected and terminals to which the power line from the battery 1*a* is connected. The card slot 460 is provided with a plurality of card-side terminals 461 for electrically connecting the communication card 470. The plurality of card-side terminals 461 include terminals electrically connected to the harness-side terminals 431 to which the communication lines 11, 13 and 14 of the connector 422 are connected, terminals for the control circuit 37 to perform communication compliant with the SPI communication protocol with the communication card 470, and terminals for supplying power of the power supply circuit 38 to the communication card 470.

The communication card 470 is provided with a communication IC 440 having components such as the Ethernet PHYs 32 and the Ethernet relay unit 34, and the plurality of terminals 471 corresponding to the card-side terminals 461 of the card slot 460. The plurality of terminals 471 include terminals (communication-side terminals) that electrically connect the communication lines 11, 13 and 14 of the wire harness 51 and the Ethernet PHYs 32 of the communication IC 440, through the card-side terminals 461 of the card slot 460, the circuit board 421, and the harness-side terminals 431 of the connector 422. Also, the plurality of terminals 471 include terminals (control-side terminals) for the Ethernet relay unit 34 of the communication IC 440 to perform communication compliant with the SPI communication protocol with the control circuit 37 of the circuit board 421, and terminals (power supply terminals) for power supply from the power supply circuit 38 to the communication IC 440.

In a state where the communication card 470 is mounted in the card slot 460, the Ethernet PHYs 32 of the communication card 470 and the communication lines 11, 13 and 14 are directly connected, and the Ethernet PHYs 32 are able to transmit and receive signals with respect to the communication lines 11, 13 and 14. The Ethernet relay unit 34 of the communication card 470 relays communication between the communication lines 11, 13 and 14, along with relaying communication between the communication lines 11 and 13 and 14 and the control circuit 37. Also, the communication card 470 receives power supply from the power supply circuit 38 of the circuit board 421, and the communication IC 440 operates with this power.

The high-performance ECU 402 according to the fourth embodiment having the above configuration can be provided with a relay function of relaying communication between the communication lines 11, 13 and 14, by the communication card 470 being mounted. The communication card 470 is provided with the casing 470a that can be removably mounted in the card slot 460 of the high-performance ECU 402. The terminals 471 that are electrically connected to the control circuit 37 of the circuit board 421 of the high-performance ECU 402 and the plurality of terminals 471 electrically connected to the plurality of communication lines 11, 13 and 14 connected to the connector 422 of the high-performance ECU 402 are provided on the surface of the casing 470a. The Ethernet relay unit 34 that relays communication between the plurality of communication lines 11, 13 and 14 connected to the high-performance ECU 402 and relays communication between the communication lines 11, 13 and 14 and the control circuit 37 is provided inside the casing 470a. By adopting a configuration in which the communication card 470 separate from the high-performance ECU 402 relays communication, the control circuit 37 of the high-performance ECU 402 no longer needs to perform relay-related processing, and the processing load can be reduced. Also, in the case where a specification change such as changing the transmission speed become necessary, for example, the specification change can be addressed by replacing the communication card 470.

Also, the communication card 470 is provided with the plurality of the Ethernet PHYs 32 that input and output communication signals with respect to the communication lines between a plurality of terminals and the Ethernet relay unit 34. The plurality of Ethernet PHYs 32 and the Ethernet relay unit 34 are provided in a single communication IC 440, and this communication IC 440 is provided in the communication card 470. Effects such as cost reduction and miniaturization of the communication card 470 can thereby be expected.

Note that, in the fourth embodiment, the device that provides the communication relay function in the high-performance ECU 402 is given as the communication card 470, but the present invention is not limited thereto. The device that provides the relay function may have a shape other than a card shape. Also, in the fourth embodiment, a configuration was adopted in which the communication IC 440 of the communication card 470 performs communication compliant with the Ethernet communication protocol, and does not perform communication compliant with the CAN communication protocol, but the present invention is not limited thereto. Similarly to the first to third embodiments, a configuration may be adopted in which the communication card 470 performs communication compliant with the Ethernet communication protocol and communication compliant with the CAN communication protocol, and relays communication between these protocols. Also, the communication card 470 may be configured to perform communication compliant with the CAN communication protocol, and not perform communication compliant with the Ethernet communication protocol.

First Variation

Figure 27:
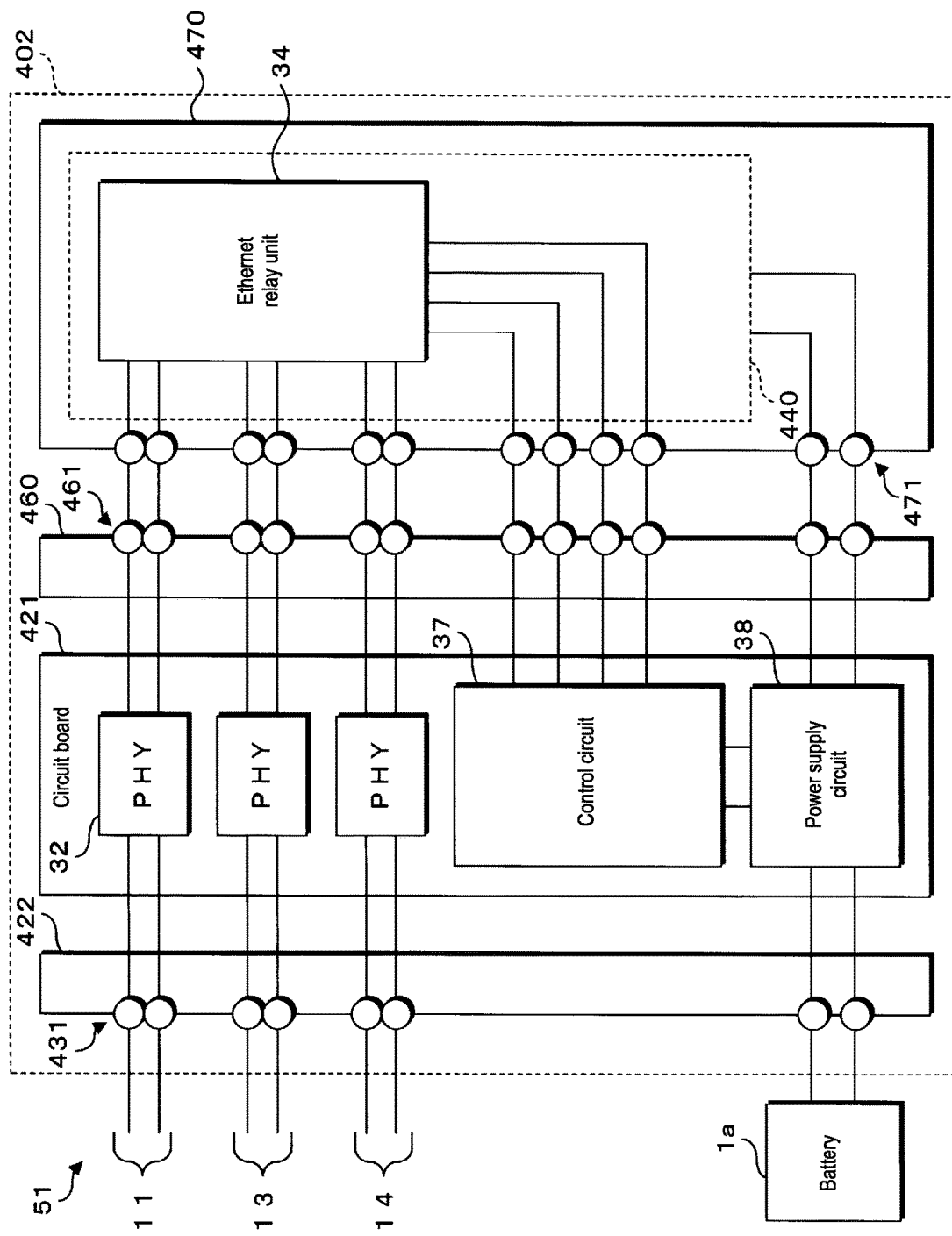
FIG. 27 is a block diagram showing the configuration of a high-performance ECU according to a first variation of the fourth embodiment.

FIG. 27 is a block diagram showing the configuration of a high-performance ECU 402 according to the first variation of the fourth embodiment. In the high-performance ECU 402 according to the first variation of the fourth embodiment, the Ethernet PHYs 32 are provided on the circuit board 421 of the high-performance ECU 402. Thus, the communication card 470 according to the first variation of the fourth embodiment does not have the Ethernet PHYs 32. The Ethernet PHYs 32 transmit and receive signals with respect to the communication lines 11, 13 and 14 connected to the connector 422, and exchange information related to communication with the communication card 470 mounted in the card slot 460. That is, the Ethernet relay unit 34 of the communication card 470 mounted in the card slot 460 is electrically connected to the communication lines 11, 13 and 14 connected to the connector 422 of the high-performance ECU 402, via the Ethernet PHYs 32 provided on the circuit board 421 of the high-performance ECU 402.

In the high-performance ECU 402 according to the above first variation, the plurality of the Ethernet PHYs 32 that input and output signals for communication with respect to the communication lines 11, 13 and 14 connected to the connector 422 are provided on the circuit board 421. The plurality of communication lines 11, 13 and 14 connected to the connector 422 of the high-performance ECU 402 and the Ethernet relay unit 34 of the communication card 470 are electrically connected via the Ethernet PHYs 32 of the high-performance ECU 402. Since the communication card 470 does not need to be provided with the plurality of the Ethernet PHYs 32, effects such as further cost reduction and miniaturization can thereby be expected.

Second Variation

Figure 28:
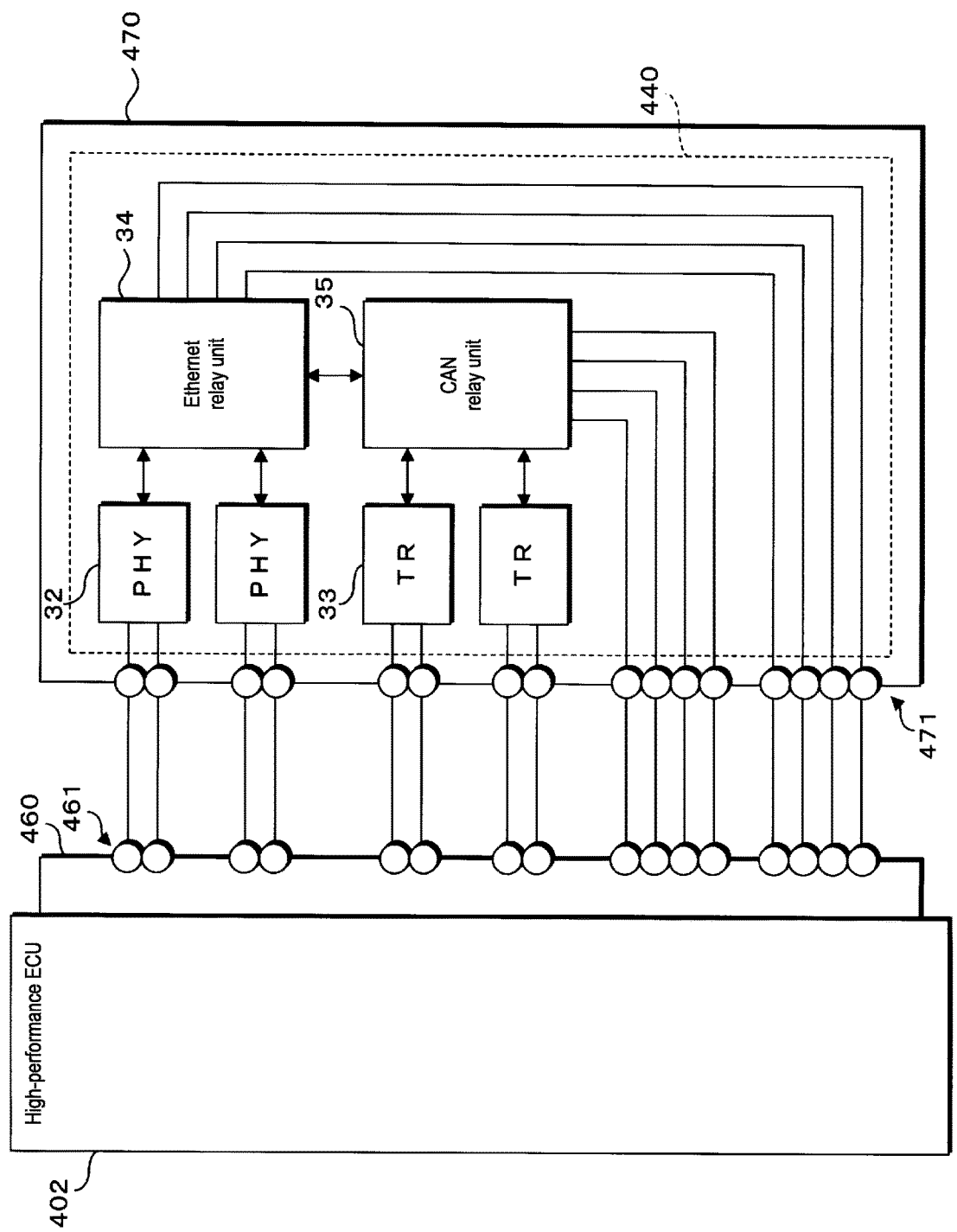
FIG. 28 is a block diagram showing the configuration of a communication card according to a second variation of the fourth embodiment.

FIG. 28 is a block diagram showing the configuration of a communication card 470 according to a second variation of the fourth embodiment. Note that, in FIG. 28, illustration of the configuration of the high-performance ECU 402 is omitted, and illustration of the power supply path from the high-performance ECU 402 to the communication card 470 is omitted. The communication card 470 according to the second variation of the fourth embodiment is provided with the Ethernet PHYs 32, the CAN transceivers 33, the Ethernet relay unit 34, and the CAN relay unit 35. The communication card 470 according to the second variation is able to relay Ethernet communication by the Ethernet relay unit 34, and relay CAN communication by the CAN relay unit 35. Also, the Ethernet relay unit 34 or the CAN relay unit 35 has a function of converting between the Ethernet communication protocol and the CAN communication protocol, and relay between Ethernet communication and CAN communication can be performed, by exchanging data between the Ethernet relay unit 34 and the CAN relay unit 35.

Also, the Ethernet relay unit 34 and the CAN relay unit 35 each individually perform communication compliant with the SPI communication protocol with the high-performance ECU 402. Thus, the Ethernet relay unit 34 has a function of converting between the Ethernet communication protocol and the SPI communication protocol. Similarly, the CAN relay unit 35 has a function of converting between the CAN communication protocol and the SPI communication protocol.

The plurality of terminals 471 provided in the communication card 470 according to the second variation include terminals (communication-side terminals) that are connected to the Ethernet PHYs 32, and, in the case where the communication card 470 is mounted in the card slot 460, are electrically connected to communication lines for performing Ethernet communication connected to the connector 422 of the high-performance ECU 402. Also, the plurality of terminals 471 include terminals (communication-side terminals) that are connected to the CAN transceivers 33 and, in the case where the communication card 470 is mounted in the card slot 460, are electrically connected to communication lines for performing CAN communication connected to the connector 422 of the high-performance ECU 402. Also, the plurality of terminals 471 include terminals (control-side terminals) for the Ethernet relay unit 34 to perform communication compliant with the SPI communication protocol with the control circuit 37 of the high-performance ECU 402, and terminals (control-side terminals) for the CAN relay unit 35 to perform communication compliant with the SPI communication protocol with the control circuit 37 of the high-performance ECU 402.

The communication lines that are used in communication compliant with the Ethernet communication protocol and the communication lines that are used in communication compliant with the CAN communication protocol are connected to the high-performance ECU 402 according to the above second variation. The communication card 470 according to the second variation is provided with the Ethernet relay unit 34 and the CAN relay unit 35, and performs relay between Ethernet communication and CAN communication, by converting the communication protocol between Ethernet and CAN, and exchanging information between the Ethernet relay unit 34 and the CAN relay unit 35. The communication card 470 according to the second variation is thereby able to relay communication, even in the case where communication lines that are used in communication compliant with different communication protocols are provided together.

Also, the Ethernet relay unit 34 and CAN relay unit 35 of the communication card 470 perform communication compliant with the SPI communication protocol with the control circuit 37 of the high-performance ECU 402. The Ethernet relay unit 34 performs protocol conversion between the Ethernet communication protocol and the SPI communication protocol. Similarly, the CAN relay unit 35 performs protocol conversion between the CAN communication protocol and the SPI communication protocol. The communication card 470 is thereby able to convert between the Ethernet and CAN communication protocols that are used for external communication of the high-performance ECU 402 and the SPI communication protocol that is used for internal communication of the high-performance ECU 402, and to relay communication between the inside and outside of the high-performance ECU 402.

Third Variation

Figure 29:
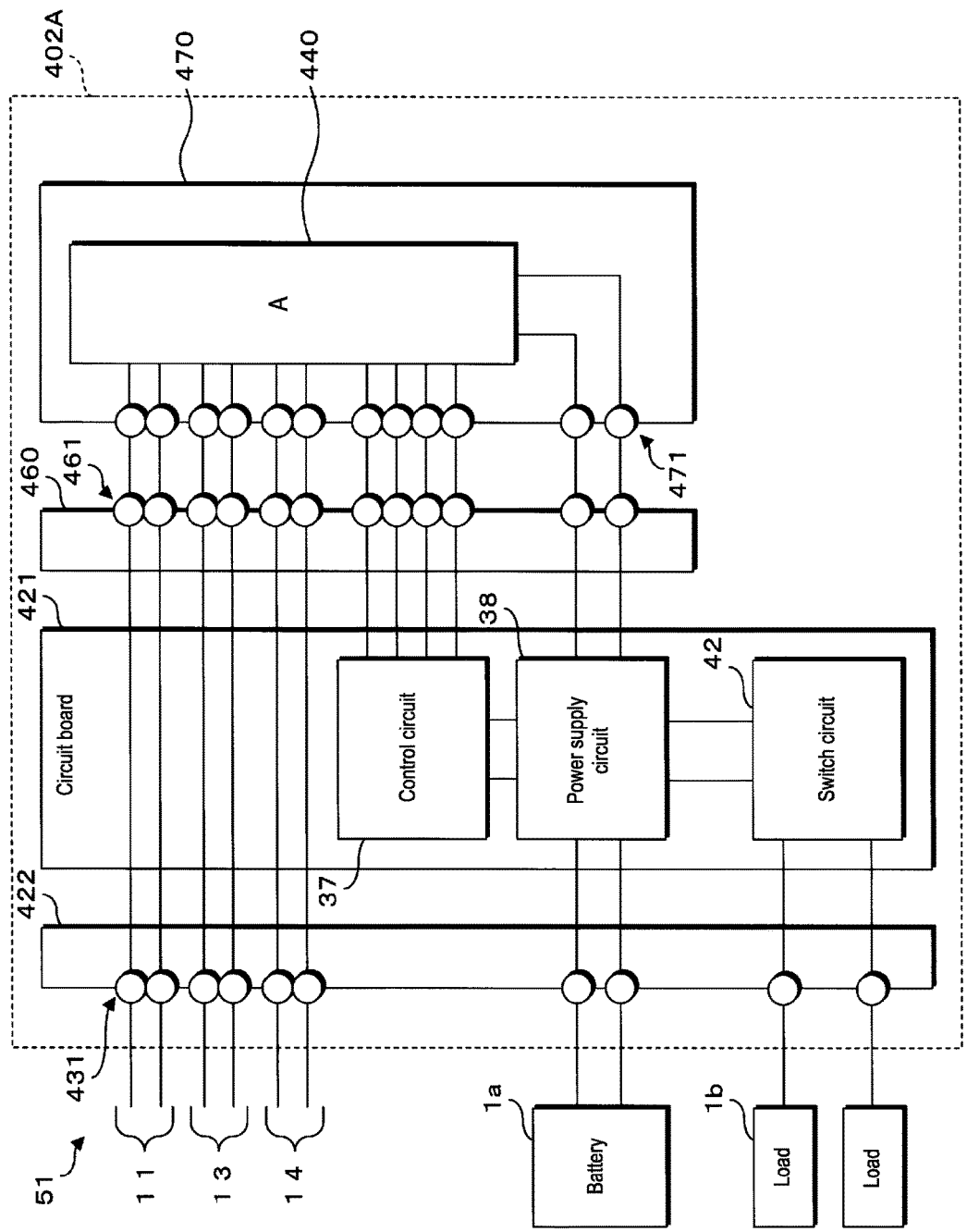
FIG. 29 is a block diagram showing the configuration of a power supply device according to a third variation of the fourth embodiment.

FIG. 29 is a block diagram showing the configuration of a power supply device 402A according to a third variation of the fourth embodiment. The third variation of the fourth embodiment is an example in which the abovementioned configuration is applied to a power supply device 402A that supplies power to various loads 1b installed in the vehicle 1, instead of being applied to the high-performance ECU 402, similarly to the sixth variation of the first embodiment. In the power supply device 402A according to the third variation of the fourth embodiment, a card slot 460 having a similar configuration to that shown in FIG. 26 is installed on the circuit board 421. Also, the communication card 470 according to the third variation has a similar configuration to that shown in FIG. 26, and detailed illustration of the internal configuration thereof is omitted in FIG. 29.

In the power supply device 402A according to the third variation of the fourth embodiment, the switch circuit 42 is provided on the circuit board 421, along with the control circuit 37 and the power supply circuit 38. Also, the plurality of harness-side terminals 431 provided in the connector 422 of the power supply device 402A include terminals to which the communication lines 11, 13 and 14 are connected, and that are electrically connected to the terminals 471 of the communication card 470 mounted in the card slot 460. Also, the plurality of harness-side terminals 431 include terminals to which the power line from the battery 1a is connected, and that are electrically connected to the power supply circuit 38 provided on the circuit board 421. Also, the plurality of harness-side terminals 431 include terminals to which the power lines for supplying power to the loads 1b are connected, and that are electrically connected to the switch circuit 42 provided on the circuit board 421.

The switch circuit 42 receives power supply from the power supply circuit 38. The switch circuit 42 is provided with a plurality of switching elements, and switches between supplying and not supplying power to the loads 1b, by turning the respective switching elements on/off in accordance with control by the control circuit 37. Note that, in FIG. 25, illustration of the transmission path of control signals from the control circuit 37 to the switch circuit 42 is omitted.

The power supply device 402A according to the above third variation is provided with the card slot 460 that removably mounts the communication card 470 provided with the communication relay function. The plurality of communication lines 11, 13 and 14, the power line that receive power supply from the battery 1a of the vehicle 1 and the power lines that supply power to the loads 1b of the vehicle 1 are connected to the connector 422 of the power supply device 402A. Also, the power supply device 402A is provided with the power supply circuit 38 that converts the voltage value of power that is supplied from the battery 1a via the power line, and supplies power whose voltage value has been converted by the power supply circuit 38 to the loads 1b of the vehicle 1. Also, the power supply circuit 38 supplies power to the control circuit 37 provided on the circuit board 421 and the communication card 470 mounted in the card slot 460. With these configurations, it becomes possible for the power supply device 402A according to the third variation to perform distribution of power that is supplied from the battery 1a to the loads 1b, and relay of communication using the communication card 470. As exemplified by the power supply device 402A according to the third variation, the communication card 470 according to the fourth embodiment can be used in a variety of in-vehicle devices apart from the high-performance ECU 402.

Fourth Variation

Figure 30:
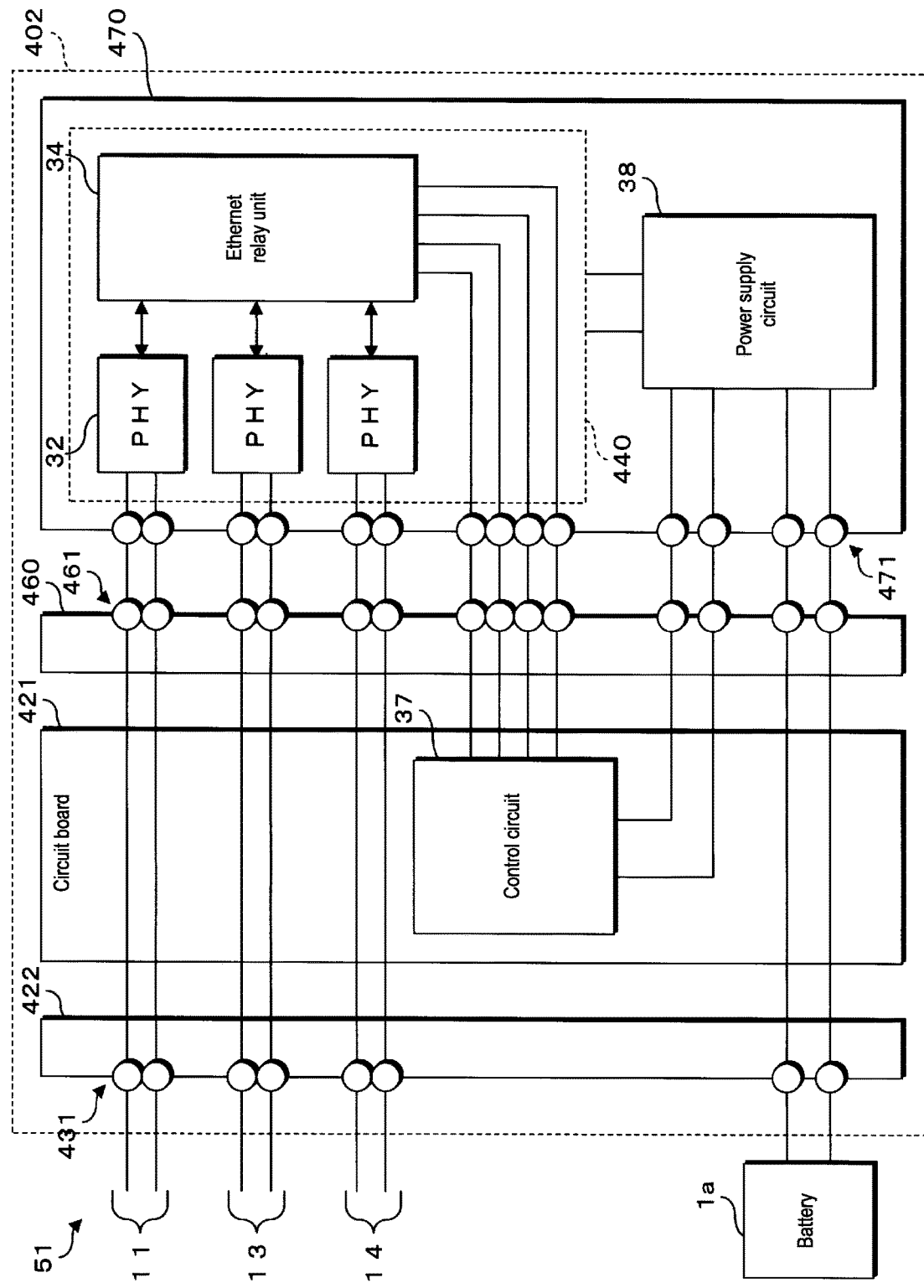
FIG. 30 is a block diagram showing the configuration of an in-vehicle communication system according to a fourth variation of the fourth embodiment.

FIG. 30 is a block diagram showing the configuration of an in-vehicle communication system according to a fourth variation of the fourth embodiment. In the in-vehicle communication system according to the fourth variation, the communication card 470 is provided with the power supply circuit 38, and the high-performance ECU 402 is not provided with the power supply circuit 38.

The power line that receive power supply from the battery 1a of the vehicle 1 is connected to the connector 422 of the high-performance ECU 402. The power from the battery 1a is supplied to the power supply circuit 38 from the terminals 471 of the communication card 470, via the harness-side terminals 431 of the connector 422, the wiring pattern of the circuit board 421, and the card-side terminals 461 of the card slot 460.

Power that is output after the voltage value thereof has been converted by the power supply circuit 38 is supplied to the communication IC 440, along with being output by the terminals 471. The power that is output by the terminals 471 of the communication card 470 is provided to the control circuit 37 of the circuit board 421 via the card-side terminals 461 of the card slot 460 of the high-performance ECU 402.

Note that, in the in-vehicle communication system according to the fourth variation, a configuration was adopted in which the communication card 470 is provided with the power supply circuit 38, but the present invention is not limited thereto. For example, a configuration may be adopted in which communication and power supply are performed with common lines using the PoE protocol. In this case, a configuration may be adopted in which power is supplied via any of the communication lines 11, 13 and 14, and neither the high-performance ECU 402 nor the communication card 470 is provided with the power supply circuit 38.

Since the remaining configuration of the in-vehicle communication system according to the fourth embodiment is similar to the in-vehicle communication system according to the first embodiment, the same reference symbols are given to similar parts, and detailed description thereof is omitted.

Fifth Embodiment

Figure 31:
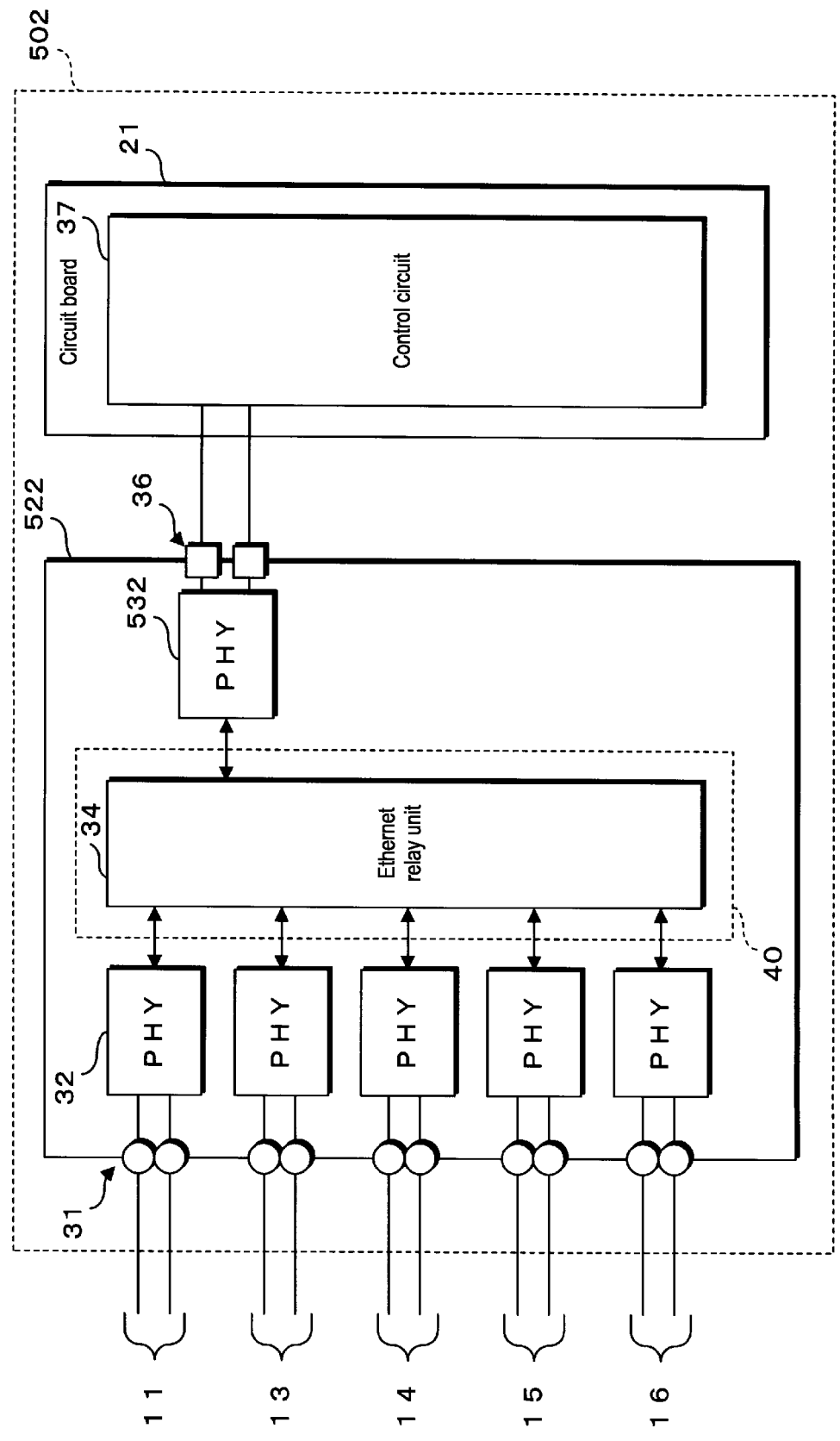
FIG. 31 is a block diagram showing the configuration of a high-performance ECU according to a fifth embodiment.

FIG. 31 is a block diagram showing the configuration of a high-performance ECU 502 according to a fifth embodiment. The high-performance ECU 502 according to the fifth embodiment has a configuration in which a connector 522 provided with a relay function is mounted on the circuit board 21, similarly to the high-performance ECU 2 according to the first embodiment shown in FIGS. 1 to 14. In the high-performance ECU 502 according to the fifth embodiment, however, communication compliant with the Ethernet communication protocol is performed between the control circuit 37 of the circuit board 21 and the connector 522. Note that, in FIG. 31, illustration with regard to the power supply circuit and power supply paths is omitted.

The connector 522 according to the fifth embodiment is provided with five Ethernet PHYs 32 for communicating via the five communication lines 11 and 13 to 16, and an Ethernet PHY 532 for communicating with the control circuit 37 of the circuit board 21. Also, in the connector 522 according to the fifth embodiment, the six Ethernet PHYs 32 and 532 are each mounted on a connector board inside the connector 522 as individual ICs, rather than being provided inside the communication IC having the Ethernet relay unit 34.

Figure 32:
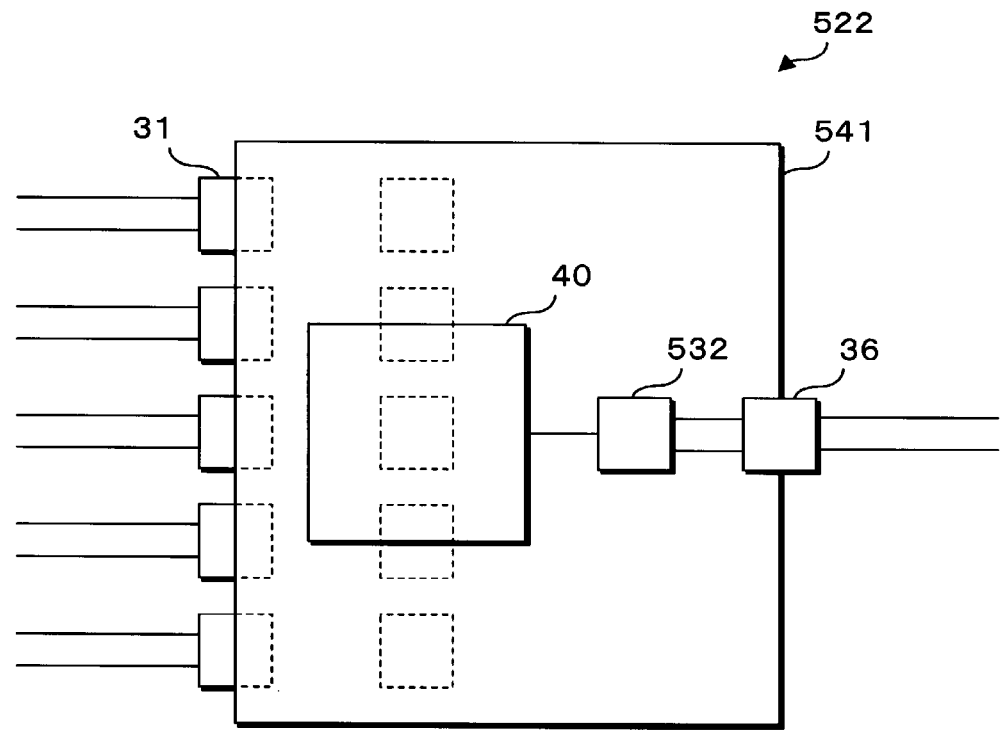
FIG. 32 is a schematic diagram showing an example IC arrangement on the front surface of a connector board of a connector according to the fifth embodiment.
Figure 33:
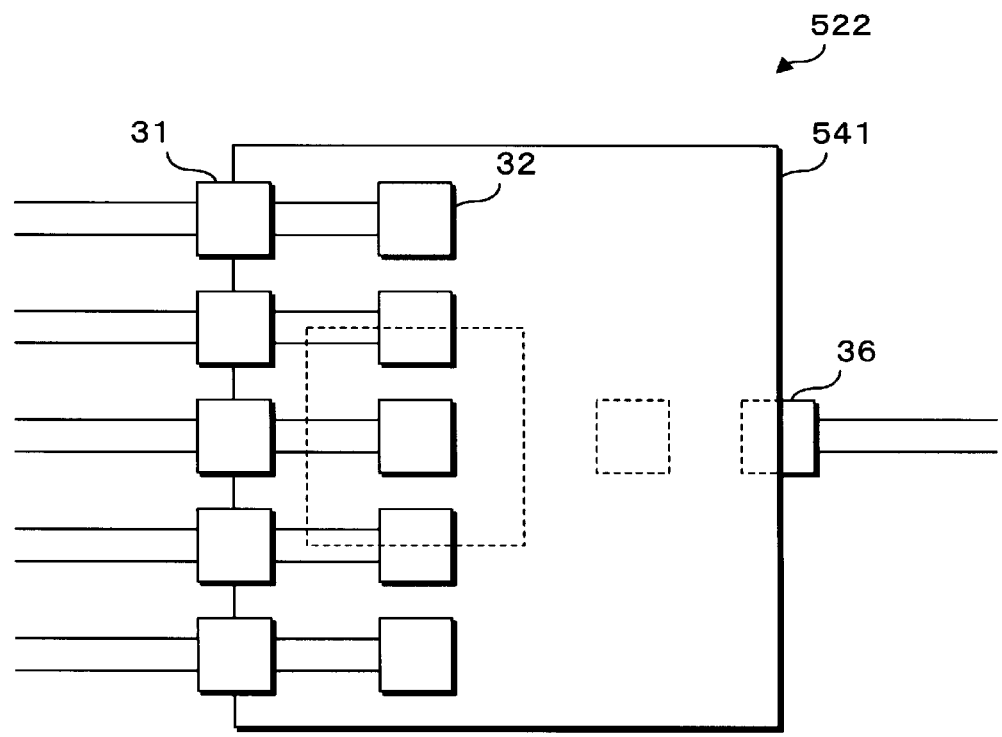
FIG. 33 is a schematic diagram showing an example IC arrangement on the back surface of the connector board of the connector according to the fifth embodiment.

FIG. 32 is a schematic diagram showing an example IC arrangement on the front surface of a connector board 541 of the connector 522 according to the fifth embodiment. Also, FIG. 33 is a schematic diagram showing an example IC arrangement on the back surface of the connector board 541 of the connector 522 according to the fifth embodiment. Note that, hereinafter, FIG. 32 is taken as the front surface of the connector board 541 and FIG. 33 is taken as the back surface, but this is for conveniently defining the front and back, and the front/back relationship may be reversed. Also, in FIGS. 32 and 33, the harness-side terminals 31 and the in-vehicle device-side terminals 36 that are provided in sets of two in FIG. 31 are respectively shown with a single rectangular block.

The connector board 541 of the connector 522 is a member having a flat rectangular shape. One in-vehicle device-side terminal 36 is provided approximately in the middle of the edge on one side (edge on right side in FIGS. 32 and 33) of the connector board 541. Five harness-side terminals 31 are provided side by side along the edge on the other side (edge on left side in FIGS. 32 and 33) of the connector board 541. The five harness-side terminals 31 are, however, provided on the back surface of the connector board 541, and the one in-vehicle device-side terminal 36 is provided on the front surface of the connector board 541.

As shown in FIG. 32, the communication IC 40, the Ethernet PHY 532 and the in-vehicle device-side terminals 36 are mounted on the front surface of the connector board 541. The communication IC 40 and the Ethernet PHY 532 are electrically connected via a wiring pattern provided on the connector board 541, and the Ethernet PHY 532 and the in-vehicle device-side terminal 36 are electrically connected via a wiring pattern provided on the connector board 541. The communication IC 40, the Ethernet PHY 532 and the in-vehicle device-side terminal 36 are disposed so as to be side by side in a straight line on the connector board 541. That is, the Ethernet PHY 532 is located between the communication IC 40 and the in-vehicle device-side terminal 36, and is disposed on a straight line connecting the communication IC 40 and the in-vehicle device-side terminal 36. The communication path that is routed from the communication IC 40 to the in-vehicle device-side terminal 36 via the Ethernet PHY 532 can thereby be further shortened, and effects such as reduction in communication delay can be expected.

As shown in FIG. 33, the five harness-side terminals 31 and the five Ethernet PHYs 32 are mounted on the back surface of the connector board 541. The harness-side terminals 31 and the Ethernet PHYs 32 are respectively electrically connected via a wiring pattern provided on the connector board 541. Also, the five Ethernet PHYs 32 provided on the back surface of the connector board 541 and the communication IC 40 provided on the front surface of the connector board 541 are electrically connected via a wiring pattern provided to pass through from the back to the front inside the connector board 541. The five harness-side terminals 31 are provided side by side along one edge of the connector board 541. The five Ethernet PHYs 32 are provided side by side in a row, separated by a predetermined interval from the five harness-side terminals 31. Also, the mounting positions of some of the five Ethernet PHYs 32 are on the opposite side (back side) to the mounting position of the communication IC 40 on the front surface of the connector board 541. By disposing the Ethernet PHYs 32 and the communication IC 40 so as to overlap on the back and front, the distance (wiring length) between the Ethernet PHYs 32 and the communication IC 40 can be shortened, and miniaturization of the connector board 541 can be expected.

With the connector 522 according to the fifth embodiment having the above configuration, by disposing the communication IC 40, the Ethernet PHY 532 and the in-vehicle device-side terminal 36 on the connector board 541 so as to be side by side in a straight line, effects such as reduction in communication delay can be expected. Also, in the connector 522, by mounting the communication IC 40 on the front surface of the connector board 541, and mounting the Ethernet PHYs 32 on the back surface of the connector board 541 such that the mounting positions overlap, effects such as reduction in communication delay and miniaturization of the connector board 541 can be expected.

Note that, in the fifth embodiment, the connector 522 in the case where Ethernet was employed as the communication protocol was described as an example, but the communication protocol is not limited to Ethernet, and CAN or other communication protocols may be employed, or a plurality of communication protocols may be used together.

Also, in the present example, the Ethernet PHY 532 and the in-vehicle device-side terminal 36 are mounted on the front surface of the connector board 541, and the Ethernet PHYs 32 and the harness-side terminals 31 are mounted on the back surface of the connector board 541, but the present invention is not limited thereto. The Ethernet PHY 532 and the in-vehicle device-side terminal 36 may be mounted on the back surface of the connector board 541, and the Ethernet PHYs 32 and the harness-side terminals 31 may be mounted on the front surface of the connector board 541 along with the communication IC 40.

Since the remaining configuration of the in-vehicle communication system according to the fifth embodiment is similar to the in-vehicle communication system according to the first embodiment, the same reference symbols are given to similar parts, and detailed description thereof is omitted.

First Variation

Figure 34:
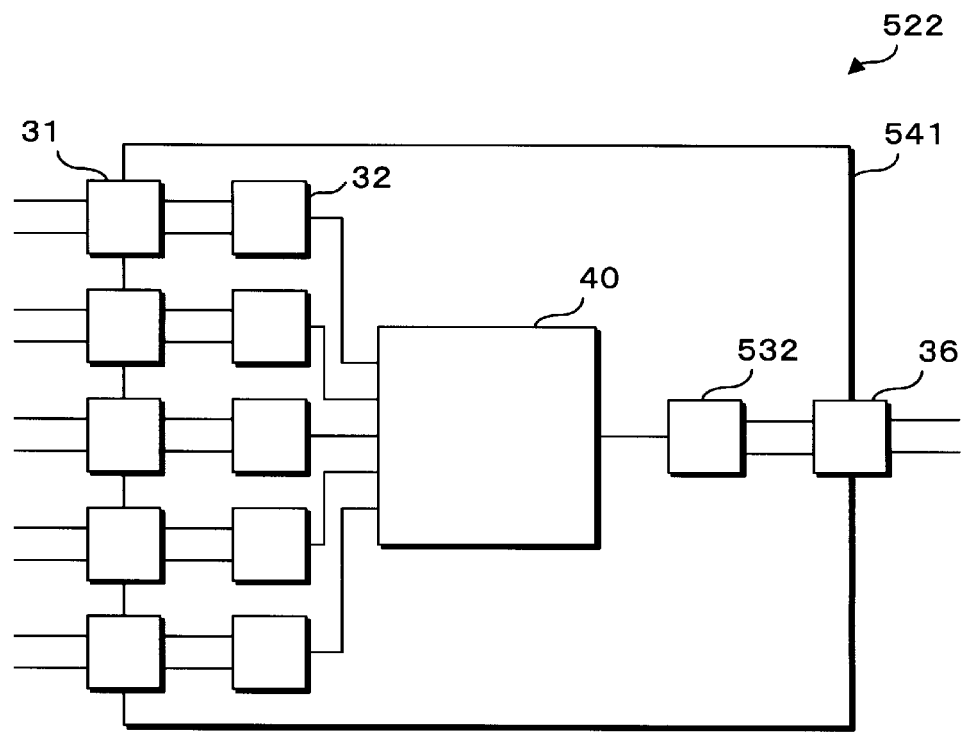
FIG. 34 is a schematic diagram showing an example IC arrangement on a connector board of a connector according to a first variation of the fifth embodiment.

FIG. 34 is a schematic diagram showing an example IC arrangement on the connector board 541 of a connector 522 according to a first variation of the fifth embodiment. The connector 522 shown in FIGS. 32 and 33 has a configuration in which the ICs are mounted on the back and front of the connector board 541, but the connector 522 according to the first variation shown in FIG. 34 has a configuration in which the ICs are mounted on the front surface of the connector board 541.

The connector 522 according to the first variation is provided with the communication IC 40, five harness-side terminals 31, one in-vehicle device-side terminal 36, five Ethernet PHYs 32, and one Ethernet PHY 532, and is configured such that these components are mounted on one surface (front surface) of the connector board 541. The connector board 541 is a member having a flat rectangular shape. The one in-vehicle device-side terminal 36 is provided approximately in the middle of the edge on one side (edge on right side in FIG. 34) of the connector board 541. The five harness-side terminals 31 are provided side by side along the edge on the other side (edge on left side in FIG. 34) of the connector board 541.

The communication IC 40 is installed in the middle of the connector board 541. The communication IC 40 and the Ethernet PHY 532 are electrically connected via a wiring pattern provided on the connector board 541, and the Ethernet PHY 532 and the in-vehicle device-side terminal 36 are electrically connected via a wiring pattern provided on the connector board 541. The communication IC 40, the Ethernet PHY 532 and the in-vehicle device-side terminal 36 are disposed so as to be side by side in a straight line on the connector board 541. That is, the Ethernet PHY 532 is located between the communication IC 40 and the in-vehicle device-side terminal 36, and is disposed on a straight line connecting the communication IC 40 and the in-vehicle device-side terminal 36. The communication path that is routed from the communication IC 40 to the in-vehicle device-side terminal 36 via to the Ethernet PHY 532 can thereby be further shortened, and effects such as reduction in communication delay can be expected.

The harness-side terminals 31 and the Ethernet PHYs 32 are respectively electrically connected via a wiring pattern provided on the connector board 541, and the five Ethernet PHYs 32 and the communication IC 40 are electrically connected via a wiring pattern provided on the connector board 541. The five harness-side terminals 31 are provided side by side along one edge of the connector board 541. The five Ethernet PHYs 32 are provided side by side in a row, separated by a predetermined interval from the five harness-side terminals 31. Also, with regard to at least one of the five sets of harness-side terminals 31 and Ethernet PHYs 32, the harness-side terminal 31, the Ethernet PHY 32 and the communication IC 40 are disposed so as to be side by side in a straight line on the connector board 541. That is, with regard to this one set, the Ethernet PHY 32 is located between the harness-side terminal 31 and the communication IC 40, and is disposed on a straight line connecting the harness-side terminals 31 and the communication IC 40. The communication path that is routed from the harness-side terminals 31 to the communication IC 40 via the Ethernet PHYs 32 can thereby be further shortened, and effects such as reduction in communication delay can be expected.

Also, in the connector 522 according to the first variation, the harness-side terminals 31 and the in-vehicle device-side terminal 36 are respectively disposed on two opposing edges (right and left edges in FIG. 34) of the connector board 541 having a flat rectangular shape. At least one harness-side terminal 31, the Ethernet PHY 32 corresponding thereto, the communication IC 40, the Ethernet PHY 532 and the in-vehicle device-side terminal 36 are disposed so as to be side by side in a straight line on the connector board 541.

Second Variation

Figure 35:
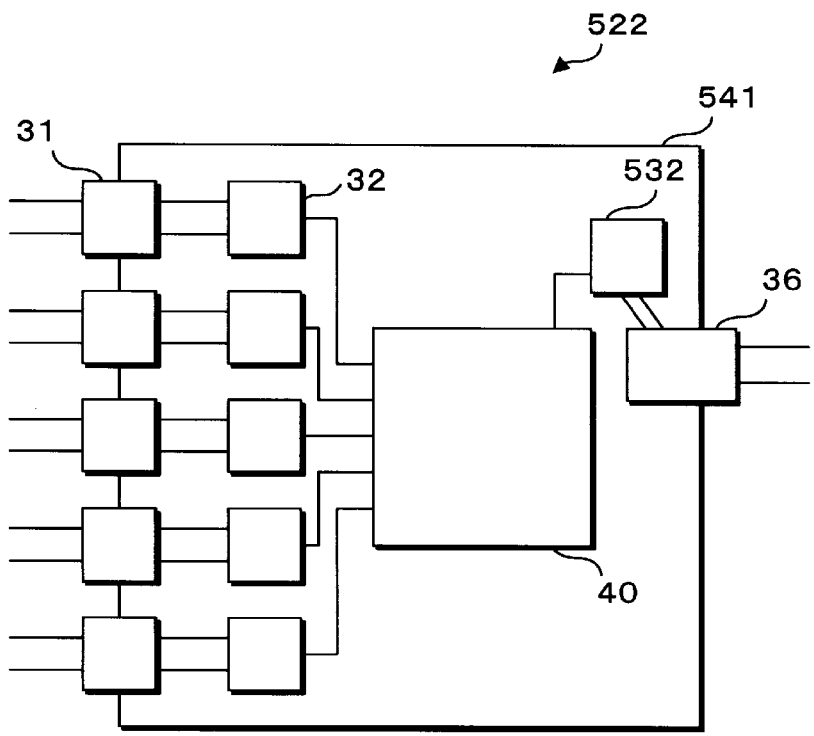
FIG. 35 is a schematic diagram showing an example IC arrangement on a connector board of a connector according to a second variation of the fifth embodiment.

FIG. 35 is a schematic diagram showing an example IC arrangement on the connector board 541 of a connector 522 according to a second variation of the fifth embodiment. The connector 522 according to the second variation has a configuration in which the ICs are mounted on the front surface of the connector board 541, similarly to the connector 522 according to the first variation shown in FIG. 34. Also, the arrangement of the harness-side terminals 31, Ethernet PHYs 32 and communication IC 40 of the connector 522 according to the second variation is similar to the connector 522 according to the first variation.

In the connector 522 according to the second variation, the Ethernet PHY 532 is not disposed between the communication IC 40 and the in-vehicle device-side terminal 36. In the connector 522 according to the second variation, the communication IC 40 is disposed as adjacent (close) as possible to the in-vehicle device-side terminal 36 on the connector board 541. That is, the communication IC 40 and the in-vehicle device-side terminal 36 are preferably disposed close together, such that the interval between the communication IC 40 and the in-vehicle device-side terminal 36 will be smaller than at least the interval required for disposing the Ethernet PHY 532. The Ethernet PHY 532 is adjacently disposed side by side with the in-vehicle device-side terminal 36, in the direction of the edge (edge on right side in FIG. 35) of the connector board 541 on which the in-vehicle device-side terminal 36 is provided. That is, the Ethernet PHY 532 and the in-vehicle device-side terminal 36 are preferably disposed close together, such that the interval between the Ethernet PHY 532 and the in-vehicle device-side terminal 36 will be smaller than at least the interval required for disposing the communication IC 40. The Ethernet PHY 532 may, however, be disposed adjacent to the communication IC 40.

The communication IC 40 and the Ethernet PHY 532 are electrically connected via a wiring pattern provided on the connector board 541, and the Ethernet PHY 532 and the in-vehicle device-side terminal 36 are electrically connected via a wiring pattern provided on the connector board 541.

Also, the harness-side terminals 31 and the Ethernet PHYs 32 are respectively electrically connected via a wiring pattern provided on the connector board 541, and the five Ethernet PHYs 32 and the communication IC 40 are electrically connected via a wiring pattern provided on the connector board 541.

With the connector 522 according to the second variation, by disposing the communication IC 40 and the in-vehicle device-side terminal 36 adjacent to each other, effects such as miniaturization of the connector board 541 can be expected. Also, by adjacently disposing the Ethernet PHY 532 that mediates signal transmission between the communication IC 40 and the in-vehicle device-side terminal 36 side by side with the communication IC 40 or the in-vehicle device-side terminal 36, the communication path between the Ethernet PHY 532 and the communication IC 40 or the communication path between the Ethernet PHY 532 and the in-vehicle device-side terminal 36 can be shortened, and effects such as reduction in communication delay can be expected.

Third Variation

Figure 36:
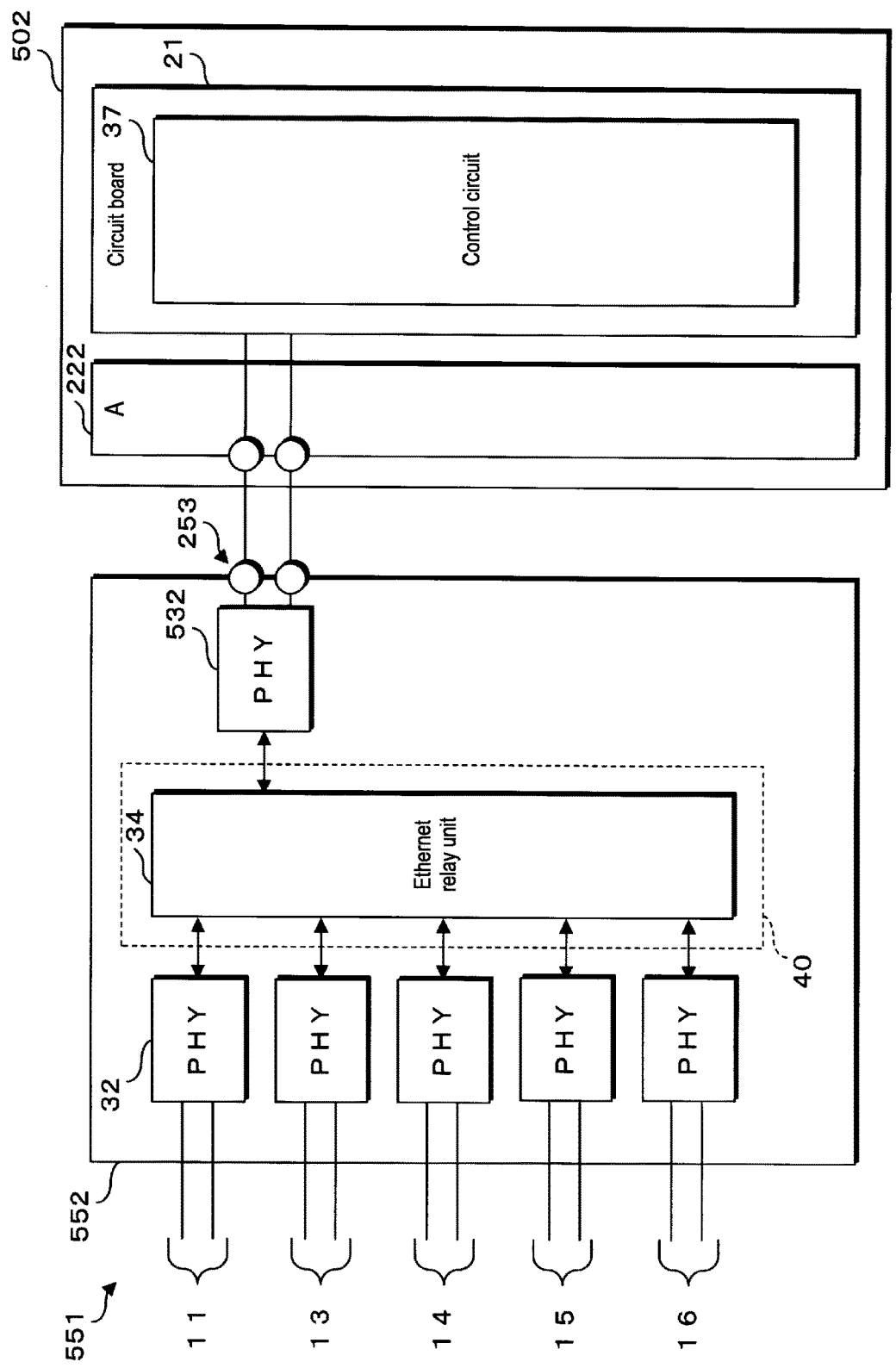
FIG. 36 is a block diagram showing the configuration of an in-vehicle communication system according to a third variation of the fifth embodiment.

FIG. 36 is a block diagram showing the configuration of an in-vehicle communication system according to a third variation of the fifth embodiment. The in-vehicle communication system according to the third variation has a configuration in which a wire harness 551 provided with a connector 552 having a relay function is detachably connected to the high-performance ECU 502 provided with the connector 222, similarly to the in-vehicle communication system according to the second embodiment shown in FIGS. 15 to 20. In the in-vehicle communication system according to the third variation of the fifth embodiment, however, communication compliant with the Ethernet communication protocol is performed between the control circuit 37 of the high-performance ECU 502 and the connector 552 of the wire harness 551. Note that, in FIG. 36, illustration with regard to the power supply circuit and power supply paths is omitted.

The connector 552 of the wire harness 551 according to the third variation is provided with five Ethernet PHYs 32 for performing communication via the five communication lines 11 and 13 to 16, and the Ethernet PHY 532 for communicating with the high-performance ECU 502. Also, in the connector 552 according to the third variation, the six Ethernet PHYs 32 and 532 are each mounted on a connector board inside the connector 552 as individual ICs, rather than being provided inside the communication IC having the Ethernet relay unit 34.

Figure 37:
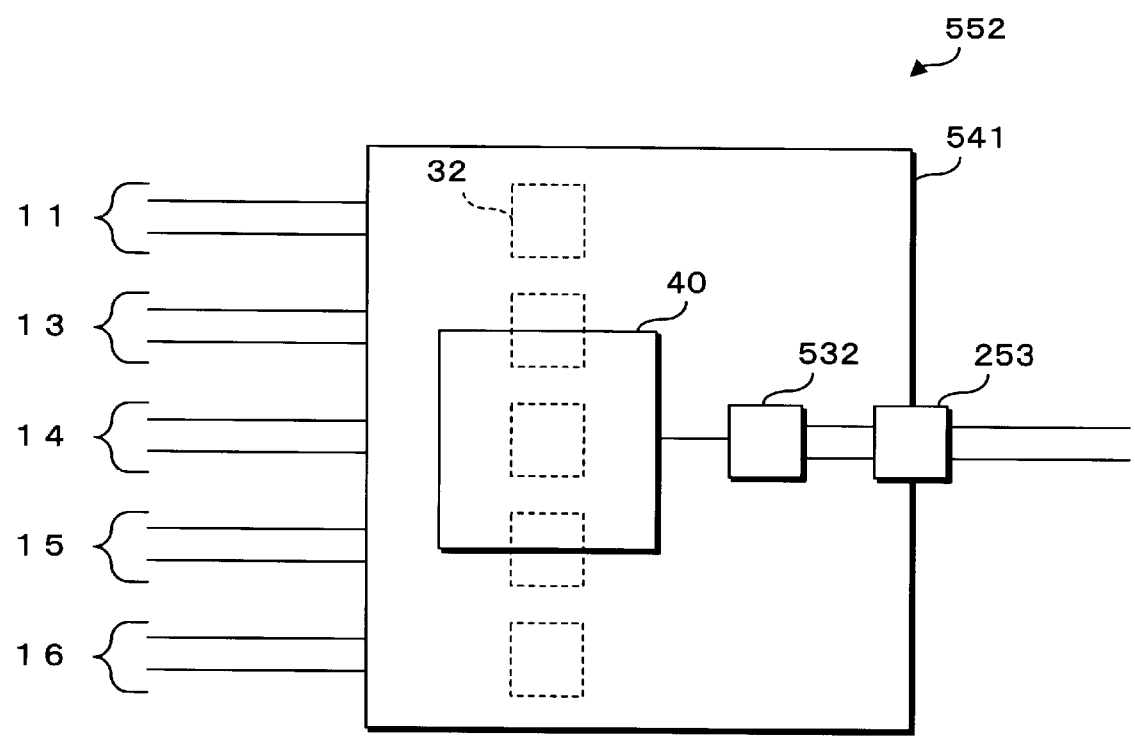
FIG. 37 is a schematic diagram showing an example IC arrangement on the front surface of a connector board of a connector according to the third variation of the fifth embodiment.

FIG. 37 is a schematic diagram showing an example IC arrangement on the front surface of the connector board 541 of the connector 552 according to the third variation of the fifth embodiment. Note that although separate illustration with regard to the configuration of the back surface of the connector board 541 is omitted, the positions of components such as ICs that are disposed on the back surface are shown with dashed lines in FIG. 37. Also, in FIG. 37, terminals 253 that are provided in a set of two in FIG. 36 are shown with a single rectangular block. The configuration of the connector 552 according to the third variation is a similar configuration to the connector 522 according to the fifth embodiment shown in FIGS. 32 and 33.

The connector board 541 of the connector 552 according to the third variation is a member having a flat rectangular shape. The plurality of communication lines 11 and 13 to 16 are connected to the back surface, on the edge on one side (edge on left side in FIG. 37) of the connector board 541. The terminal 253 is provided approximately in the middle of the edge on the other side (edge on right side in FIG. 37) of the front surface of the connector board 541.

The communication IC 40, the Ethernet PHY 532 and the terminal 253 are mounted on the front surface of the connector board 541. The communication IC 40 and the Ethernet PHY 532 are electrically connected via a wiring pattern provided on the connector board 541, and the Ethernet PHY 532 and the terminal 253 are electrically connected via a wiring pattern provided on the connector board 541. The communication IC 40, the Ethernet PHY 532 and the terminal 253 are disposed so as to be side by side in a straight line on the connector board 541. That is, the Ethernet PHY 532 is located between the communication IC 40 and the terminal 253, and is disposed on a straight line connecting the communication IC 40 and the terminal 253. The communication path that is routed from the communication IC 40 to the terminal 253 via the Ethernet PHY 532 can thereby be further shortened, and effects such as reduction in communication delay can be expected.

The five Ethernet PHYs 32 are mounted on the back surface of the connector board 541. The Ethernet PHYs 32 are respectively electrically connected to the communication lines 11 and 13 to 16 connected to the back surface of the connector board 541, via a wiring pattern provided on the connector board 541. Also, the five Ethernet PHYs 32 provided on the back surface of the connector board 541 and the communication IC 40 provided on the front surface of the connector board 541 are electrically connected, via a wiring pattern provided to pass through from the back to the front inside the connector board 541. The five Ethernet PHYs 32 are provided side by side in a row. Also, the mounting positions of some of the five Ethernet PHYs 32 are on the opposite side (back side) to the mounting position of the communication IC 40 on the front surface of the connector board 541. By disposing the Ethernet PHYs 32 and the communication IC 40 so as to overlap on the back and front, the distance (wiring length) between the Ethernet PHYs 32 and the communication IC 40 can be shortened, and miniaturization of the connector board 541 can be expected.

Note that the connector 552 of the wire harness 551 according to the third variation employs a similar configuration to the connector 522 shown in FIGS. 32 and 33, but the present invention is not limited thereto. The connector 552 of the wire harness 551 may employs a similar configuration to the connector 522 according to the first variation shown in FIG. 34 or the connector 522 according to the second variation shown in FIG. 35.

Fourth Variation

Figure 38:
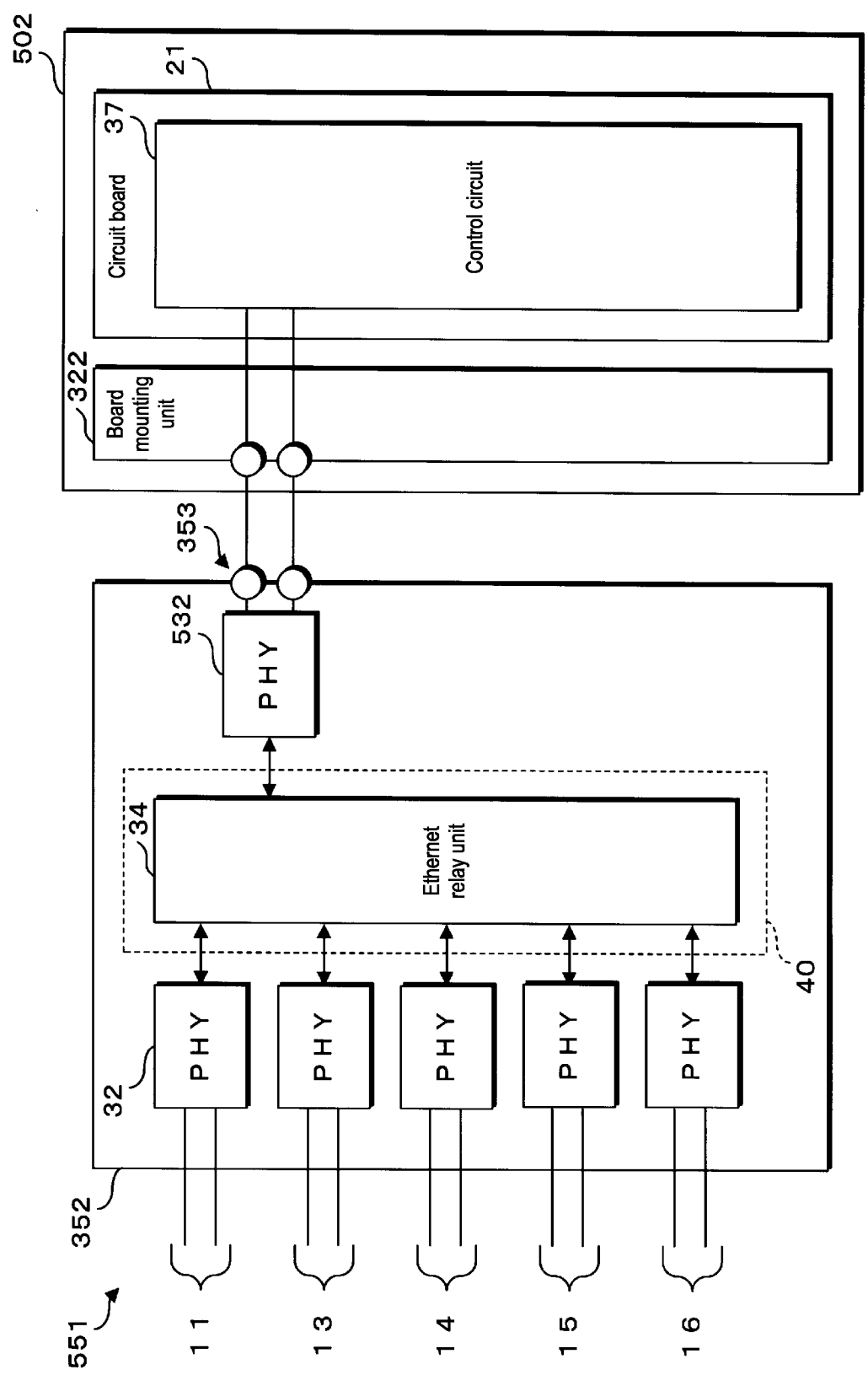
FIG. 38 is a block diagram showing the configuration of an in-vehicle communication system according to a fourth variation of the fifth embodiment.

FIG. 38 is a block diagram showing the configuration of an in-vehicle communication system according to a fourth variation of the fifth embodiment. The in-vehicle communication system according to the fourth variation has a configuration in which the wire harness 551 provided with the circuit board 352 having a relay function is detachably mounted to the high-performance ECU 502 provided with the board mounting unit 322, similarly to the in-vehicle communication system according to the third embodiment shown in FIGS. 21 to 24. In the in-vehicle communication system according to the fourth variation of the fifth embodiment, however, communication compliant with the Ethernet communication protocol is performed between the control circuit 37 of the high-performance ECU 502 and the circuit board 352 of the wire harness 551. Note that, in FIG. 38, illustration with regard to the power supply circuit and power supply paths is omitted.

The circuit board 352 of the wire harness 551 according to the fourth variation is provided with five Ethernet PHYs 32 for performing communication via the five communication lines 11 and 13 to 16, and the Ethernet PHY 532 for communicating with the high-performance ECU 502. Also, on the circuit board 352 according to the fourth variation, the six Ethernet PHYs 32 and 532 are each mounted on the circuit board 352 as individual ICs, rather than being provided inside the communication IC having the Ethernet relay unit 34.

Figure 39:
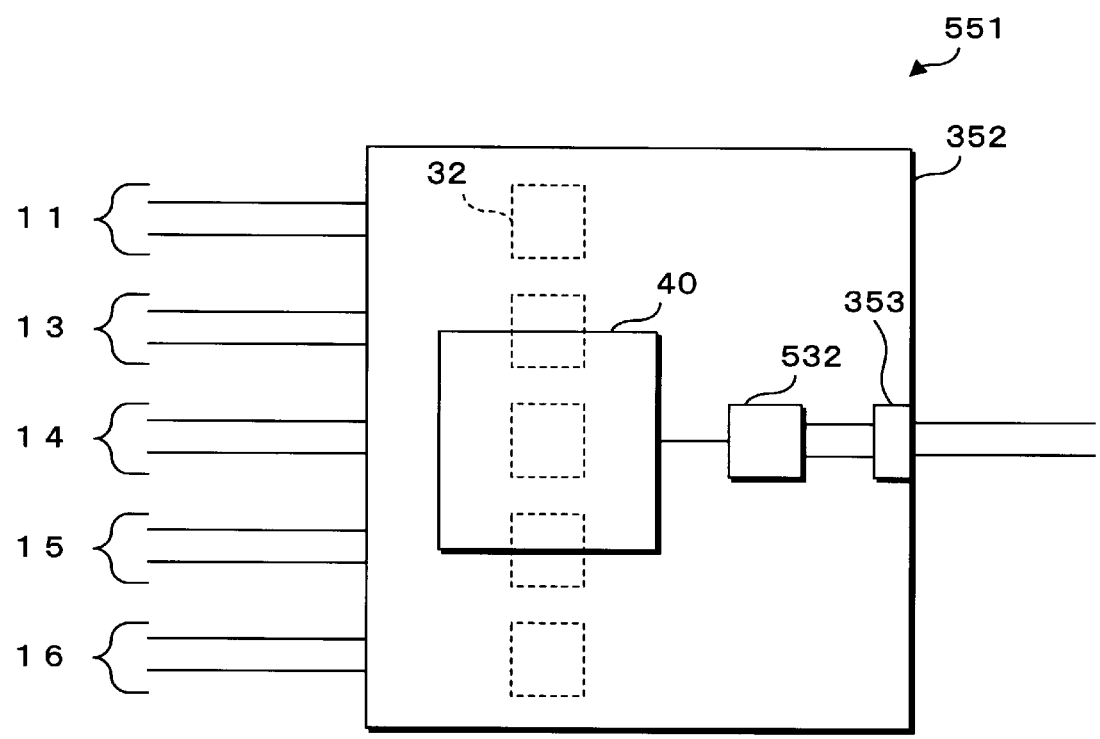
FIG. 39 is a schematic diagram showing an example IC arrangement on the front surface of a circuit board of a wire harness according to the fourth variation of the fifth embodiment.

FIG. 39 is a schematic diagram showing an example IC arrangement on the front surface of the circuit board 352 of the wire harness 551 according to the fourth variation of the fifth embodiment. Note that although separate illustration with regard to the configuration of the back surface of the circuit board 352 is omitted, the positions of components such as ICs that are disposed on the back surface are shown with dashed lines in FIG. 39. Also, in FIG. 39, terminals 353 that are provided in a set of two in FIG. 38 are shown with a single rectangular block. The configuration of the circuit board 352 according to the fourth variation is a similar configuration to the connector board 541 of the connector 522 according to the fifth embodiment shown in FIGS. 32 and 33.

The circuit board 352 of the wire harness 551 according to the fourth variation is a member having a flat rectangular shape. The terminal 353 is provided approximately in the middle of the edge on one side (edge on right side in FIG. 39) of the front surface of the circuit board 352. The plurality of communication lines 11 and 13 to 16 are connected to the back surface, on the edge on the other side (edge on left side in FIG. 39) of the circuit board 352.

The communication IC 40 and the Ethernet PHY 532 are mounted on the front surface of the circuit board 352 according to the fourth variation, and the terminal 353 is provided thereon. The communication IC 40 and the Ethernet PHY 532 are electrically connected via a wiring pattern provided on the circuit board 352, and the Ethernet PHY 532 and the terminal 353 are electrically connected via a wiring pattern provided on the circuit board 352. The communication IC 40, the Ethernet PHY 532 and the terminal 353 are disposed so as to be side by side in a straight line on the circuit board 352. That is, the Ethernet PHY 532 is located between the communication IC 40 and the terminal 353, and is disposed on a straight line connecting the communication IC 40 and the terminal 353. The communication path that is routed from the communication IC 40 to the terminal 353 via the Ethernet PHY 532 can thereby be further shortened, and effects such as reduction in communication delay can be expected.

The five Ethernet PHYs 32 are mounted on the back surface of the circuit board 352. The Ethernet PHYs 32 are respectively electrically connected to the communication lines 11 and 13 to 16 connected to the back surface of the circuit board 352, via a wiring pattern provided on the circuit board 352. Also, the five Ethernet PHYs 32 provided on the back surface of the circuit board 352 and the communication IC 40 provided on the front surface of the circuit board 352 are electrically connected via a wiring pattern that passes through from the back to the front inside the circuit board 352. The five Ethernet PHYs 32 are provided side by side in a row. Also, the mounting positions of some of the five Ethernet PHYs 32 are on the opposite side (back side) of the mounting position of the communication IC 40 on the front surface of the circuit board 352. By disposing the Ethernet PHYs 32 and the communication IC 40 so as to overlap on the back and front, the distance (wiring length) of the Ethernet PHYs 32 and the communication IC 40 can be shortened, and miniaturization of the circuit board 352 can be expected.

Note that the circuit board 352 of the wire harness 551 according to the fourth variation employs a similar configuration to the connector board 541 of the connector 522 shown in FIGS. 32 and 33, but the present invention is not limited thereto. The circuit board 352 of the wire harness 551 according to the fourth variation may employ a similar configuration to the connector board 541 of the connector 522 according to the first variation shown in FIG. 34 or to the connector board 541 of the connector 522 according to the second variation shown in FIG. 35.

Sixth Embodiment

Figure 40:
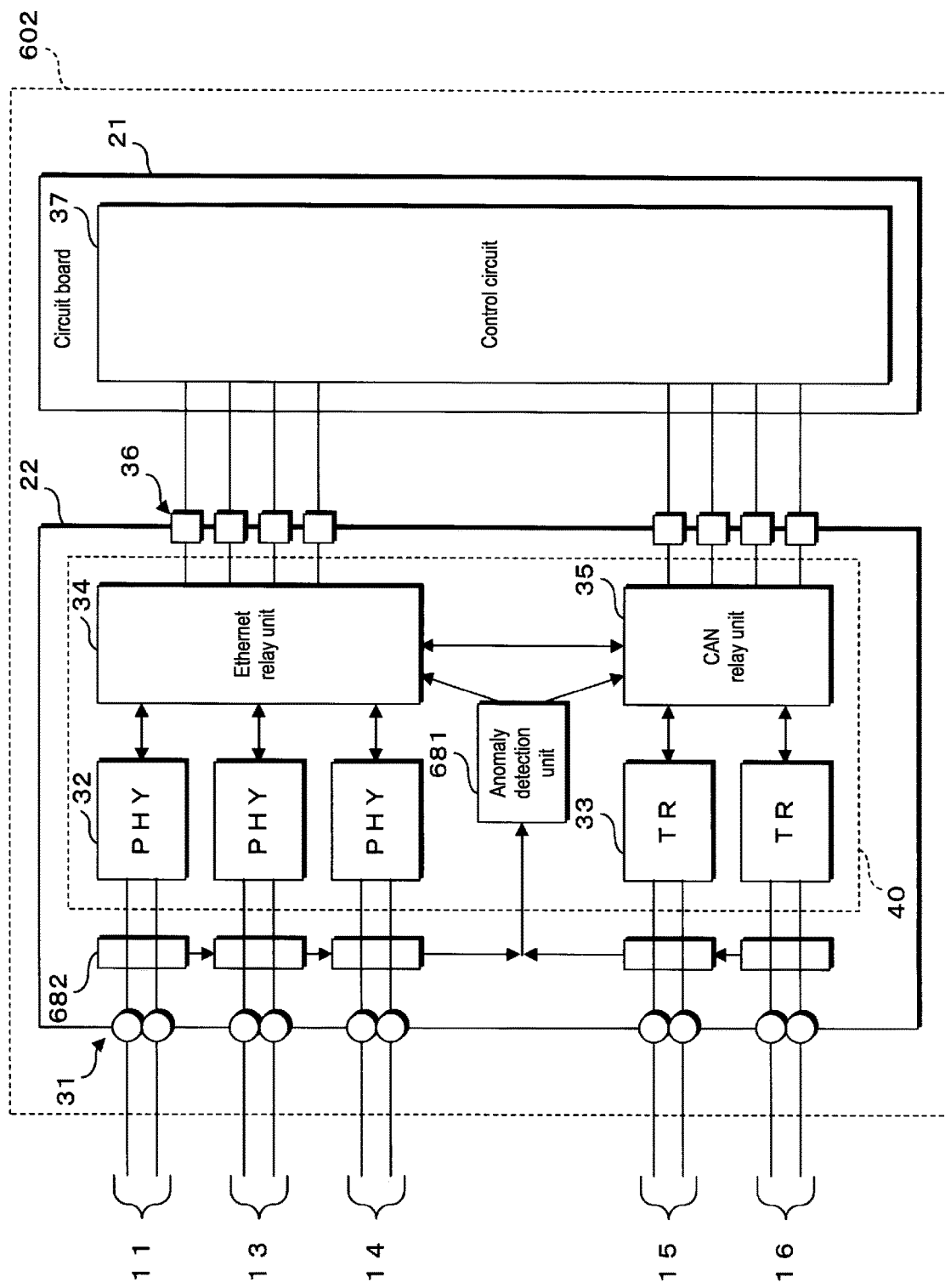
FIG. 40 is a block diagram showing the configuration of a high-performance ECU according to a sixth embodiment.

FIG. 40 is a block diagram showing the configuration of a high-performance ECU 602 according to a sixth embodiment. The high-performance ECU 602 according to the sixth embodiment is obtained by adding a function of detecting anomalies related to the communication lines 11 and 13 to 16, to the high-performance ECU 2 according to the first embodiment shown in FIG. 3. Note that, in FIG. 40, illustration with regard to the power supply circuit and power supply paths is omitted.

The high-performance ECU 602 according to the sixth embodiment has a configuration in which the connector 22 provided with a relay function is mounted on the circuit board 21, and an anomaly detection unit 681 that performs anomaly detection is provided in the connector 22. Note that the anomaly detection unit 681 is provided inside the communication IC 40 in FIG. 40, but is not limited thereto, and may be provided as a separate IC outside the communication IC 40.

A sensor 682 is provided on respective communication paths between five harness-side terminals 31 to which the communication lines 11 and 13 to 16 are connected and three Ethernet PHYs 32 and two CAN transceivers 33 that input and output signals with respect to the connected communication lines 11 and 13 to 16. The sensor 682 is a sensor that detects current flowing through a wire, wiring pattern or the like constituting the communication path. Various sensors can be employed for the sensor 682 that detects current, such as a CT (Current Transformer) sensor that uses a shunt resistor, for example, a sensor using a Hall device, or a Rogowski coil sensor using an air core coil. Note that the sensor 682 may be a sensor that detects the voltage value on the communication path. Also, the sensor 682 may be provided in the harness-side terminals 31, or may be provided inside the Ethernet PHYs 32 or the CAN transceivers 33.

The five sensors 682 that are respectively provided between the harness-side terminals 31 and the Ethernet PHYs 32 or CAN transceivers 33 each output a signal that depends on the current value which is the detection result to the anomaly detection unit 681. The anomaly detection unit 681 performs processing for detecting anomalies on the communication lines 11 and 13 to 16, based on signals respectively provided from the five sensors 682.

Note that any method of anomaly detection by the anomaly detection unit 681 may be employed. For example, the anomaly detection unit 681 is able to calculate impedance related to the communication path based on the current value that is detected by the sensor 682, and detect an anomaly if the impedance or the change in impedance exceeds a threshold value. Also, for example, the anomaly detection unit 681 is able to calculate the time required for a change in the signal related to communication, that is, rounding of the rise or fall of the signal, based on the voltage value that is detected by the sensor 682, and detect an anomaly if the calculated rounding exceeds a threshold value. Also, the anomaly detection unit 681 may perform anomaly detection when normal communication is being performed, for example, or may cause the Ethernet relay unit 34 or the CAN relay unit 35 to transmit a test signal in the case where communication is not being performed, for example, and perform anomaly detection when transmission and reception of this test signal is being performed.

If an anomaly is detected on one of the communication lines 11 and 13 to 16, the anomaly detection unit 681 notifies the anomaly detection to the Ethernet relay unit 34 or the CAN relay unit 35. The Ethernet relay unit 34 or CAN relay unit 35 to which the anomaly detection is notified notifies the anomaly detection to the control circuit 37. In response to notification of the anomaly detection, the control circuit 37 is able to execute processing such as stopping communication that uses whichever of the communication lines 11 and 13 to 16 the anomaly was detected on, or collecting and verifying more detailed information relating to the anomaly.

In the high-performance ECU 602 according to the sixth embodiment having the above configuration, the anomaly detection unit 681 and the sensor 682 are provided in the connector 22, and the anomaly detection unit 681 performs anomaly detection on the communication lines 11 and 13 to 16 that are connected to the harness-side terminals 31. Since the high-performance ECU 602 is thereby able to perform anomaly detection at a place closely approaching the communication lines 11 and 13 to 16, compared with the configuration in which the anomaly detection unit 681 and the sensor 682 are provided on the circuit board 21, for example, more accurate detection of anomalies relating to the communication lines 11 and 13 to 16 can be expected.

Since the remaining configuration of the in-vehicle communication system according to the sixth embodiment is similar to the in-vehicle communication system according to the first embodiment, the same reference symbols are given to similar parts, and detailed description thereof is omitted.

First Variation

Figure 41:
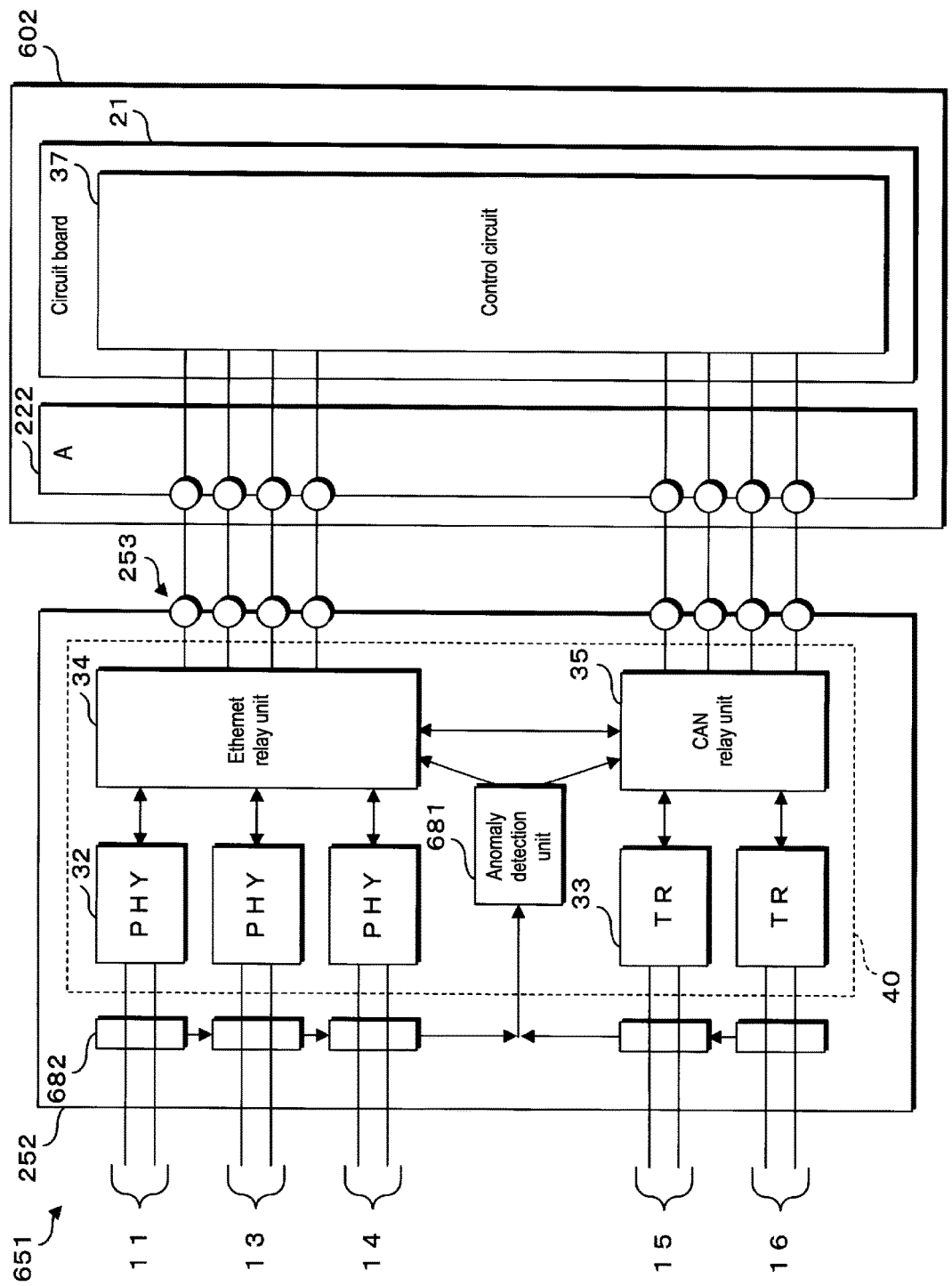
FIG. 41 is a block diagram showing the configuration of an in-vehicle communication system according to a first variation of the sixth embodiment.

FIG. 41 is a block diagram showing the configuration of an in-vehicle communication system according to a first variation of the sixth embodiment. The in-vehicle communication system according to the first variation is obtained by adding the function of detecting anomalies related to the communication lines 11 and 13 to 16 to the in-vehicle communication system according to the second embodiment shown in FIGS. 15 to 20. Note that, in FIG. 41, illustration with regard to the power supply circuit and power supply paths is omitted.

The in-vehicle communication system according to the first variation of the sixth embodiment has a configuration in which a wire harness 651 provided with the connector 252 having a relay function is detachably connected to the high-performance ECU 602 provided with the connector 222. The anomaly detection unit 681 that performs anomaly detection related to the communication lines 11 and 13 to 16 is provided in the connector 252 of the wire harness 651. Note that, in FIG. 41, the anomaly detection unit 681 is provided inside the communication IC 40, but is not limited thereto, and may be provided as a separate IC outside the communication IC 40.

The connector 252 of the wire harness 651 according to the first variation has a configuration in which a connector board on which the communication IC 40 is installed is housed in a housing, the communication lines 11 and 13 to 16 are connected to this connector board, and the communication IC 40 and the communication lines 11 and 13 to 16 are electrically connected via a wiring pattern provided on the connector board. The sensor 682 is respectively provided for communication paths routed from where the communication lines 11 and 13 to 16 are connected to the connector board to the Ethernet PHYs 32 or CAN transceivers 33, or for the communication lines 11 and 13 to 16 connected to the connector board. The sensor 682 is a sensor that detects the current value, voltage value or the like of a wire, wiring pattern or the like constituting the communication path.

The sensors 682 each output a detection result to the anomaly detection unit 681. The anomaly detection unit 681 performs processing for detecting anomalies on the respective communication lines 11 and 13 to 16, based on the detection results provided by the five sensors 682. If an anomaly is detected on one of the communication lines 11 and 13 to 16, the anomaly detection unit 681 notifies the anomaly detection to the Ethernet relay unit 34 or the CAN relay unit 35. The Ethernet relay unit 34 or CAN relay unit 35 to which the anomaly detection is notified notifies the anomaly detection to the control circuit 37 of the high-performance ECU 602. In response to notification of the anomaly detection, the control circuit 37 is able to execute processing such as stopping communication that uses whichever of the communication lines 11 and 13 to 16 the anomaly was detected on, or collecting and verifying more detailed information relating to the anomaly.

Second Variation

Figure 42:
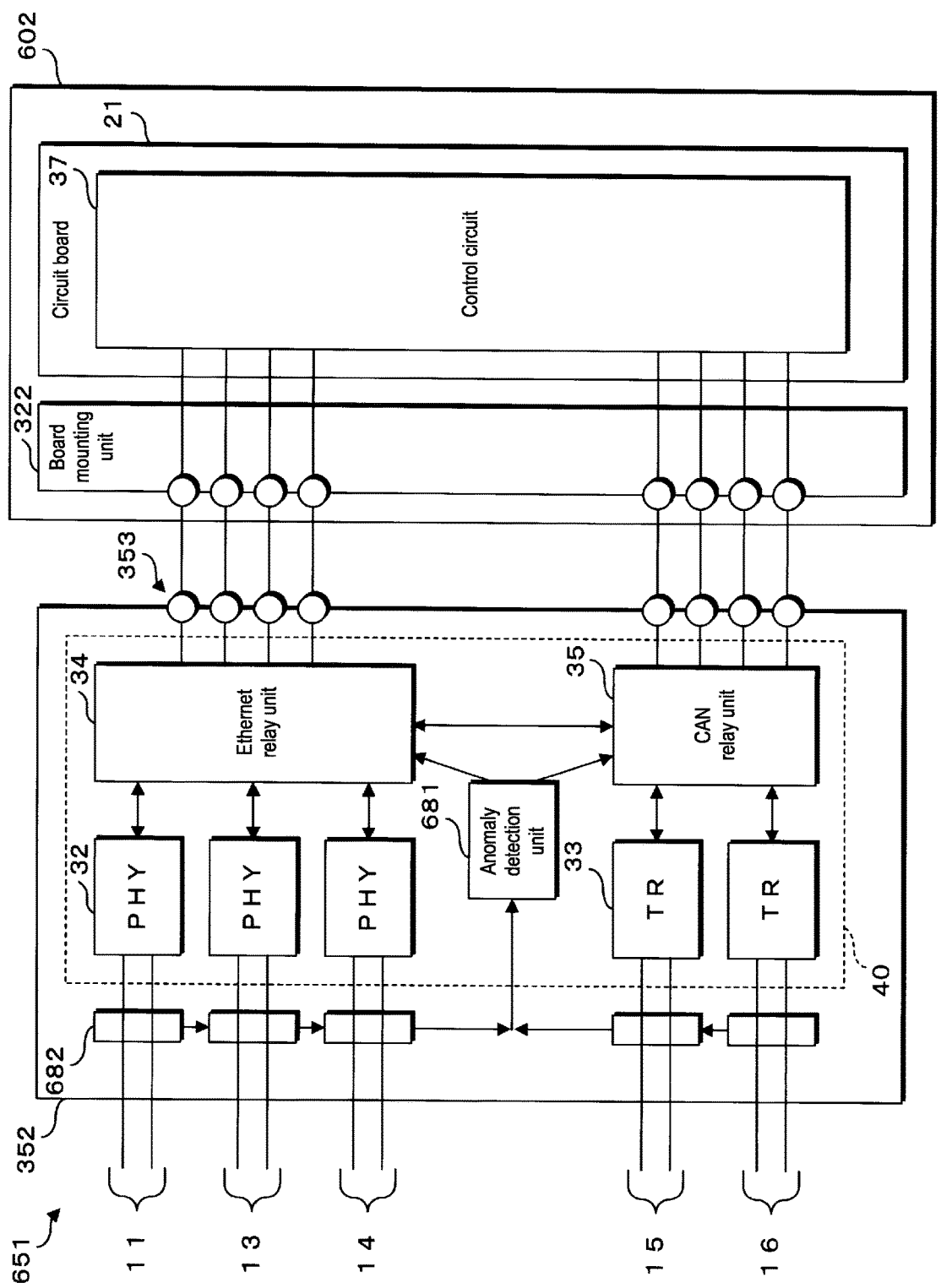
FIG. 42 is a block diagram showing the configuration of an in-vehicle communication system according to a second variation of the sixth embodiment.

FIG. 42 is a block diagram showing the configuration of an in-vehicle communication system according to a second variation of the sixth embodiment. The in-vehicle communication system according to the second variation is obtained by adding the function of detecting anomalies related to the communication lines 11 and 13 to 16 to the in-vehicle communication system according to the third embodiment shown in FIGS. 21 to 24. Note that, in FIG. 42, illustration with regard to the power supply circuit and power supply paths is omitted.

The in-vehicle communication system according to the second variation of the sixth embodiment has a configuration in which the wire harness 651 provided with the circuit board 352 having a relay function is detachably mounted to the high-performance ECU 602 provided with the board mounting unit 322. The anomaly detection unit 681 that performs anomaly detection related to the communication lines 11 and 13 to 16 is provided on the circuit board 352 of the wire harness 651. Note that, in FIG. 42, the anomaly detection unit 681 is provided inside the communication IC 40, but is not limited thereto, and may be provided as a separate IC outside the communication IC 40.

The circuit board 352 of the wire harness 651 according to the second variation has a flat rectangular shape, for example, with the plurality of communication lines 11 and 13 to 16 extending out from one edge side, and the terminals 353 being provided in the other edge side. The communication lines 11 and 13 to 16 are connected to the circuit board 352, and the communication IC 40 and the communication lines 11 and 13 to 16 are electrically connected via a wiring pattern provided on the circuit board 352. The sensor 682 is respectively provided for communication paths routed from where the communication lines 11 and 13 to 16 are connected to the circuit board 352 to the Ethernet PHYs 32 or CAN transceivers 33, or for the communication lines 11 and 13 to 16 connected to the circuit board 352. The sensor 682 is a sensor that detects the current value, voltage value or the like of a wire, wiring pattern or the like constituting the communication path.

The sensors 682 each output a detection result to the anomaly detection unit 681. The anomaly detection unit 681 performs processing for detecting anomalies on the respective communication lines 11 and 13 to 16, based on the detection results provided by the five sensors 682. If an anomaly is detected on any of the communication lines 11 and 13 to 16, the anomaly detection unit 681 notifies the anomaly detection to the Ethernet relay unit 34 or the CAN relay unit 35. The Ethernet relay unit 34 or CAN relay unit 35 to which the anomaly detection is notified notifies the anomaly detection to the control circuit 37 of the high-performance ECU 602. In response to notification of the anomaly detection, the control circuit 37 is able to execute processing such as stopping communication that uses whichever of the communication lines 11 and 13 to 16 the anomaly was detected on, or collecting and verifying more detailed information relating to the anomaly.

Third Variation

Figure 43:
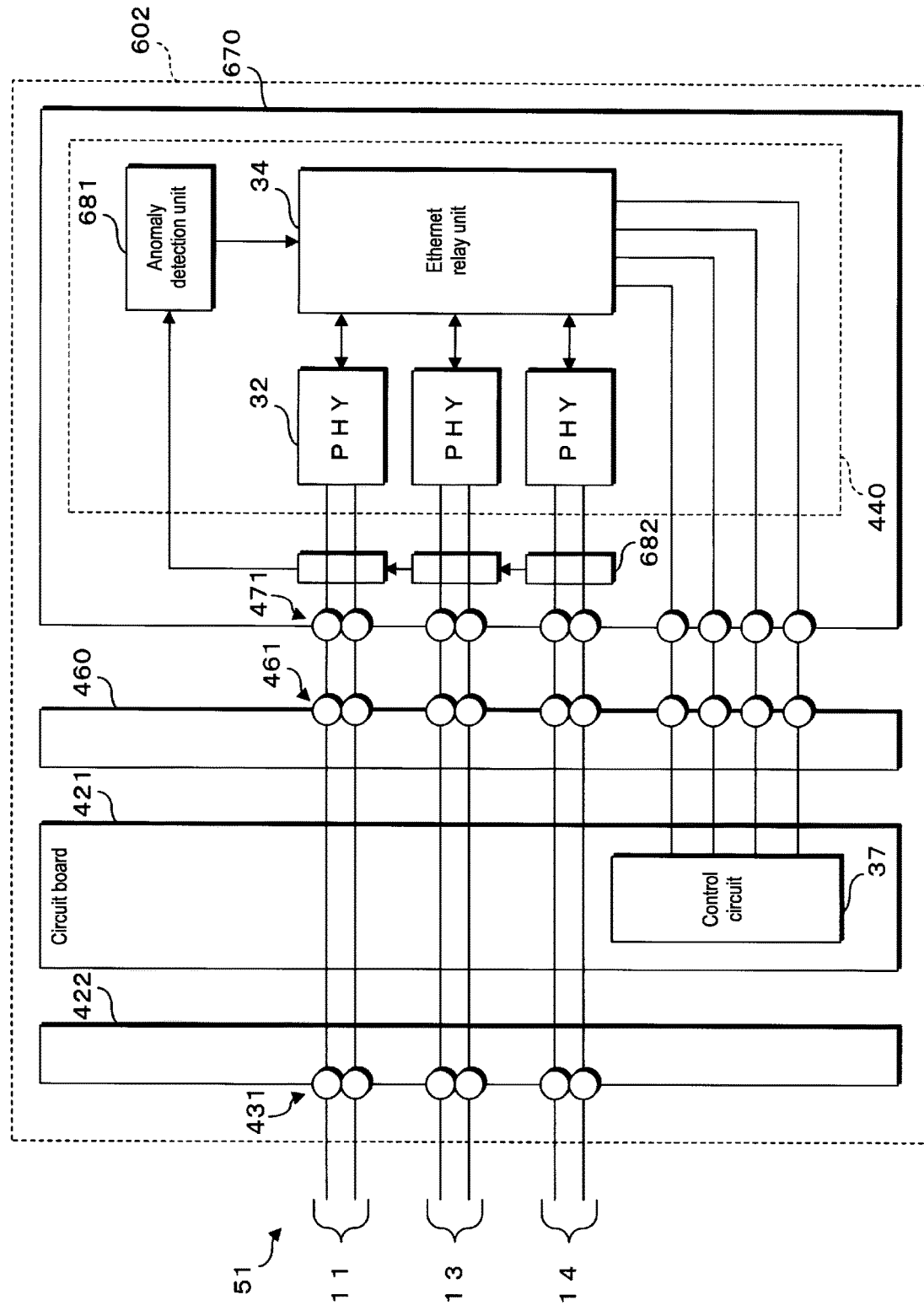
FIG. 43 is a block diagram showing the configuration of an in-vehicle communication system according to a third variation of the sixth embodiment.

FIG. 43 is a block diagram showing the configuration of an in-vehicle communication system according to a third variation of the sixth embodiment. The in-vehicle communication system according to the third variation is obtained by adding the function of detecting anomalies related to the communication lines 11, 13 and 14 to the in-vehicle communication system according to the fourth embodiment shown in FIGS. 25 to 30. Note that, in FIG. 43, illustration with regard to the power supply circuit and power supply paths is omitted.

With the in-vehicle communication system according to the third variation of the sixth embodiment, it becomes possible for the high-performance ECU 602 to perform communication via the communication lines 11, 13 and 14, by mounting a communication card 670 in which the communication function is consolidated in the card slot 460 provided in the high-performance ECU 602. The anomaly detection unit 681 that performs anomaly detection related to the communication lines 11, 13 and 14 is provided on a circuit board provided inside the communication card 670. Note that, in FIG. 43, the anomaly detection unit 681 is provided inside of the communication IC 440, but is not limited thereto, and may be provided as a separate IC outside the communication IC 440.

The plurality of terminals 471 for electrically connecting to the card slot 460 are provided in the communication card 670 according to the third variation. Some of these plurality of terminals 471 are electrically connected to the communication lines 11, 13 and 14 connected to the connector 422 of the high-performance ECU 602, due to the communication card 670 being mounted in the card slot 460. In the communication card 670 according to the third variation, the sensor 682 is respectively provided for communication paths routed from the terminals 471 electrically connected to these communication lines 11, 13 and 14 to the Ethernet PHYs 32. The sensor 682 is a sensor that detects the current value, voltage value or the like of a wiring pattern or the like constituting the communication path.

The sensors 682 each output a detection result to the anomaly detection unit 681. The anomaly detection unit 681 performs processing for detecting anomalies on the respective communication lines 11, 13 and 14, based on the detection results respectively provided by the five sensors 682. If an anomaly is detected on any of the communication lines 11, 13 and 14, the anomaly detection unit 681 notifies the anomaly detection to the Ethernet relay unit 34. The Ethernet relay unit 34 to which the anomaly detection is notified notifies the anomaly detection to the control circuit 37 of the high-performance ECU 602. In response to notification of the anomaly detection, the control circuit 37 is able to execute processing such as stopping communication that uses whichever of the communication lines 11, 13 and 14 the anomaly was detected on, or collecting and verifying more detailed information relating to the anomaly.

The embodiments disclosed herein are considered in all respects to be illustrative and not restrictive. The scope of the invention is indicated by the claims rather than by the foregoing meaning, and all changes that come within the meaning and range of equivalency of the claims are intended to be embraced therein.

The invention claimed is:

1. A wire harness comprising:
a connector to be detachably connected to an in-vehicle device;
a plurality of communication lines connected to the connector; and
a relay unit provided in the connector, and configured to relay communication between the plurality of communication lines, and to relay communication between the communication lines and the in-vehicle device,
wherein the connector includes:
an individual connector individually provided for the plurality of communication lines; and
an integrated connector to which the plurality of individual connectors are detachably connected, and to be detachably connected to the in-vehicle device, and
a terminal to be electrically connected to the in-vehicle device;
a relay IC including the relay unit;
a first input-output IC interposed between the terminal and the relay unit, and configured to input and output signals for communication with respect to the terminal;
a second input-output IC interposed between the communication lines and the relay unit, and configured to input and output signals for communication with respect to the communication lines; and
a substrate on which the relay IC, the first input-output IC and the second input-output IC are mounted,
the terminal is provided on one edge side of the substrate, and the communication lines are connected on an other edge side of the substrate, and
the terminal, the first input-output IC and the relay IC are disposed side by side in a straight line.

2. The wire harness according to claim 1, wherein the plurality of communication lines include a communication line to be used in communication using a first communication protocol and a communication line to be used in communication using a second communication protocol, and
the relay unit performs protocol conversion between the first communication protocol and the second communication protocol.

3. The wire harness according to claim 2, wherein the relay unit performs protocol conversion between the first communication protocol or second communication protocol and a third communication protocol, and performs communication using the third communication protocol with the in-vehicle device.

4. The wire harness according to claim 1, wherein the in-vehicle device includes a voltage conversion circuit for power supplied from a battery installed in a vehicle, and the relay unit receives supply of power whose voltage value has been converted by the voltage conversion circuit of the in-vehicle device.

5. The wire harness according to claim 1, comprising:
a voltage conversion circuit provided in the connector, and configured to convert a voltage value of power supplied from a battery installed in a vehicle,
wherein the relay unit receives supply of power from the voltage conversion circuit, and supplies power whose voltage value has been converted by the voltage conversion circuit to the in-vehicle device.

6. The wire harness according to claim 1, comprising:
an anomaly detection unit configured to detect an anomaly of the communication lines.

7. A wire harness comprising:
a connector to be detachably connected to an in-vehicle device;
a plurality of communication lines connected to the connector; and
a relay unit provided in the connector, and configured to relay communication between the plurality of communication lines, and to relay communication between the communication lines and the in-vehicle device,
wherein the connector includes:
an individual connector individually provided for the plurality of communication lines; and
an integrated connector to which the plurality of individual connectors are detachably connected, and to be detachably connected to the in-vehicle device,
a terminal to be electrically connected to the in-vehicle device;
a relay IC including the relay unit;
a first input-output IC interposed between the terminal and the relay unit, and configured to input and output signals for communication with respect to the terminal;
a second input-output IC interposed between the communication lines and the relay unit, and configured to input and output signals for communication with respect to the communication lines; and
a substrate on which the relay IC, the first input-output IC and the second input-output IC are mounted,
the terminal is provided on one edge side of the substrate, and the communication lines are connected on an other edge side of the substrate,
the terminal and the relay IC are disposed adjacent to each other, and
the first input-output IC is disposed adjacent to the terminal or the relay IC.

8. The wire harness according to claim 7, comprising:
an anomaly detection unit configured to detect an anomaly of the communication lines.

9. A wire harness comprising:
a connector to be detachably connected to an in-vehicle device;
a plurality of communication lines connected to the connector; and
a relay unit provided in the connector, and configured to relay communication between the plurality of communication lines, and to relay communication between the communication lines and the in-vehicle device,
wherein the connector includes:
an individual connector individually provided for the plurality of communication lines; and
an integrated connector to which the plurality of individual connectors are detachably connected, and to be detachably connected to the in-vehicle device, and
a terminal to be electrically connected to the in-vehicle device;
a relay IC including the relay unit;
a first input-output IC interposed between the terminal and the relay unit, and configured to input and output signals for communication with respect to the terminal;
a second input-output IC interposed between the communication lines and the relay unit, and configured to input and output signals for communication with respect to the communication lines; and
a substrate on which the relay IC, the first input-output IC and the second input-output IC are mounted,
the terminal is provided on one edge side of the substrate, and the communication lines are connected on an other edge side of the substrate, and
the first input-output IC or the second input-output IC is mounted on a surface on an opposite side of the substrate to the surface on which the relay IC is mounted.

10. The wire harness according to claim 9, comprising:
an anomaly detection unit configured to detect an anomaly of the communication lines.

* * * * *